US012209031B2

(12) United States Patent
Trotochaud et al.

(10) Patent No.: US 12,209,031 B2
(45) Date of Patent: Jan. 28, 2025

(54) LAYERED DOUBLE HYDROXIDE PARTICLES IN HYDROGEL MATRICES

(71) Applicant: Duke University, Durham, NC (US)

(72) Inventors: Lena Esters Trotochaud, Durham, NC (US); Mariana Vasquez Sanchez, Durham, NC (US); Alina Kirillova, Durham, NC (US)

(73) Assignee: Duke University, Durham, NC (US)

( * ) Notice: Subject to any disclaimer, the term of this patent is extended or adjusted under 35 U.S.C. 154(b) by 0 days.

(21) Appl. No.: 18/684,597

(22) PCT Filed: Aug. 19, 2022

(86) PCT No.: PCT/US2022/040933
§ 371 (c)(1),
(2) Date: Feb. 16, 2024

(87) PCT Pub. No.: WO2023/023355
PCT Pub. Date: Feb. 23, 2023

(65) Prior Publication Data
US 2024/0270592 A1 Aug. 15, 2024

Related U.S. Application Data

(60) Provisional application No. 63/235,293, filed on Aug. 20, 2021.

(51) Int. Cl.
*C01F 7/784* (2022.01)
*C08K 3/22* (2006.01)

(52) U.S. Cl.
CPC .............. *C01F 7/784* (2022.01); *C08K 3/22* (2013.01); *C01P 2002/22* (2013.01)

(58) Field of Classification Search
CPC .......... C01F 7/784; C08K 3/22; C01P 2002/22
See application file for complete search history.

(56) References Cited

U.S. PATENT DOCUMENTS 9,133,038 B2  9/2015 Douglas
2005/0260271 A1  11/2005 Bringley
(Continued)

FOREIGN PATENT DOCUMENTS

CN        109867266 A     6/2019
JP       2018008846 A     1/2018
WO   WO 2014/037172 A1   3/2014

OTHER PUBLICATIONS

International Search Report PCT/US2022/040933; mailed Jan. 20, 2023, 4 pgs.
(Continued)

*Primary Examiner* — Wayne A Langel
*Assistant Examiner* — Syed T Iqbal
(74) *Attorney, Agent, or Firm* — Michael Best & Friedrich LLP

(57) ABSTRACT

Exemplary layered double hydroxides (LDHs) may comprise a compound of formula $Mg_{4-y}AlX_y(OH)_2$, wherein X is $Mn^{+2}$, $Cu^{+2}$, $Zn^{+2}$, or $Fe^{+2}$, and $0.01 \leq y \leq 1$. Exemplary layered double hydroxide hydrogels (LDH-gels) may comprise a hydrogel and at least one LDH. Exemplary hydrogels may comprise polyethylene (glycol) diacrylate (PEGDA) or polyacrylamide (PAAm). Exemplary LDH-gels may comprise at least one LDH comprising a compound of formula $Mg_{4-y}AlX_y(OH)_2$, wherein X is $Mn^{+2}$, $Cu^{+2}$, $Zn^{+2}$, or $Fe^{+2}$, and $0.01 \leq y \leq 1$.

19 Claims, 31 Drawing Sheets

(56) References Cited

U.S. PATENT DOCUMENTS

| | | | |
|---|---|---|---|
| 2010/0215770 A1 | 8/2010 | Newton et al. | |
| 2014/0315099 A1 | 10/2014 | Yamada et al. | |
| 2015/0122652 A1 | 5/2015 | Thompson et al. | |
| 2019/0270891 A1* | 9/2019 | O'Hare | C08K 3/26 |

OTHER PUBLICATIONS

Written Opinion PCT/US2022/040933; mailed Jan. 20, 2023, 6 pgs.
International Search Report and Written Opinion for Application No. PCT/US2022/040933 dated Jan. 20, 2023 (11 pages).
Agarwal et al., "PDMAEMA based gene delivery materials," Materials Today, 2012, 15(9): 388-393.
Ahmed, "Hydrogel: Preparation, characterization, and applications: A review," Journal of Advanced Research, vol. 6, No. 2. Elsevier B.V., pp. 105-121, Mar. 1, 2015.
Almojil et al., "Screening Different Divalent and Trivalent Metals Containing Binary and Ternary Layered Double Hydroxides for Optimum Phosphate Uptake," Sci. Rep., 2019, 9(1): 1-8.
Ashjari et al., "Synthesis and employment of PEGDA for fabrication of superhydrophilic PVDF/PEGDA electrospun nanofibrous membranes by in-situ visible photopolymerization," Korean J. Chem. Eng., 2018, 35(1): 289-297.
Blaney et al., "Hybrid Anion Exchanger for Trace Phosphate Removal from Water and Wastewater," Water Res, 2007, 41(7): 1603.
Bunce et al., "A Review of Phosphorus Removal Technologies and Their Applicability to Small-Scale Domestic Wastewater Treatment Systems," Front. Environ. Sci., 2018, 6(8).
Cape Cod Commission, "Cape Cod Area Wide Water Quality Management Plan Update," Jun. 2015. <https://www.capecodcommission.org/resource-library/file/?url=/dept/commission/team/208/208%20Final/Cape_Cod_Area_Wide_Water_Quality_Management_Plan_Update_June_15_2015.pdf> Accessed on Feb. 10, 2021.
Carranza-Oropeza et al., "Performance assessment of protein electrophoresis by using polyacrylamide hydrogel with porous structure modified with SDS micelles as template," J. Appl. Polym. Sci., 2016, 133(40).
Çavuş et al., "Synthesis and swelling behavior of pH- and temperature-sensitive poly[2-(dimethylamino)ethyl methacrylate-co-2-acrylamido-2-methylpropane-1-sulfonic acid] hydrogels," Polymer Bulletin, 2007, 58(1): 235-242.
Chaillot et al., "Layered double hydroxides and LDH-derived materials in chosen environmental applications: a review," Environmental Science and Pollution Research. Springer, 2020, pp. 1-31.
Chesapeake Bay Foundation, "Sewage & Septic Systems: Reducing Nitrogen Pollution from Wastewater," Chesapeake Bay Foundation, 2018, <https://www.cbf.org/issues/sewage-septic-systems/> Accessed on Feb. 10, 2021.
Choi et al., "Recent advances in photo-crosslinkable hydrogels for biomedical applications," Biotechniques, 2019, 66(1): 40-53.
Chubar et al., "Layered double hydroxides as the next generation inorganic anion exchangers: Synthetic methods versus applicability," Advances in Colloid and Interface Science, 2017, 245: 62-80.
Conterosito et al., "Facile preparation methods of hydrotalcite layered materials and their structural characterization by combined techniques," Inorganica Chimica Acta, 2018, 470: pp. 36-50.
Cordell et al., "Towards global phosphorus security: A systems framework for phosphorus recovery and reuse options," Chemosphere, 2011, 84(6): 747-758.
Denisin et al., "Tuning the Range of Polyacrylamide Gel Stiffness for Mechanobiology Applications," ACS Applied Materials and Interfaces, 2016, 8(34): 21893-21902.
Dodds et al., "Eutrophication of U. S. freshwaters: Analysis of potential economic damages," Environ. Sci. Technol., 2009, 43(1): 12-19.
Dox et al., "Optimization of phosphate recovery from urine by layered double hydroxides," Sci. Total Environ., 2019, 682: 437-446.

Dox et al., "Phosphorus Recycling from Urine Using Layered Double Hydroxides: A Kinetic Study," Appl. Clay Sci., 2019, 182: 105255.
EPA, "Septic Systems and Surface Water," <https://www.epa.gov/septic/septic-systems-and-surface-water>. Accessed Mar. 29, 2021.
EPA, "Septic Systems Overview," <https://www.epa.gov/septic>. Accessed Mar. 9, 2021.
EPA, "Supporting Innovations to Reduce Nitrogen Pollution from Septic Systems," May 19, 2020, <https://www.epa.gov/sciencematters/supporting-innovations-reduce-nitrogen-pollution-septic-systems> Accessed Mar. 10, 2021.
EPA, "The Problem," <https://www.epa.gov/nutrientpollution/problem> Accessed Mar. 9, 2021.
Evans et al., "Structural aspects of layered double hydroxides," Struct. Bond., 2005, 119: 1-87.
Great Lakes—Upper Mississippi River Board of State and Provincial Public Health and Environmental Managers, "Recommended Standards for Water Works," 2012 edition, 166 pages.
Halajnia et al., "Adsorption-desorption characteristics of nitrate, phosphate and sulfate on Mg—Al layered double hydroxide," Appl. Clay Sci., 2013, 80-81: 305-312.
Han et al., "Immobilization of Layered Double Hydroxide into Polyvinyl Alcohol/Alginate Hydrogel Beads for Phosphate Removal," Environmental Engineering Research, 2012, 17(3): 133-138.
He et al., "High adsorption selectivity of ZnAl layered double hydroxides and the calcined materials toward phosphate," J. Colloid Interface Sci., 2010, 343(1): 225-231.
He et al., "Preparation of layered double hydroxides," Struct. Bond., 2005, 119: 89-119.
Kim et al., "Immobilization of layered double hydroxide in poly(vinylidene fluoride)/poly(vinyl alcohol) polymer matrices to synthesize bead-type adsorbents for phosphate removal from natural water," Applied Clay Science, 2019, 170: 1-12.
Koufakis et al., "Film Properties and Antimicrobial Efficacy of Quaternized PDMAEMA Brushes: Short vs Long Alkyl Chain Length," Langmuir, 2020, 36(13): 3482-3493.
Lin et al., "PEG hydrogels for the controlled release of biomolecules in regenerative medicine," Pharmaceutical Research, 2009, 26(3): 631-643.
Liu et al., "Nanocomposite smart hydrogels with improved responsiveness and mechanical properties: A mini review," J. Polym. Sci. Part B Polym. Phys., 2018, 56(19): 1306-1313.
Lombardo Associates, Inc, PhosRID, <http://www.lombardoassociates.com/pdfs/phos-rid.pdf> Accessed Mar. 10, 2021.
Manouras et al., "A facile route towards PDMAEMA homopolymer amphiphiles," Soft Matter, 2017, 13(20): 3777-3782.
Manuel, "Nutrient Pollution: A Persistent Threat to Waterways," Environmental Health Perspectives, 2014, 122(11): A304-A309.
Melekaslan et al., "Elasticity of poly(acrylamide) gel beads," Polym. Bull., 2003, 50(4): 287-294.
Mezzacapo et al., "A Multi-State Regulation and Policy Survey of Onsite Wastewater Treatment System Upgrade Programs," Special Report SR-2020-02, Honolulu, Sep. 2019.
Mishra et al., "Layered double hydroxides: A brief review from fundamentals to application as evolving biomaterials," App Clay Sci, 2018, 153: 172-186.
Mishra et al., "Ternary Layered Double Hydroxides (LDH) Based on Cu-Substituted Zn Al for the Design of Efficient Antibacterial Ceramics," Applied Clay Science, 2018, 165: 214-222.
Moore et al., "Bioactive Poly(ethylene Glycol) Acrylate Hydrogels for Regenerative Engineering," Regen. Eng. Transl. Med., 2019, 5(2): 167-179.
Norweco, "Phos-4-Fade, Phosphorus Removal Filter," <https://www.norwaco.com/residential/phos-4-fade/>. Accessed Mar. 10, 2021.
O'Neal et al., "Phosphate recovery using hybrid anion exchange: Applications to source-separated urine and combined wastewater streams," Water Res, 2013, 47(14): 5003-5017.
Orenco Systems, "Residential / Choose a System," <https://www.orenco.com/applications/residential/choose-a-system#4703-advanced-treatment-systems> Accessed Mar. 10, 2021.
Patel et al., "Mechanical and swelling properties of polyacrylamide gel spheres," Polymer (Guildf), 1989, 30(12): 2198-2203.

(56) References Cited

OTHER PUBLICATIONS

PhosRID | MASSTC. The Massachusetts Alternative Septic System Test Center, <https://www.masstc.org/technology/phosrid>. Accessed Mar. 10, 2021.
Premier Tech, "Ecoflo," <https://www.premiertechaqua.com/en-us/septic-system/ecoflo> Accessed Mar. 10, 2021.
Realtor.com, "Septic System Maintenance Matters: Costs, Upkeep, and Items You Should Never Flush," National Association of Realtors, <https://www.realtor.com/advice/home-improvement/septic-system-maintenance/>. Accessed Mar. 9, 2021.
Rewatec, "Phosphorus removal," <https://www.premiertechaqua.com/en-us/septic-system/phosphorus-removal>. Accessed Mar. 10, 2021.
Rodriguez-Gonzalez et al., "A Pilot-Scale Hybrid Adsorption—Biological Treatment System for Nitrogen Removal in Onsite Wastewater Treatment," Journal of Sustainable Water in the Built Environment, 2019, 6(1).
Schellenger et al., "Phosphorus loading from onsite wastewater systems to a lake (at long time scales)," Lake Reserv. Manag., 2019, 35(1): 90-101.
Tong et al., "Nitrate adsorption from aqueous solutions by calcined ternary Mg—Al—Fe hydrotalcite," Water Sci Technol, 2017, 75(9): 2194-2203.
Tran et al., "Synthesis of hydrogels with antifouling properties as membranes for water purification," J. Vis. Exp., 2017, 122, e55426.
Trotochaud et al., "Non-biological methods for phosphorus and nitrogen removal from wastewater: A gap analysis of reinvented-toilet technologies with respect to ISO 30500," Gates Open Res., 2020, 3: 559.
USEPA, "Nutrient Pollution. The Effects: Human Health," <https://www.epa.gov/nutrientpollution/effects-human-health> Accessed on Feb. 10, 2021.
USGS, "Phosphorus Doesn't Migrate in Ground Water? Better Think Again!," 2019, <https://toxics.usgs.gov/highlights/phosphorous_migration.html> Accessed on Aug. 19, 2020.
Waterloo Biofilter, Waterloo EC-P (Residential). Electrochemical phosphorus removal for individual homes and cottages, <https://waterloo-biofilter.com/products/nutrient-removal/phosphorus-removal-products/waterloo-ec-p-residential/>. Accessed Mar. 10, 2021.
Wilems et al., "Effects of free radical initiators on polyethylene glycol dimethacrylate hydrogel properties and biocompatibility," J. Biomed. Mater. Res. Part A, 2017, 105(11): 3059-3068.
Wu et al., "Selective Phosphate Removal from Water and Wastewater using Sorption: Process Fundamentals and Removal Mechanisms," Environmental Science and Technology. American Chemical Society, 2020.
Xiong et al., "Polyacrylamide degradation and its implications in environmental systems," Npj Clean Water, 2018, Article 17.
Xu et al., "Removal behavior research of orthophosphate by CaFe-layered double hydroxides," Desalin. Water Treat., 2016, 57(17): 7918-7925.
Yang et al., "Layered double hydroxide/polyacrylamide nanocomposite hydrogels: Green preparation, rheology and application in methyl orange removal from aqueous solution," Journal of Molecular Liquids, 2019, 280: 128-134.
Zhou et al., "Selective nitrate removal from aqueous solutions by a hydrotalcite-like absorbent FeMgMn—LDH," Sci Rep, 2020 10: 16126.

\* cited by examiner

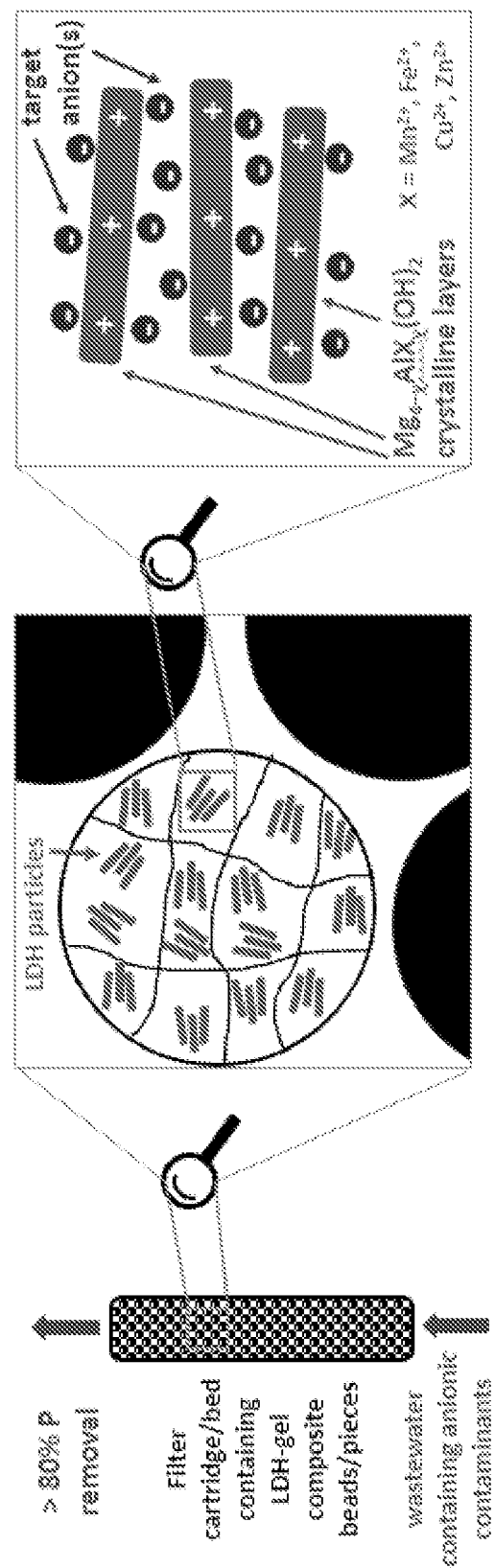

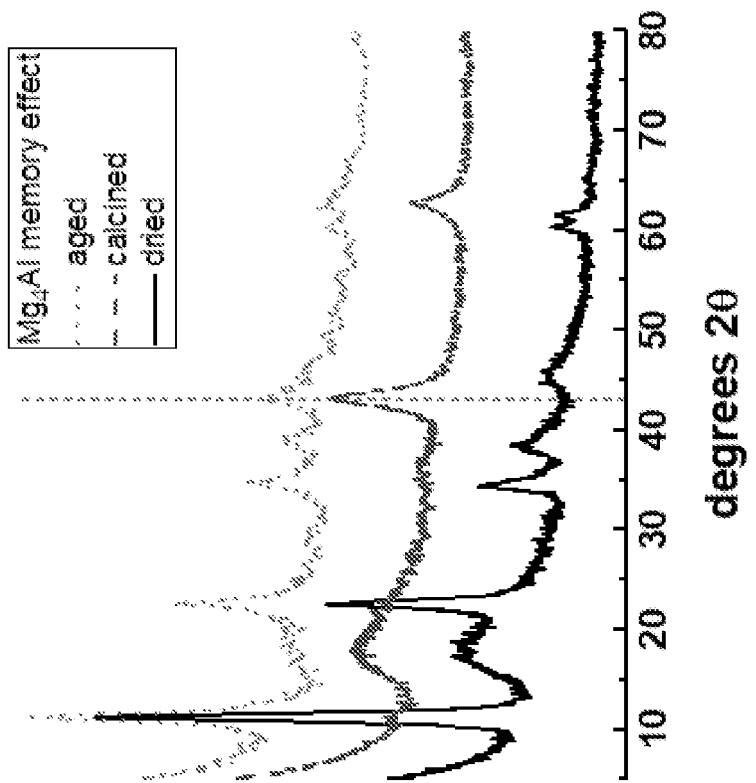

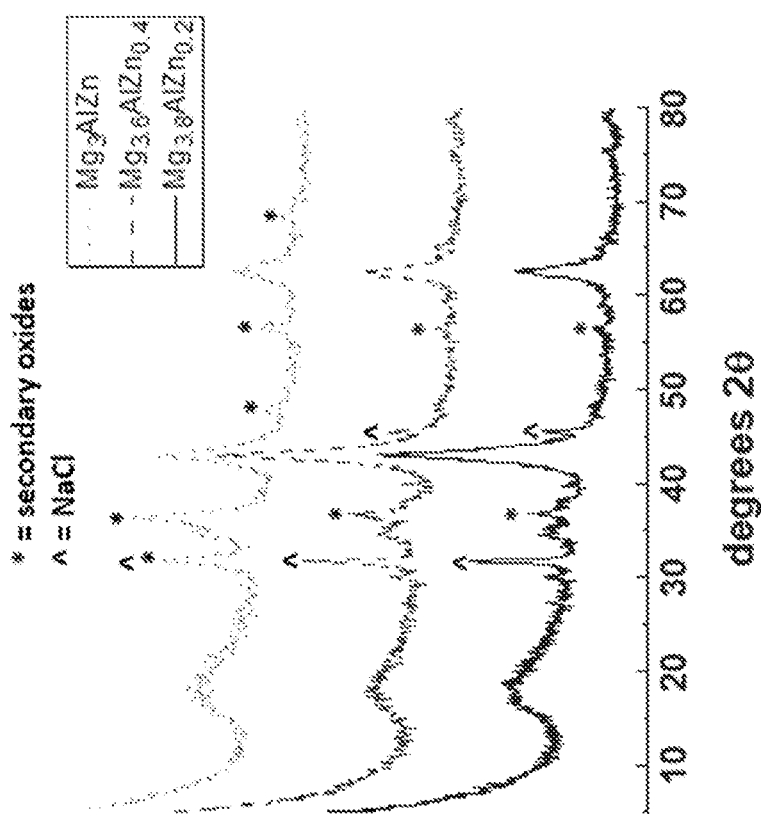
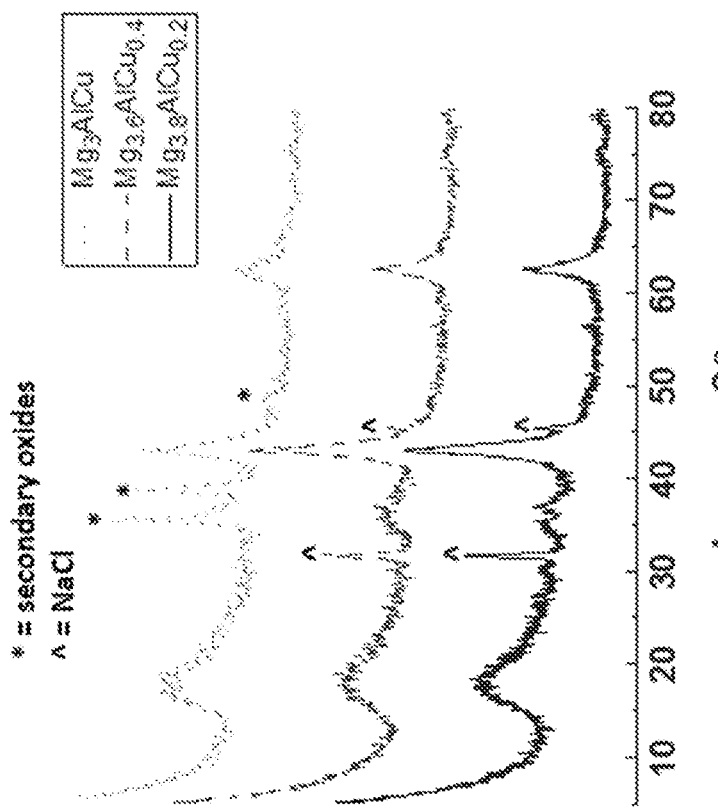
FIG. 13A
FIG. 13B

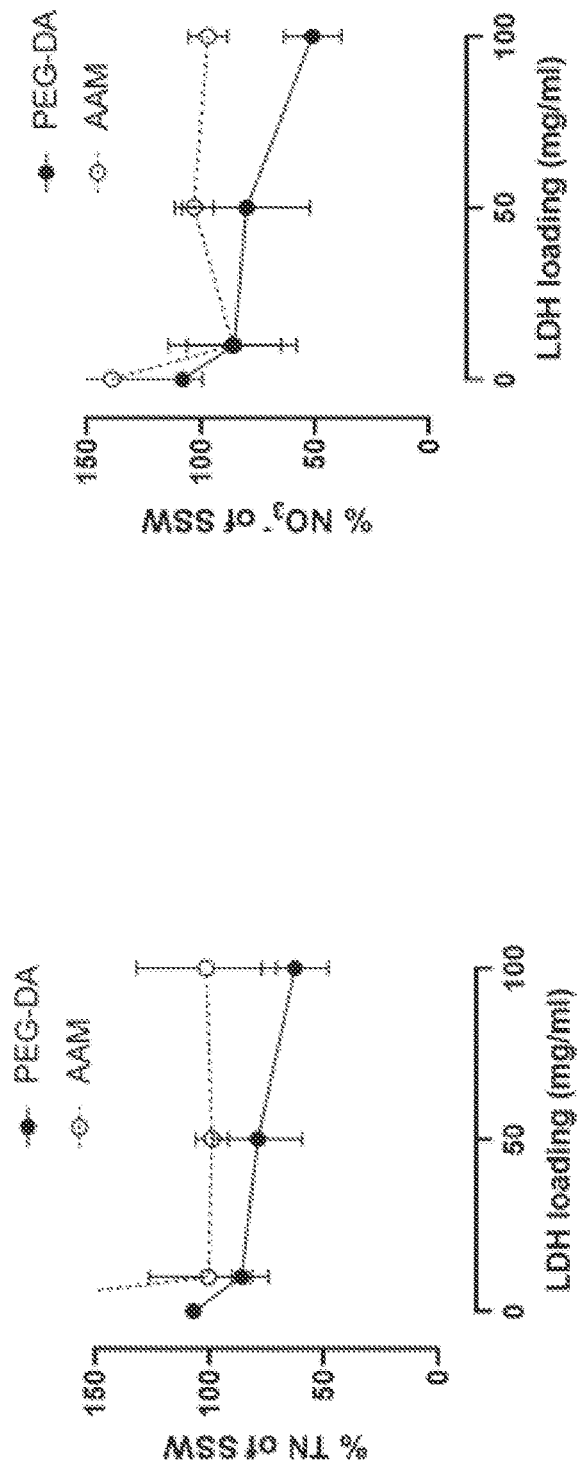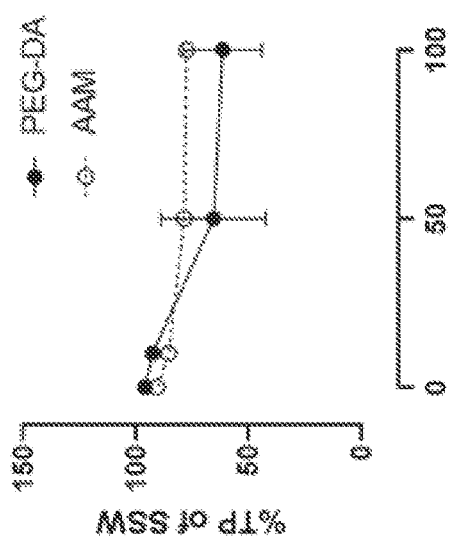
FIG. 15A
FIG. 15B
FIG. 15C $Mg_{3.8}AlZn_{0.2}$ $Mg_{3.8}AlFe_{0.2}$

LAYERED DOUBLE HYDROXIDE PARTICLES IN HYDROGEL MATRICES

CROSS-REFERENCE TO RELATED APPLICATION(S)

This patent application is the U.S. national stage entry under 35 U.S.C. § 371 of International Application Number PCT/US2022/040933, filed Aug. 19, 2022, which claims priority to U.S. Provisional Patent Application No. 63/235,293, filed Aug. 20, 2021, the entire contents of which are incorporated herein by reference.

TECHNICAL FIELD

The present disclosure relates to layered double hydroxides (LDHs) and layered double hydroxide hydrogels (LDH-gels). Exemplary LDH-gels may be particularly suited for use in various filters for onsite water treatment systems (OWTSs). For example, LDH-gels may be incorporated into filters to selectively remove phosphorus- and/or nitrogen-containing species, such as phosphate ($PO_4^{3-}$) and/or nitrate ($NO_3^-$) anions.

INTRODUCTION

Nitrogen (N) and phosphorus (P) pollution of waterways may cause eutrophication and has detrimental impacts on the environment, human health, and the economy. A significant source of nutrient pollution is onsite water treatment systems (OWTSs).

SUMMARY

In one aspect, a layered double hydroxide (LDH) is disclosed. The LDH may comprise a compound of formula $Mg_{4-y}AlX_y(OH)_2$ wherein X is $Mn^{+2}$, $Cu^{+2}$, $Zn^{+2}$, or $Fe^{+2}$, and $0.01 \leq y \leq 1$. In some instances, X may be $Zn^{+2}$. In some instances, X may be $Fe^{+2}$. In some instances, $0.2 \leq y \leq 1$. In some instances, y may be 0.2. In some instances, y may be 0.4. In some instances, y may be 1.

In another aspect, a layered double hydroxide hydrogel (LDH-gel) is disclosed. The LDH-gel may comprise a hydrogel. The hydrogel may comprise polyethylene (glycol) diacrylate (PEGDA), polyacrylamide (PAAm), or combinations thereof. The LDH-gel may comprise at least one layered double hydroxide (LDH). The at least one LDH may comprise a compound of formula $Mg_{4-y}AlX_y(OH)_2$ wherein X is $Mn^{+2}$, $Cu^{+2}$, $Zn^{+2}$, or $Fe^{+2}$, and $0.01 \leq y \leq 1$. In some instances, X may be $Zn^{+2}$. In some instances, X may be $Fe^{+2}$. In some instances, $0.2 \leq y \leq 1$. In some instances, y may be 0.2. In some instances, y may be 1. The LDH-gel may comprise more than one LDH comprising a compound of formula $Mg_{4-y}AlX_y(OH)_2$. In some instances the LDH-gel may comprise a first LDH compound comprising a compound of formula $Mg_{4-y}AlX_y(OH)_2$ where X is $Zn^{+2}$ and a second LDH comprising a compound of formula $Mg_{4-y}AlX_y(OH)_2$ where X is $Fe^{+2}$. The LDH-gel may be in the form of a bead.

In another aspect, a method of preparing layered double hydroxide (LDH) particles is disclosed. The method may comprise preparing a metal ion solution comprising magnesium chloride ($MgCl_2$), aluminum chloride ($AlCl_3$), and a transition metal chloride ($XCl_2$). The transition metal chloride may be $MnCl_2$, $CuCl_2$, $ZnCl_2$, or $FeCl_2$. The method may further comprise adding a 2 M sodium hydroxide (NaOH) solution to the metal ion solution to form a first suspension comprising the LDH particles. The method may further comprise centrifuging the first suspension and decanting a first supernatant or filtering the LDH particles. The method may further comprise exposing the LDH particles to a 2 M sodium carbonate ($Na_2CO_3$) solution to form a second suspension comprising the LDH particles. The method may further comprise centrifuging the second suspension and decanting a second supernatant or filtering the LDH particles. The method may further comprise washing the LDH particles. Washing may comprise a first washing step, a second washing step, and a third washing step. The first washing step may comprise washing the LDH particles with a solution comprising sodium carbonate ($Na_2CO_3$). The second and third washing steps may comprise washing the LDH particles with pure water. The method may further comprise drying the LDH particles. The method may further comprise calcining the LDH particles. Calcining the LDH particles may occur at a temperature of 350° C. to 550° C.

In another aspect, a method of making a layered double hydroxide gel (LDH-gel) is disclosed. The method may comprise forming a mixture. In some instances, the method may comprise forming the mixture in water and adding the mixture in water to an oil to form a water-in-oil emulsion. The oil may be paraffin oil. The mixture may comprise a monomer, a crosslinker, a catalyst, and LDH particles. The monomer may be acrylamide (AAm) or polyethylene (glycol) diacrylate (PEGDA). The PEGDA monomer may have an average molecular weight of 575 g/mol. N,N-methylenebisacrylamide (MBA) may be the crosslinker. N,N,N',N'-tetramethylethylenediamine (TEMED) may be the catalyst. The method may further comprise adding an initiator to the mixture while stirring the mixture. Ammonium persulfate (APS) may be the initiator. The method may further comprise allowing the mixture to form a solid. The method may further comprise washing the solid. In some instances, after allowing the mixture to form a solid, and before washing the solid, the solid may be broken into pieces.

In another aspect, a filter is disclosed. The filter may comprise an LDH-gel.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

BRIEF DESCRIPTION OF THE DRAWINGS

FIG. 1A schematically shows exemplary layered double hydroxide hydrogel (LDH-gel) beads in a filter-cartridge configured for phosphorus (P) removal.

FIG. 1B schematically shows an exemplary LDH-gel bead where layered double hydroxide (LDH) particles are immobilized within a cross-linked hydrogel network. The hydrogels hold the LDH particles in place while maintaining their functionality and are highly water permeable.

FIG. 1C schematically shows an exemplary LDH composition having crystalline layers with target anions adsorbed at LDH surface sites and within the LDH interlayer space.

FIG. 10A shows the XRD patterns of aged, dried, and calcined exemplary $Mg_3AlCu$ LDH samples.

FIG. 10B shows the XRD patterns of aged, dried, and calcined exemplary $Mg_4Al$ LDH samples.

FIG. 13A shows the XRD patterns of calcined $Mg_{4-y}AlX_y$ LDHs, where $X=Cu^{+2}$ and y is 0.2 (Cu-5), 0.4 (Cu-10), and 1 (Cu-25). Asterisks (*) indicate secondary oxide phases (CuO). Carets (^) indicate sodium chloride (NaCl) impurities.

FIG. 13B shows the XRD patterns of calcined $Mg_{4-y}AlX_y$ LDHs, where $X=Zn^{+2}$ and y is 0.2 (Zn-5), 0.4 (Zn-10), and 1 (Zn-25). Asterisks (*) indicate secondary oxide phases (ZnO). Carets (^) indicate sodium chloride (NaCl) impurities.

FIGS. 15A-15C show the synthetic stormwater (SSW) performance results for exemplary LDH-gels having various LDH particle loadings (1, 10, 50, and 100 mg/mL). The exemplary LDH-gels tested contain equal amounts of Fe-5 ($Mg_{3.8}AlFe_{0.2}$) and Zn-5 ($Mg_{3.8}AlZn_{0.2}$) LDH particles.

FIG. 15A shows the percent total nitrogen (TN) removal for exemplary LDH-gels prepared from acrylamide (AAm) and polyethylene (glycol) diacrylate (PEGDA) monomers at various LDH particle loadings (1, 10, 50, and 100 mg/mL). Starting value for total nitrogen (TN): 4.4-5.4 ppm.

FIG. 15B shows the percent nitrate ($NO_3^-$) removal for exemplary LDH-gels prepared from acrylamide (AAm) and polyethylene (glycol) diacrylate (PEGDA) monomers at various LDH particle loadings (1, 10, 50, and 100 mg/mL). Starting value for nitrate ($NO_3^-$): 0.24-0.45 ppm.

FIG. 15C shows the percent total phosphorus (TP) removal for exemplary LDH-gels prepared from acrylamide (AAm) and polyethylene (glycol) diacrylate (PEGDA) monomers at various LDH particle loadings (1, 10, 50, and 100 mg/mL). Starting value for total phosphorus (TP): 2.98-3.42 ppm.

DETAILED DESCRIPTION

Figure 2C:
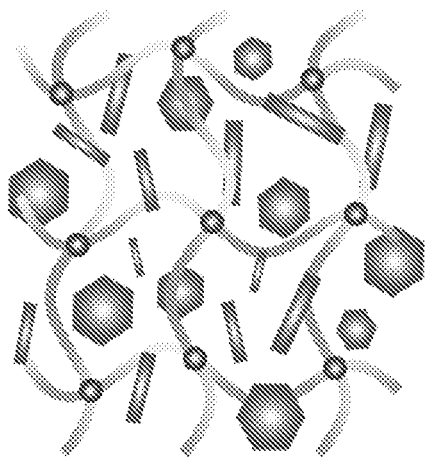
FIG. 2C schematically shows an exemplary LDH-gel, which has a crosslinked polymer network and contains LDH particles.

Exemplary materials, methods and techniques disclosed and contemplated herein generally relate to layered double hydroxides (LDHs) and layered double hydroxide hydrogels (LDH-gels). Exemplary LDHs and LDH-gels may be particularly suited for use in water filtration applications, such as filters for onsite water treatment systems (OWTSs). Exemplary LDHs and LDH-gels may also be particularly suited for the treatment of stormwater.

Unless otherwise defined, all technical and scientific terms used herein have the same meaning as commonly understood by one of ordinary skill in the art. In case of conflict, the present document, including definitions, will control. Methods and materials are described below, although methods and materials similar or equivalent to those described herein can be used in practice or testing of the present disclosure. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

As used herein, the term "about" is used to indicate that exact values are not necessarily attainable. Therefore, the term "about" is used to indicate this uncertainty limit. The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5-1.4. The modifier "about" should also be considered as disclosing the range defined by the absolute values of the two endpoints. For example, the expression "from about 2 to about 4" also discloses the range "from 2 to 4."

For the recitation of numeric ranges herein, each intervening number there between with the same degree of precision is contemplated. For example, for the range of 6-9, the numbers 7 and 8 are contemplated in addition to 6 and 9, and for the range 6.0-7.0, the numbers 6.0, 6.1, 6.2, 6.3, 6.4, 6.5, 6.6, 6.7, 6.8, 6.9, and 7.0 are contemplated. For another example, when a pressure range is described as being between ambient pressure and another pressure, a pressure that is ambient pressure is expressly contemplated.

As used herein, the term "hydrogel" is a crosslinked hydrophilic polymer that does not dissolve in water.

As used herein, the term "crosslinker" is a molecule that contains two or more reactive ends capable of chemically attaching to specific functional groups on other molecules.

As used herein, the term "initiator" is a molecule that reacts with a monomer (single molecule that can form chemical bonds) to form an intermediate compound capable of linking successively with a plurality of other monomers into a polymeric compound.

I. EXEMPLARY COMPOSITIONS

Various aspects of exemplary layered double hydroxides (LDHs) and layered double hydroxide hydrogels (LDH-gels) are discussed below.

A. Exemplary Layered Double Hydroxides (LDHs)

Layered double hydroxides (LDHs) are a class of materials described by the general formula $[M_{1-x}^{2+}M_x^{3+}(OH)_2]^{x+}[A^{n-}]_{x/n} \cdot yH_2O$, where M atoms are divalent and trivalent transition metal cations arranged in 2-dimensional crystalline hydroxide sheets, and $A^{n-}$ is an anion.

As shown in FIG. 1A, LDHs may be incorporated in layered double hydroxide hydrogel (LDH-gel) beads in a filter-cartridge configured for nutrient removal. The target nutrient in FIG. 1A is phosphorus (P), although exemplary LDH-gels may be configured for other nutrients as discussed in greater detail below.

The robust immobilization of LDH particles in the LDH-gel beads may enable optimum filter performance. LDH-gels may achieve such robust immobilization of LDH particles, and as shown in FIG. 1B, the hydrogel of the LDH-gel holds the LDH particles in place, maintaining the LDH-gel's functionality and water permeability. As shown in FIG. 1C, charge balance is achieved in LDH particles by the stacking of the crystalline layers with anions (and water molecules) occupying the inter-sheet space. As further indicated by FIG. 1C, LDH compositions may tune stability, selectivity, and capacity.

LDHs based on $Al^{3+}$ and $Mg^{2+}$ may have high selectivity for phosphorus-containing species, with sorption occurring primarily through ligand-exchange and ion-exchange mechanisms. Exemplary LDHs may be altered, and the material properties (including selectivity) tuned by modifying the ratio and identity of the divalent ($X^{2+}$) and trivalent ($X^{3+}$) metal cations. Exemplary phosphorus-containing species may include dissolved reactive phosphate ($PO_4^{-3}$, $HPO_4^{-2}$, and $H_2PO_4^{-}$), particulate inorganic phosphate (e.g., from soil particulates), and various organic phosphorus-containing compounds (e.g., from decomposition of organic matter and proteins; amino acids; some surfactants).

LDHs based on $Fe^{3+}/Fe^{2+}$, $Al^{3+}$, and $Mg^{2+}$ may have high selectivity for nitrogen-containing species, with sorption occurring primarily through ligand-exchange and ion-exchange mechanisms. Exemplary LDHs may be altered, and the material properties (including selectivity) tuned by modifying the ratio and identity of the divalent ($X^{2+}$) and trivalent ($X^{3+}$) metal cations. Exemplary nitrogen-containing species may include inorganic nitrogen-containing ions (nitrate ($NO_3^-$), nitrite ($NO_2^-$), and ammonium ($NH_4^+$)), and various organic nitrogen-containing compounds (e.g., from decomposition of organic matter and proteins; amino acids; azo dyes).

The structural stability of LDHs can be compromised during $PO_4^{3-}$ sorption if reaction with and abstraction of the metal cations ($X^{2+}$ and/or $X^{3+}$) from the crystalline sheets occurs. This results in precipitation of secondary phosphate-containing phases through formation of ionic bonds. When secondary phase precipitation is avoided, $PO_4^{3-}$ desorption can be achieved via ion exchange by introducing a competing anion at high concentration (for example, —OH, by treatment with strong base).

Exemplary layered double hydroxides (LDHs) of the present disclosure generally comprise a compound of formula:

$$Mg_{4-y}AlX_y(OH)_2,$$

wherein X is $Mn^{+2}$, $Cu^{+2}$, $Zn^{+2}$, or $Fe^{+2}$, and $0.01 \leq y \leq 1$. In some instances, X is $Zn^{+2}$ or $Fe^{+2}$. A stoichiometric amount of X is defined by the subscript y.

Typically, y is between about 0.01 and about 1. In various instances, y is between about 0.1 and about 1; between about 0.2 and about 1; between about 0.25 and about 0.95; between about 0.30 and about 0.90; between about 0.35 and about 0.85; between about 0.40 and about 0.80; between about 0.45 and about 0.75; between about 0.50 and about 0.70; or between about 0.55 and about 0.65. In various instances, y is no greater than 1; no greater than 0.95; no greater than 0.90; no greater than 0.85; no greater than 0.80; no greater than 0.75; no greater than 0.70; no greater than 0.65; no greater than 0.60; no greater than 0.55; no greater than 0.50; no greater than 0.45; no greater than 0.40; no greater than 0.35; no greater than 0.30; no greater than 0.25; no greater than 0.20; no greater than 0.15; no greater than 0.10; no greater than 0.05; or no greater than 0.01. In various instances, y is no less than 0.01; no less than 0.05; no less than 0.10; no less than 0.15; no less than 0.20; no less than 0.25; no less than 0.30; no less than 0.35; no less than 0.40; no less than 0.45; no less than 0.50; no less than 0.55; no less than 0.60; no less than 0.65; no less than 0.70; no less than 0.75; no less than 0.80; no less than 0.85; no less than 0.90; no less than 0.95; or no less than 1.

B. Exemplary Layered Double Hydroxide Hydrogels (LDH-Gels)

Exemplary layered double hydroxide hydrogels (LDH-gels) may comprise a hydrogel and at least one layered double hydroxide (LDH). In various instances, the LDH-gel is in the form of a bead. Exemplary beads may be spherical. Exemplary spherical beads may be perfectly or imperfectly spherical. Exemplary LDH-gel beads may have a diameter between 1 mm and 10 mm. In various instances, LDH-gel beads have a diameter between 1 mm and 9 mm; between 2 mm and 8 mm; between 3 mm and 7 mm; or between 4 mm and 6 mm. In various instances, the LDH-gel heads have a diameter of no greater than 10 mm; no greater than 9 mm; no greater than 8 mm; no greater than 7 mm; no greater than 6 mm; no greater than 5 mm; no greater than 4 mm; no greater than 3 mm; no greater than 2 mm; or no greater than 1 mm. In various instances, the LDH-gel heads have a diameter of no less than 1 mm; no less than 2 mm; no less than 3 mm; no less than 4 mm; no less than 5 mm; no less than 6 mm; no less than 7 mm; no less than 9 mm; or no less than 10 mm.

In other instances, the LDH-gel is in the form of a block. In various instances, the LDH-gel blocks may be broken into pieces. In various instances, the pieces of LDH gel blocks may have a length along the longest axis between 1 mm and 10 mm. In various instances, the pieces of LDH gel blocks may have a length along the longest axis between 1 mm and 9 mm; between 2 mm and 8 mm; between 3 mm and 7 mm; or between 4 mm and 6 mm. In various instances, the pieces of LDH gel blocks may have a length along the longest axis of no greater than 10 mm; no greater than 9 mm; no greater than 8 mm; no greater than 7 mm; no greater than 6 mm; no greater than 5 mm; no greater than 4 mm; no greater than 3 mm; no greater than 2 mm; or no greater than 1 mm. In various instances, the pieces of LDH gel blocks may have a length along the longest axis of no less than 1 mm; no less than 2 mm; no less than 3 mm; no less than 4 mm; no less than 5 mm; no less than 6 mm; no less than 7 mm; no less than 9 mm; or no less than 10 mm.

The density of the LDH-gel may vary and will generally depend on the LDH particle loading. In various instances, the density of the LDH-gel may be 1.01 g/mL to 1.50 g/mL. In various instances, the density of the LDH-gel may be 1.05 g/mL to 1.50 g/mL; 1.10 g/mL to 1.50 g/mL; 1.15 g/mL to 1.45 g/mL; 1.20 g/mL to 1.40 g/mL; or 1.25 g/mL to 1.35 g/mL. In various instances, the density of the LDH-gel may be no greater than 1.50 g/mL; no greater than 1.45 g/mL; no greater than 1.40 g/mL; no greater than 1.35 g/mL; no greater than 1.30 g/mL; no greater than 1.25 g/mL; no greater than 1.20 g/mL; no greater than 1.15 g/mL; no greater than 1.10 g/mL; no greater than 1.05 g/mL; or no greater than 1.01 g/mL. In various instances, the density of the LDH-gel may be no less than 1.01 g/mL; no less than 1.05 g/mL; no less than 1.10 g/mL; no less than 1.15 g/mL; no less than 1.20 g/mL; no less than 1.25 g/mL; no less than 1.30 g/mL; no less than 1.35 g/mL; no less than 1.40 g/mL; no less than 1.45 g/mL; or no less than 1.50 g/mL.

Exemplary hydrogels for use in the LDH-gels include poly(2-(dimethylamino)ethyl methacrylate) (PDMAEMA), polyacrylamide (PAAm), poly(ethylene glycol) diacrylate (PEGDA), and combinations thereof. In various instances, the hydrogel comprises polyethylene (glycol) diacrylate (PEGDA), polyacrylamide (PAAm), or combinations thereof.

Exemplary LDHs included in the LDH-gels comprise a compound of formula $Mg_{4-y}AlX_y(OH)_2$ wherein X is $Mn^{+2}$, $Cu^{+2}$, $Zn^{+2}$, or $Fe^{+2}$, and $0.01 \leq y \leq 1$. In some instances, X is $Zn^{+2}$ or $Fe^{+2}$.

In various instances, the LDH-gel comprises more than one LDH comprising a compound of formula $Mg_{4-y}AlX_y(OH)_2$. In various instances, the LDH-gel comprises a first LDH comprising a compound of formula $Mg_{4-y}AlX_y(OH)_2$ where X is $Zn^{+2}$, and a second LDH comprising a compound of formula $Mg_{4-y}AlX_y(OH)_2$ where X is $Fe^{+2}$.

The ratio of the first LDH to the second LDH present in the LDH-gel may be from 100:1 to 1:100 In various instances, the ratio of the first LDH to the second LDH is from 90:1 to 1:90; 80:1 to 1:80; 70:1 to 1:70; 60:1 to 1:60; 50:1 to 1:50; 40:1 to 1:40; 30:1 to 1:30; 20:1 to 1:20; 10:1 to 1:10; 9:1 to 1:9; 8:1 to 1:8; 7:1 to 1:7; 6:1 to 1:6; 5:1 to 1:5; 4:1 to 1:4; 3:1 to 1:3; or 2:1 to 1:2. In various instances, the ratio of the first LDH to the second LDH is no greater than 100:1; no greater than 90:1; no greater than 80:1; no greater than 70:1; no greater than 60:1; no greater than 50:1; no greater than 40:1; no greater than 30:1; no greater than 20:1; no greater than 10:1; no greater than 9:1; no greater than 8:1; no greater than 7:1; no greater than 6:1; no greater than 5:1; no greater than 4:1; no greater than 3:1; no greater than 2:1; no greater than 1:1; no greater than 1:2; no greater than 1:3; no greater than 1:4; no greater than 1:5; no greater than 1:6; no greater than 1:7; no greater than 1:8; no greater than 1:9; no greater than 1:10; no greater than 1:20; no greater than 1:30; no greater than 1:40; no greater than 1:50; no greater than 1:60; no greater than 1:70; no greater than 1:80; no greater than 1:90; or no greater than 1:100. In various instances, the ratio of the first LDH to the second LDH is no less than 1:100; no less than 1:90; no less than 1:80; no less than 1:70; no less than 1:60; no less than 1:50; no less than 1:40; no less than 1:30; no less than 1:20; no less than 1:10; no less than 1:9; no less than 1:8; no less than 1:7; no less than 1:6; no less than 1:5; no less than 1:4; no less than 1:3; no less than 1:2; no less than 1:1; no less than 2:1; no less than 3:1; no less than 4:1; no less than 5:1; no less than 6:1; no less than 7:1; no less than 8:1; no less than 9:1; no less than 10:1; no less than 20:1; no less than 30:1; no less than 40:1; no less than 50:1; no less than 60:1; no less than 70:1; no less than 80:1; no less than 90:1; or no less than 100:1.

Exemplary hydrogel monomers (2-(dimethylamino)ethyl methacrylate (DMAEMA), acrylamide (AAm), and poly (ethylene glycol) diacrylate (PEGDA) (PEGDA having average molecular weight of 575 g/mol) may be used with LDH particles to form LDH-gels via radical polymerization/ crosslinking. These hydrogel monomers are shown below:

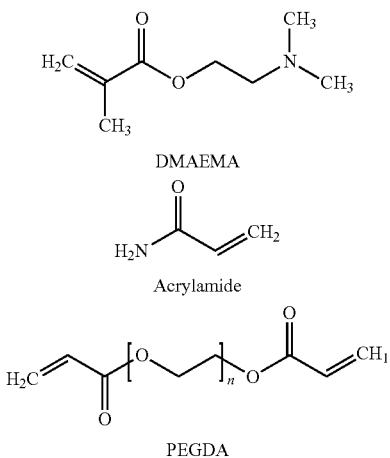

Figure 2B:
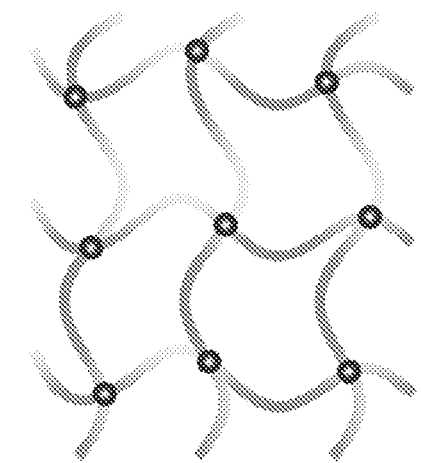
FIG. 2B schematically shows a low crosslinking density polymer network.
Figure 2A:
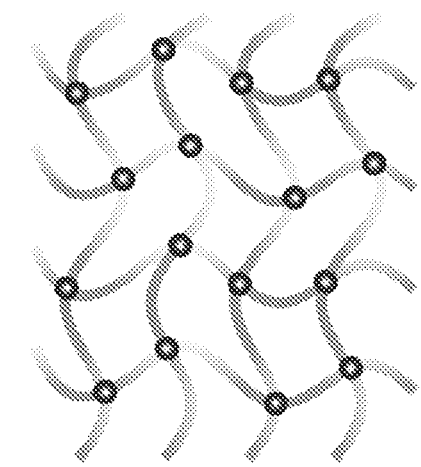
FIG. 2A schematically shows a high crosslinking density polymer network.

As shown in FIG. 2A and FIG. 2B, hydrogels may have high or low crosslinking density. Typically, high crosslinking densities are observed when low mole ratios of monomer to crosslinker (i.e., monomer:crosslinker), e.g., 50:1, are used to prepare the hydrogel. Conversely, low crosslinking densities are observed when high mole ratios of monomer to crosslinker (i.e., monomer:crosslinker), e.g., 1000:1, are used to prepare the hydrogel. The crosslinking density dictates the mechanical and swelling properties, including, but not limited to, ultimate compressive strength ("UCS"), compressive modulus ("modulus"), and swelling ratio.

II. EXEMPLARY METHODS

Exemplary methods can be used to prepare LDH particles and LDH-gels. Various aspects of methods of preparing LDH particles and LDH-gels are described below.

A. Exemplary Methods of Preparing LDH Particles

Exemplary methods of preparing LDH particles may comprise preparing a metal ion solution comprising magnesium chloride ($MgCl_2$), aluminum chloride ($AlCl_3$), and a transition metal chloride ($XCl_2$). In various instances, the transition metal chloride, $XCl_2$, is $MnCl_2$, $CuCl_2$, $ZnCl_2$, or $FeCl_2$. In various instances, the total concentration of metal ions (i.e., $Mg^{+2}$, $Al^{+3}$, and $X^{+2}$ ions) in the solution is 1 molar (1 M). The metal ion solution may be prepared using hydrate salts of $MgCl_2$, $AlCl_3$, and $XCl_2$ (i.e., $MgCl_2 \cdot 6H_2O$, $AlCl_3 \cdot 6H_2O$, and $XCl_2 \cdot 4H_2O$).

Exemplary methods may further comprise adding a 2 molar (2 M) sodium hydroxide (NaOH) solution to the metal ion solution to form a first suspension comprising the LDH particles. Exemplary methods may further comprise adding the 2 M sodium hydroxide (NaOH) solution while stirring the metal ion solution. Alternatively, immediately after adding the 2 M sodium hydroxide (NaOH) solution to the metal ion solution, the first suspension may be stirred.

Exemplary methods may further comprise centrifuging the first suspension. Exemplary methods may further comprise decanting a first supernatant. Alternatively, after exposing the LDH particles to a 2 molar (2 M) sodium hydroxide (NaOH) solution to form the first suspension comprising the LDH particles, exemplary methods may comprise filtering the LDH particles.

Exemplary methods may further comprise exposing the LDH particles to a 2 M sodium carbonate ($Na_2CO_3$) solution to form a second suspension comprising the LDH particles. Exposing the LDH particles to a sodium carbonate ($Na_2CO_3$) solution exchanges carbonate anions ($CO_3^-$) into the LDH particle's interlayer region. Depending on the desired use, LDHs with various interlayer anions may be prepared using a 2 M sodium ($Na^+$) or potassium ($K^+$) salt solution with an appropriate anion (e.g., nitrate ($NO_3^-$), phosphate ($PO_4^{3-}$), chloride ($Cl^-$), fluoride ($F^-$), hydroxide ($OH^-$), or bicarbonate ($HCO_3^-$)). Exemplary methods may further comprise centrifuging the second suspension. Exemplary methods may further comprise decanting a second supernatant. Alternatively, after exposing the LDH particles to a 2 M sodium carbonate ($Na_2CO_3$) solution to form a second suspension comprising the LDH particles, exemplary methods may comprise filtering the LDH particles.

Exemplary methods may further comprise washing the LDH particles. Exemplary washing operations may comprise a series of three different washing operations: a first washing operation, a second washing operation, and a third washing operation. Exemplary first washing operations may comprise washing the LDH particles with a dilute sodium carbonate ($Na_2CO_3$) solution. In some instances, the dilute sodium carbonate ($Na_2CO_3$) solution used during the first washing operation has a concentration of sodium carbonate ($Na_2CO_3$) between 0.01 M and 0.2 M. In various instances, the solution used during the first washing operation has a concentration of sodium carbonate ($Na_2CO_3$) between 0.05 M and 0.2 M; between 0.06 M and 0.19 M; between 0.07 M and 0.18 M; between 0.08 M and 0.17 M; between 0.09 M and 0.16 M; or between 0.10 M and 0.15 M. In various instances, the dilute sodium carbonate ($Na_2CO_3$) solution used during the first washing operation has a concentration of sodium carbonate ($Na_2CO_3$) of no less than 0.01 M; no less than 0.02 M; no less than 0.04 M no less than 0.05 M; no less than 0.06 M; no less than 0.07 M; no less than 0.08 M; no less than 0.09 M; no less than 0.1 M; no less than 0.11 M; no less than 0.12 M; no less than 0.13 M; no less than 0.14 M; no less than 0.15 M; no less than 0.16 M; no less than 0.17 M; no less than 0.18 M; no less than 0.19 M; or no less than 0.2 M. In various instances, the dilute sodium carbonate ($Na_2CO_3$) solution used during the first washing operation has a ratio of sodium carbonate ($Na_2CO_3$) of no greater than 0.2 M; no greater than 0.19 M; no greater than 0.18 M; no greater than 0.17 M; no greater than 0.16 M; no greater than 0.15 M; no greater than 0.14 M; no greater than 0.13 M; no greater than 0.12 M; no greater than 0.13 M; no greater than 0.12 M; no greater than 0.11 M; no greater than 0.1 M; no greater than 0.09 M; no greater than 0.08 M; no greater than 0.07 M; no greater than 0.06 M; no greater than 0.05 M; no greater than 0.04 M; no greater than 0.03 M; no greater than 0.02 M; or no greater than 0.01 M.

Exemplary first operations may comprise agitating the LDH particles during washing. Exemplary agitating operations may be achieved by mechanical means (e.g., shaking) or by sonication. In various instances, agitating the particles during washing may occur for a time period of 5 minutes to 15 minutes. In various instances, agitating the particles during washing may occur for a time period of 6 minutes to 14 minutes; 7 minutes to 13 minutes; 8 minutes to 12 minutes; or 9 minutes to 11 minutes. In various instances, agitating the particles during washing may occur for no greater than 15 minutes; no greater than 14 minutes; no greater than 13 minutes; no greater than 12 minutes; no greater than 11 minutes; no greater than 10 minutes; no greater than 9 minutes; no greater than 8 minutes; no greater than 7 minutes; no greater than 6 minutes; or no greater than 5 minutes. In various instances, agitating the particles during washing may occur for no less than 5 minutes; no less than 6 minutes; no less than 7 minutes; no less than 8 minutes; no less than 9 minutes; no less than 10 minutes; no less than 11 minutes; no less than 12 minutes; no less than 13 minutes; no less than 14 minutes; or no less than 15 minutes.

Exemplary second and third washing steps may each comprise washing the LDH particles with pure water. As used herein, "pure water" means an aqueous liquid comprising no more than 0.001 M sodium carbonate ($Na_2CO_3$). Exemplary second and third washing operations may each comprise agitating the LDH particles during washing. Exemplary agitating operations may be achieved by mechanical means (e.g., shaking) or by sonication. In various instances, agitating the particles during washing may occur for a time period of 5 minutes to 15 minutes. In various instances, agitating the particles during washing may occur for a time period of 6 minutes to 14 minutes; 7 minutes to 13 minutes; 8 minutes to 12 minutes; or 9 minutes to 11 minutes. In various instances, agitating the particles during washing may occur for no greater than 15 minutes; no greater than 14 minutes; no greater than 13 minutes; no greater than 12 minutes; no greater than 11 minutes; no greater than 10 minutes; no greater than 9 minutes; no greater than 8 minutes; no greater than 7 minutes; no greater than 6 minutes; or no greater than 5 minutes. In various instances, agitating the particles during washing may occur for no less than 5 minutes; no less than 6 minutes; no less than 7 minutes; no less than 8 minutes; no less than 9 minutes; no less than 10 minutes; no less than 11 minutes; no less than 12 minutes; no less than 13 minutes; no less than 14 minutes; or no less than 15 minutes.

Exemplary methods may further comprise drying the LDH particles. Exemplary drying methods may comprise drying the LDH particles in a glass container. Exemplary drying methods may comprise drying the LDH particles in the presence of static air or, alternatively, light to moderate passive air flow. In some instances, drying the LDH particles may occur in a drying oven with a passive air vent at the top or at room temperature in a fume hood. In various instances, drying the LDH particles may occur at a temperature ranging from 20° C. to 105° C. In various instances, drying the LDH particles may occur at a temperature ranging from 25° C. to 105° C.; ranging from 30° C. to 100° C.; ranging from 35° C. to 95° C.; ranging from 40° C. to 80° C.; ranging from 45° C. to 75° C.; ranging from 50° C. to 70° C.; ranging from 55° C. to 65° C.; or ranging from ° C. to 60° C. In various instances, drying the LDH particles may occur at a temperature of no greater than 105° C.; no greater than 100° C.; no greater than 95° C.; no greater than 90° C.; no greater than 85° C.; no greater than 80° C.; no greater than 75° C.; no greater than 70° C.; no greater than 65° C.; no greater than 60° C.; no greater than 55° C.; no greater than 50° C.; no greater than 45° C.; no greater than 40° C.; no greater than 35° C.; no greater than 30° C.; no greater than 25° C.; or no greater than 20° C.

In various instances, drying the LDH particles occurs for 12 hours to 48 hours. In various instances, drying the LDH particles occurs for 14 hours to 46 hours; 16 hours to 44 hours; 18 hours to 42 hours; 20 hours to 40 hours; 22 hours to 48 hours; 24 hours to 46 hours; 26 hours to 44 hours; 28 hours to 42 hours; 30 hours to 40 hours; 32 hours to 38 hours; or 34 hours to 36 hours. In various instances, drying the LDH particles occurs for no greater than 48 hours; no greater than 46 hours; no greater than 44 hours; no greater than 42 hours; no greater than 40 hours; no greater than 38 hours; no greater than 36 hours; no greater than 34 hours; no greater than 32 hours; no greater than 30 hours; no greater than 28 hours; no greater than 26 hours; no greater than 24 hours; no greater than 22 hours; no greater than 20 hours; no greater than 18 hours; no greater than 16 hours; no greater than 14 hours; or no greater than 12 hours. In various instances, drying the LDH particles occurs for no less than 12 hours; no less than 14 hours; no less than 16 hours; no less than 18 hours; no less than 20 hours; no less than 22 hours; no less than 24 hours; no less than 26 hours; no less than 28 hours; no less than 30 hours; no less than 32 hours; no less than 34 hours; no less than 36 hours; no less than 38 hours; no less than 40 hours; no less than 42 hours; no less than 44 hours; no less than 46 hours; or no less than 48 hours.

Exemplary methods may further comprise calcining the LDH particles. In various instances, calcining the LDH particles occurs in a borosilicate glass container. Typically, calcining the LDH particles occurs at a temperature of 350° C. to 550° C. In various instances, calcining the LDH particles occurs at a temperature of 360° C. to 540° C.; 370° C. to 530° C.; 380° C. to 520° C.; 390° C. to 510° C.; 400° C. to 500° C.; 410° C. to 490° C.; 420° C. to 480° C.; 430° C. to 470° C.; or 440° C. to 460° C. In various instances, calcining the LDH particles occurs at a temperature of no greater than 550° C.; no greater than 540° C.; no greater than 530° C.; no greater than 520° C.; no greater than 510° C.; no greater than 500° C.; no greater than 490° C.; no greater than 480° C.; no greater than 470° C.; no greater than 460° C.; no greater than 450° C.; no greater than 440° C.; no greater than 430° C.; no greater than 420° C.; no greater than 410° C.; no greater than 400° C.; no greater than 390° C.; no greater than 380° C.; no greater than 370° C.; no greater than 360° C.; or no greater than 350° C. In various instances, calcining the LDH particles occurs at a temperature of no less than 350° C.; no less than 360° C.; no less than 370° C.; no less than 380° C.; no less than 390° C.; no less than 400° C.; no less than 410° C.; no less than 420° C.; no less than 430° C.; no less than 440° C.; no less than 450° C.; no less than 460° C.; no less than 470° C.; no less than 480° C.; no less than 490° C.; no less than 500° C.; no less than 510° C.; no less than 520° C.; no less than 530° C.; no less than 540° C.; or no less than 550° C.

In various instances, calcining may occur for 6 hours to 24 hours. In various instances, calcining occurs for 7 hours to 23 hours; 8 hours to 22 hours; 9 hours to 21 hours; 10 hours to 20 hours; 11 hours to 19 hours; 12 hours to 18 hours; 13 hours to 17 hours; or 14 hours to 16 hours. In various instances, calcining occurs for no greater than 24 hours; no greater than 22 hours; no greater than 20 hours; no greater than 18 hours; no greater than 16 hours; no greater than 14 hours; no greater than 12 hours; no greater than 10 hours; no greater than 8 hours; or no greater than 6 hours. In various instances, no greater than 24 hours; no greater than 22 hours; no greater than 20 hours; no greater than 18 hours; no greater than 16 hours; no greater than 14 hours; no greater than 12 hours; no greater than 10 hours; no greater than 8 hours; or no greater than 6 hours. In various instances, calcining may occur for no less 6 hours; no less than 8 hours; no less than 10 hours; no less than 8 hours; or no less than 6 hours.

B. Exemplary Methods of Making LDH-Gels

Exemplary methods of making LDH-gels of the present disclosure may comprise forming a mixture comprising a monomer, a crosslinker, a catalyst, and LDH particles. In various instances, methods of making LDH-gels may comprise forming the mixture in water. Exemplary methods may further comprise adding the water to an oil to form a water-in-oil emulsion. The oil may comprise paraffin oil. In some instances, acrylamide (AAm) is the monomer. In other instances, polyethylene (glycol) diacrylate (PEGDA) having an average molecular weight of 575 g/mol is the monomer. In various instances N,N'-methylenebisacrylamide (MBA) is the crosslinker. In various instances, N,N,N',N'-tetramethylethylenediamine (TEMED) is the catalyst.

In exemplary mixtures, the mole ratio of the monomer to the crosslinker may be 50:1 to 1000:1. In various instances, the mole ratio of the monomer to the crosslinker (i.e., monomer:crosslinker) may be 100:1 to 1000:1; 150:1 to 950:1; 200:1 to 900:1; 250:1 to 850:1; 300:1 to 800:1; 350:1 to 750:1; 400:1 to 700:1; 450:1 to 650:1; or 500:1 to 600:1. In various instances, the mole ratio of monomer to crosslinker may be no greater than 1000:1; no greater than 950:1; no greater than 900:1; no greater than 850:1; no greater than 800:1; no greater than 750:1; no greater than 700:1; no greater than 600:1; no greater than 550:1; no greater than 500:1; no greater than 450:1; no greater than 400:1; no greater than 350:1; no greater than 300:1; no greater than 250:1; no greater than 200:1; no greater than 150:1; no greater than 100:1; or no greater than 50:1. In various instances, the mole ratio of monomer to crosslinker may be no less than 50:1; no less than 100:1; no less than 150:1; no less than 200:1; no less than 250:1; no less than 300:1; no less than 350:1; no less than 400:1; no less than 450:1; no less than 500:1; no less than 550:1; no less than 600:1; no less than 650:1; no less than 700:1; no less than 750:1; no less than 800:1; no less than 850:1; no less than 950:1; or no less than 1000:1.

Exemplary methods may further comprise adding an initiator to the mixture comprising the monomer, the crosslinker, the catalyst, and the LDH particles, while stirring the mixture. In various instances ammonium persulfate (APS) is the initiator. Exemplary methods may further comprise allowing the mixture to form a solid. Exemplary methods may further comprise washing the solid. Exemplary washing operations may comprise letting the solids sit in pure water for 7 to 21 days. In various instances, washing operations may comprise letting the solids sit in pure water for 8 to 20 days; 9 to 19 days; 10 to 18 days; 11 to 17 days; 12 to 16 days; or 13 to 15 days. In various instances, washing operations may comprise letting the solids sit in pure water for no greater than 21 days; no greater than 20 days; no greater than 19 days; no greater than 18 days; no greater than 17 days; no greater than 16 days; no greater than 15 days; no greater than 14 days; no greater than 13 days; no greater than 12 days; no greater than 11 days; no greater than 10 days; no greater than 9 days; no greater than 8 days; or no greater than 7 days. In various instances, washing operations may comprise letting the solids sit in pure water for no less than 7 days; no less than 8 days; no less than 9 days; no less than 10 days; no less than 11 days; no less than 12 days; no less than 13 days; no less than 14 days; no less than 15 days; no less than 16 days; no less than 17 days; no less than 18 days; no less than 19 days; no less than 20 days; or no less than 21 days. In various instances, washing may further comprise replacing the pure water with fresh pure water at the end of each day (i.e., every 24 hours) for 7 to 21 days.

C. Exemplary Methods of Making Filters Comprising LDH-Gels

Exemplary filters comprising LDH-gels of the present disclosure may be manufactured using methods known to those of skill in the art. Exemplary filters may be constructed in various ways depending on the specific filter and intended use for said filter.

III. EXEMPLARY APPLICATIONS

Exemplary LDHs and/or LDH-gels may be incorporated into a filtration unit, such as a single-use filter. Exemplary LDHs and/or LDH-gels may be contained in standard rigid housing, for example polyvinyl chloride (PVC), in a variety of forms, including cylindrical columns. In some instances, LDHs and/or LDH-gels may be contained inside of standard flexible housings, for example nylon or burlap sacks/socks. In some instances, LDHs and/or LDH-gels may be included in filters with media bed configurations, as either a discrete layer or mixed with other media/fillers, for example, in a bioretention filter, as a soil amendment in bioretention systems, mixed with sand, gravel, compost, dirt, and/or other soils, including bioretention soils. Relative amounts of the different types of LDHs disclosed herein may be selected to achieve target nutrient removal.

IV. EXPERIMENTAL EXAMPLES

Without limiting the scope of the instant disclosure, various experimental examples of embodiments discussed above were prepared and results are discussed below.

Example 1: Preparation of Exemplary LDH Particles 1 molar (1 M) metal ion solutions A, B, and C were prepared by mixing 1 M solutions of the appropriate metal salt hydrates in the desired ratio. As shown below, each 1 M metal ion solution has a total volume of ~20 mL.

A. $Mg_{3.8}AlFe_{0.2}$
  15.2 mL of 1 M $MgCl_2 \cdot 6H_2O$
  4.0 mL of 1 M $AlCl_3 \cdot 6H_2O$
  0.8 mL of 1 M $FeCl_2 \cdot 4H_2O$ B. $Mg_{3.6}AlFe_{0.4}$
  14.4 mL of 1 M $MgCl_2 \cdot 6H_2O$
  4.0 mL of 1 M $AlCl_3 \cdot 6H_2O$
  1.6 mL of 1 M $FeCl_2 \cdot 4H_2O$ C. $Mg_3AlFe$
  12.0 mL of 1 M $MgCl_2 \cdot 6H_2O$
  4.0 mL of 1 M $AlCl_3 \cdot 6H_2O$
  4.0 mL of 1 M $FeCl_2 \cdot 4H_2O$ To each of metal ion solutions A, B, and C, an equal volume (~20 mL) of a 2 M NaOH solution was added with stirring to form LDH particles A, B, and C, respectively.

| | |
|---|---|
| A. $Mg_{3.8}AlFe_{0.2}(OH)_2$ | (i.e., "Fe-5" or "$Mg_{3.8}AlFe_{0.2}$ LDH") |
| B. $Mg_{3.6}AlFe_{0.4}(OH)_2$ | (i.e., "Fe-10" or "$Mg_{3.6}AlFe_{0.4}$ LDH") |
| C. $Mg_3AlFe(OH)_2$ | (i.e., "Fe-25" or "$Mg_3AlFe$ LDH") |

The LDH particles were then removed from the suspension by centrifuging and decanting the supernatant. Next, the LDH particles were exposed to a 2 M sodium carbonate ($Na_2CO_3$) solution. The LDH particles were sonicated in the 2 M $Na_2CO_3$ solution for about 10 minutes. The LDH particles were then removed from the suspension by centrifuging and decanting the supernatant.

The LDH particles were then washed with a 0.1 M sodium carbonate ($Na_2CO_3$) solution. For the 0.1 M $Na_2CO_3$ wash, the LDH particles were sonicated in the 0.1 M $Na_2CO_3$ solution for about 10 minutes. The LDH particles were then removed from the suspension by centrifuging and decanting the supernatant. The LDH particles were then washed two times with pure water. For each pure water wash, the LDH particles were sonicated in the pure water for about 10 minutes. The LDH particles were then removed from the suspension by centrifuging and decanting the supernatant. After washing, the LDH particles were collected in a glass dish and dried overnight (~12 hours) at 105° C. After drying, the LDH particles were calcined in a borosilicate glass container at 500° C. for about 6 hours.

The foregoing process was repeated, replacing $Fe^{+2}$ with $Zn^{+2}$, $Cu^{+2}$, and $Mn^{+2}$ to produce LDH particles D-L, shown below.

| | |
|---|---|
| D. $Mg_{3.8}AlZn_{0.2}(OH)_2$ | ("Zn-5" or "$Mg_{3.8}AlZn_{0.2}$ LDH") |
| E. $Mg_{3.6}AlZn_{0.4}(OH)_2$ | ("Zn-10" or "$Mg_{3.6}AlZn_{0.4}$ LDH") |
| F. $Mg_3AlZn(OH)_2$ | ("Zn-25" or "$Mg_3AlZn$ LDH") |
| G. $Mg_{3.8}AlCu_{0.2}(OH)_2$ | ("Cu-5" or "$Mg_{3.8}AlCu_{0.2}$ LDH") |
| H. $Mg_{3.6}AlCu_{0.4}(OH)_2$ | ("Cu-10" or "$Mg_{3.6}AlCu_{0.4}$ LDH") |
| I. $Mg_3AlCu(OH)_2$ | ("Cu-25" or "$Mg_3AlCu$ LDH") |
| J. $Mg_{3.8}AlMn_{0.2}(OH)_2$ | ("Mn-5" or "$Mg_{3.8}AlMn_{0.2}$ LDH") |
| K. $Mg_{3.6}AlMn_{0.4}(OH)_2$ | ("Mn-10" or "$Mg_{3.6}AlMn_{0.4}$ LDH") |
| L. $Mg_3AlMn(OH)_2$ | ("Mn-25" or "$Mg_3AlMn$ LDH") |

Example 2: X-Ray Powder Diffraction (XRD) and X-Ray Photoelectron Spectroscopy (XPS) of Exemplary LDH Particles The LDHs of Example 1, and the parent LDH ($Mg_4Al$ LDH), were investigated using X-ray powder diffraction (XRD) and X-ray photoelectron spectroscopy (XPS). Both calcined and non-calcined LDHs were investigated.

Figures 3A, 3B:
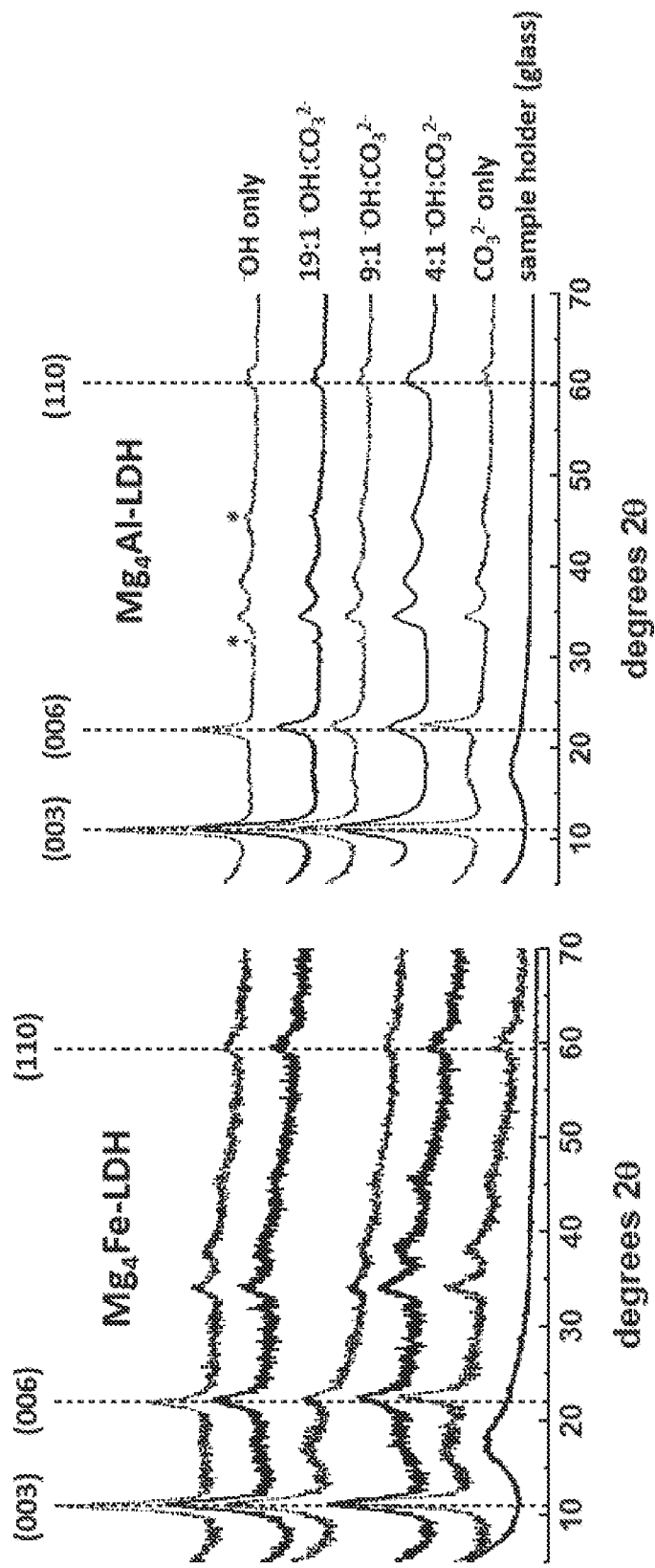
FIG. 3A shows the X-ray powder diffraction (XRD) pattern of an exemplary $Mg_4Fe$ LDH.
FIG. 3B shows the X-ray powder diffraction (XRD) pattern of an exemplary $Mg_4Al$ LDH.

As shown in FIGS. 3A-3B, the interlayer spacing of the LDH structure, as observed via X-ray powder diffraction (XRD), can shift when the ratio of the hydroxide ($OH^-$): carbonate ($CO_3^-$) anions in the co-precipitation solution is modified. The shift in the positions of the 003 and 006 peaks indicate the change in interlayer spacing.

Figure 4B:
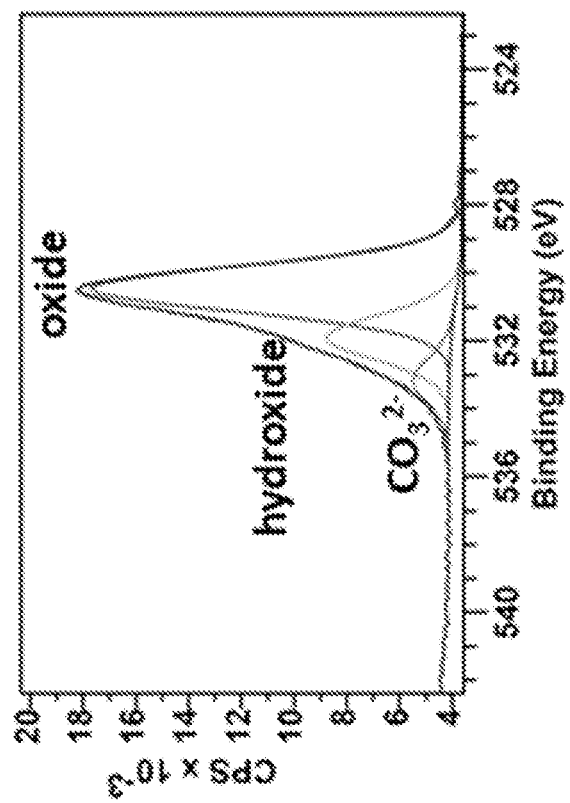
FIG. 4B shows the XPS O 1s spectrum for an exemplary calcined $Mg_4Al$ LDH.
Figure 4A:
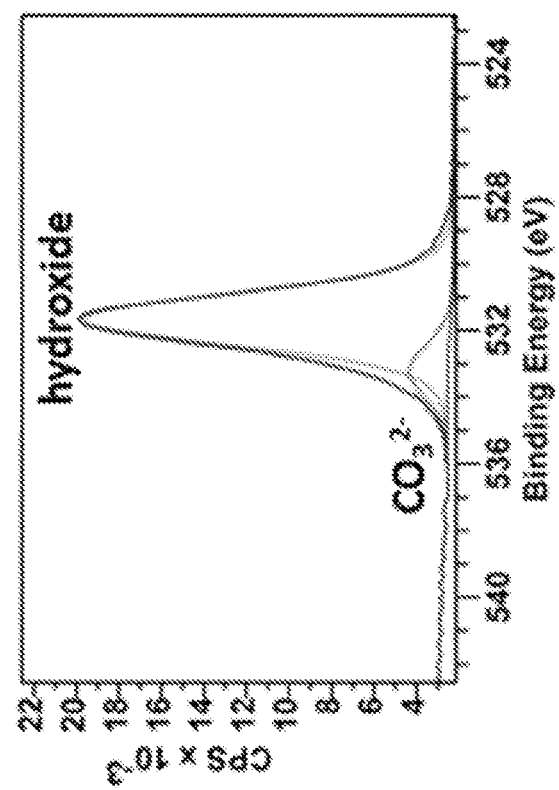
FIG. 4A shows the XPS O 1s spectrum for an exemplary as-synthesized $Mg_4Al$ LDH.
Figure 5A:
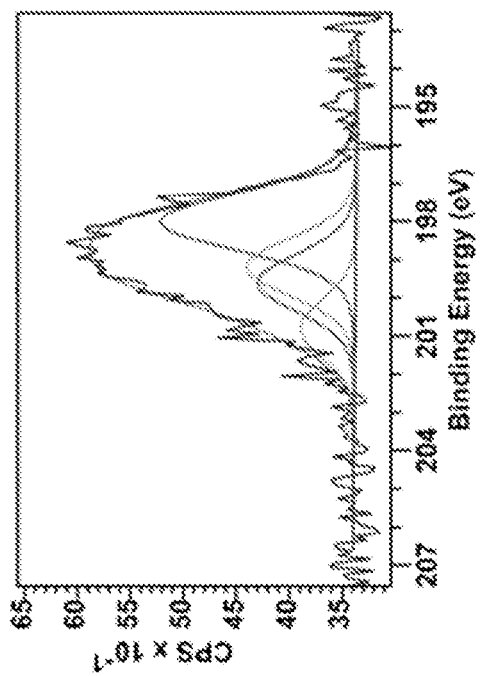
FIG. 5A shows the C 1s peaks in the XPS spectrum of the $Mg_4Al$ LDH when an exemplary LDH is only precipitated with carbonate ($CO_3^-$) anions.
Figure 5B:
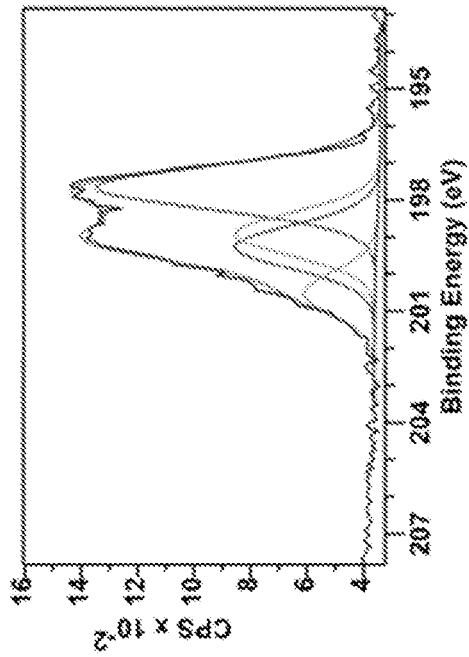
FIG. 5B shows the Cl 2p peaks in the XPS spectrum of the $Mg_4Al$ LDH when an exemplary LDH is only precipitated with carbonate ($CO_3^-$) anions.
Figure 5C:
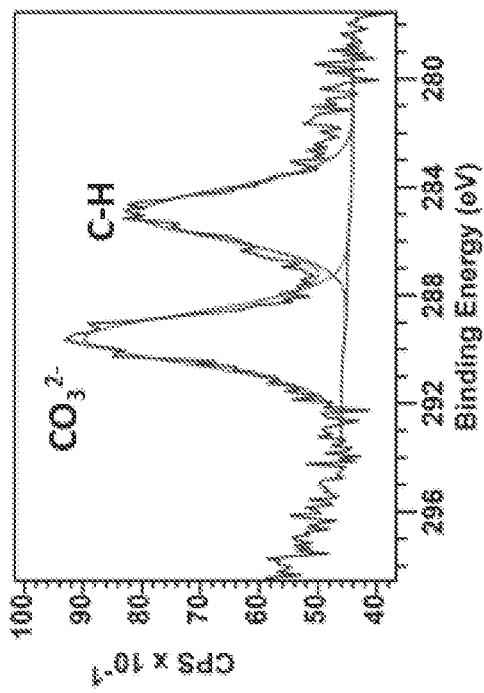
FIG. 5C shows the C 1s peaks in the XPS spectrum of the $Mg_4Al$ LDH when an exemplary LDH is precipitated in the presence of only hydroxide ($OH^-$) anions.
Figure 5D:
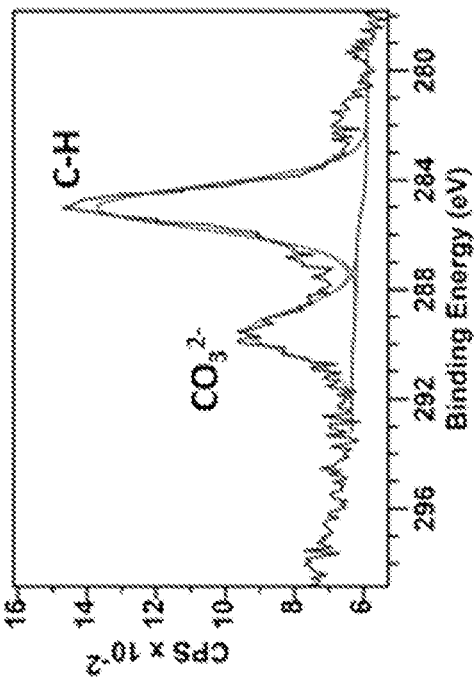
FIG. 5D shows the Cl 2p peaks in the XPS spectrum of the $Mg_4Al$ LDH when an exemplary LDH is precipitated in the presence of only hydroxide ($OH^-$) anions.
Figure 6B:
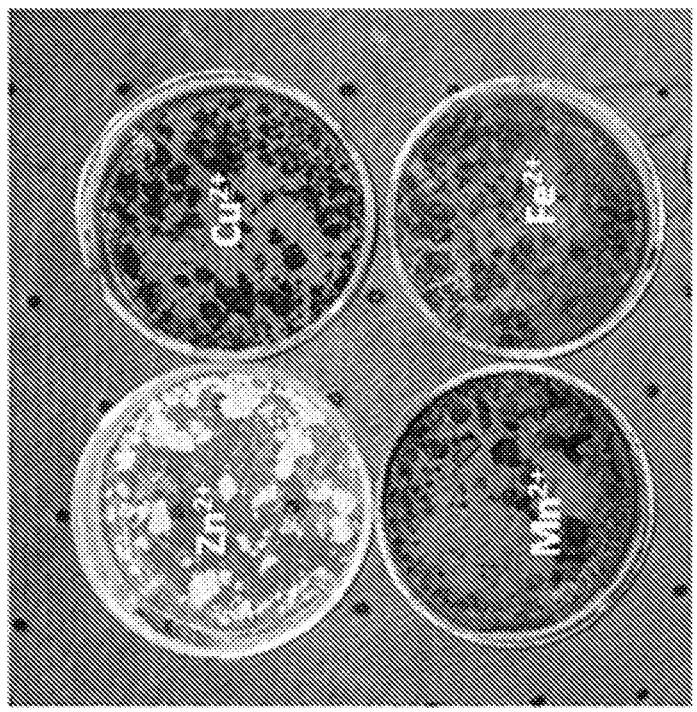
FIG. 6B is a photograph of the freshly precipitated $Mg_3AlX$ LDHs of FIG. 6A, after drying at a drying temperature of 105° C.
Figure 6A:
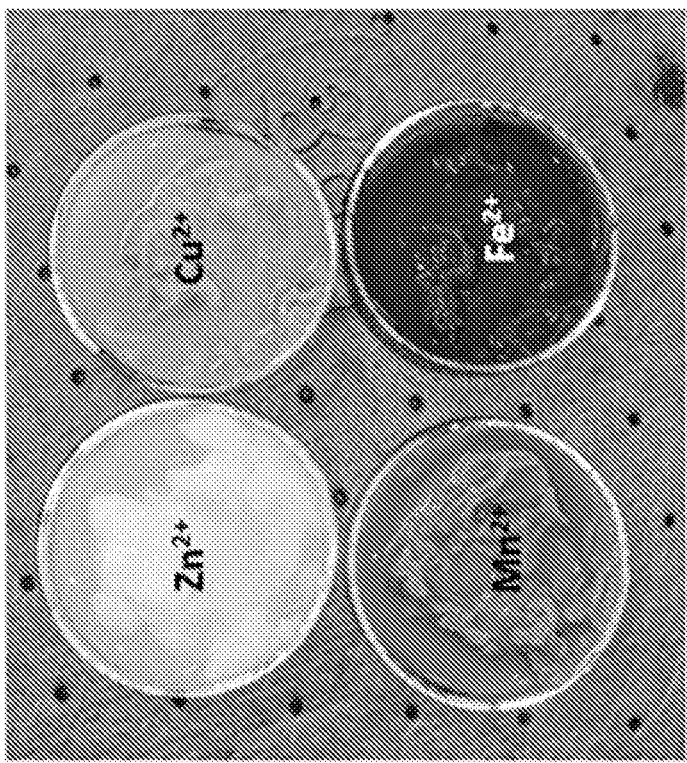
FIG. 6A is a photograph of exemplary freshly precipitated $Mg_3AlX$ LDHs where $X=Zn^{+2}$, $Cu^{+2}$, $Mn^{+2}$, and $Fe^{+2}$, before drying.

As shown in the X-ray photoelectron spectra (XPS) of FIGS. 4A-4B, upon calcining $Mg_4Al$ LDH, hydroxide (LDH) is converted to oxide.

FIGS. 5A-5D illustrate, via X-ray photoelectron spectra (XPS) of $Mg_4Al$ LDH, that precipitation of the LDH exclusively in the presence of carbonate ions ($CO_3^-$) displaces more chloride ions than precipitation of the LDH exclusively in the presence of hydroxide ions (OW).

Figure 7:
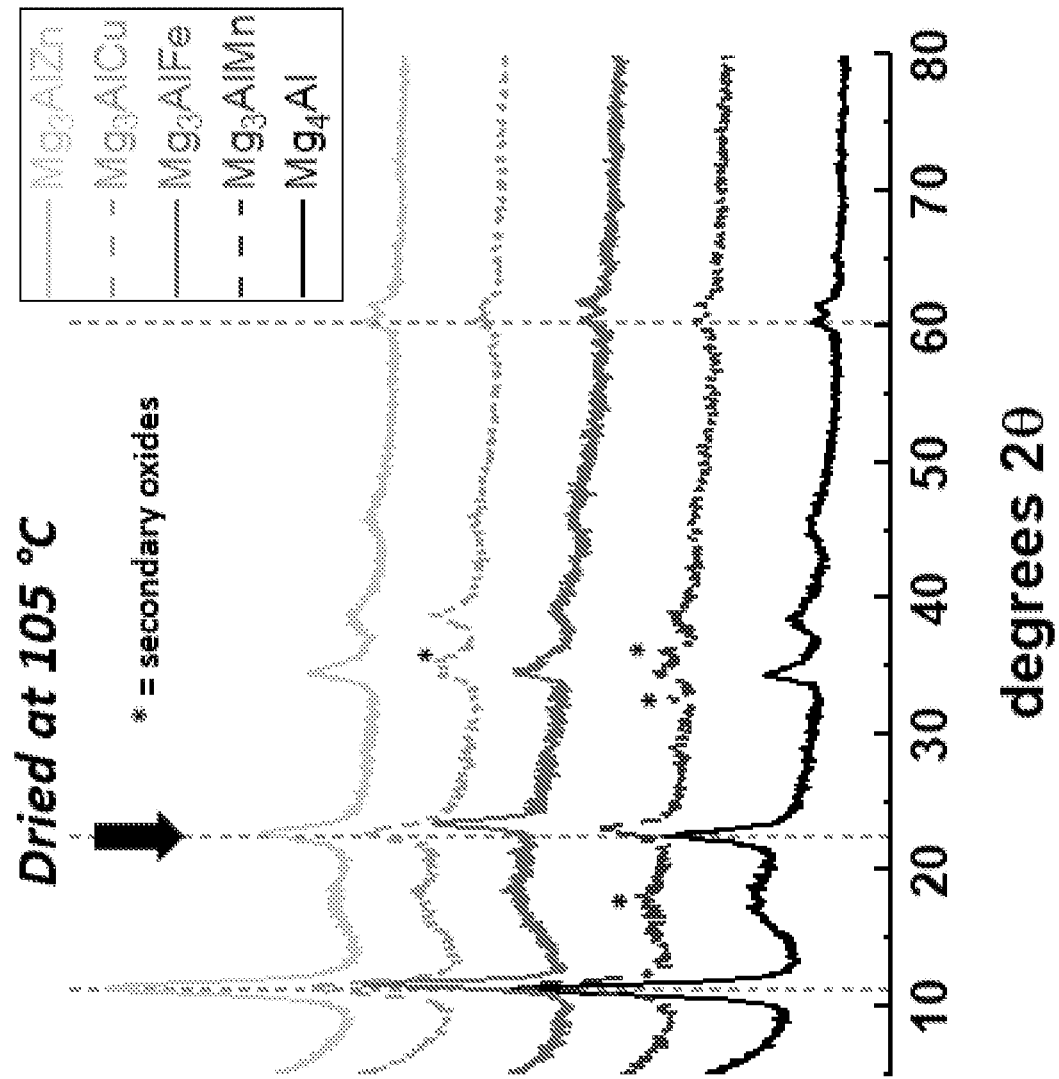
FIG. 7 shows the XRD patterns of $Mg_3AlX$ LDHs where $X=Zn^{+2}$, $Cu^{+2}$, $Mn^{+2}$, and $Fe^{+2}$, after drying (drying temperature=105° C.). Asterisks (*) indicate secondary oxide phases (e.g., manganese (II, III) oxide ($Mn_3O_4$) and copper (II) oxide (CuO)).
Figure 8:
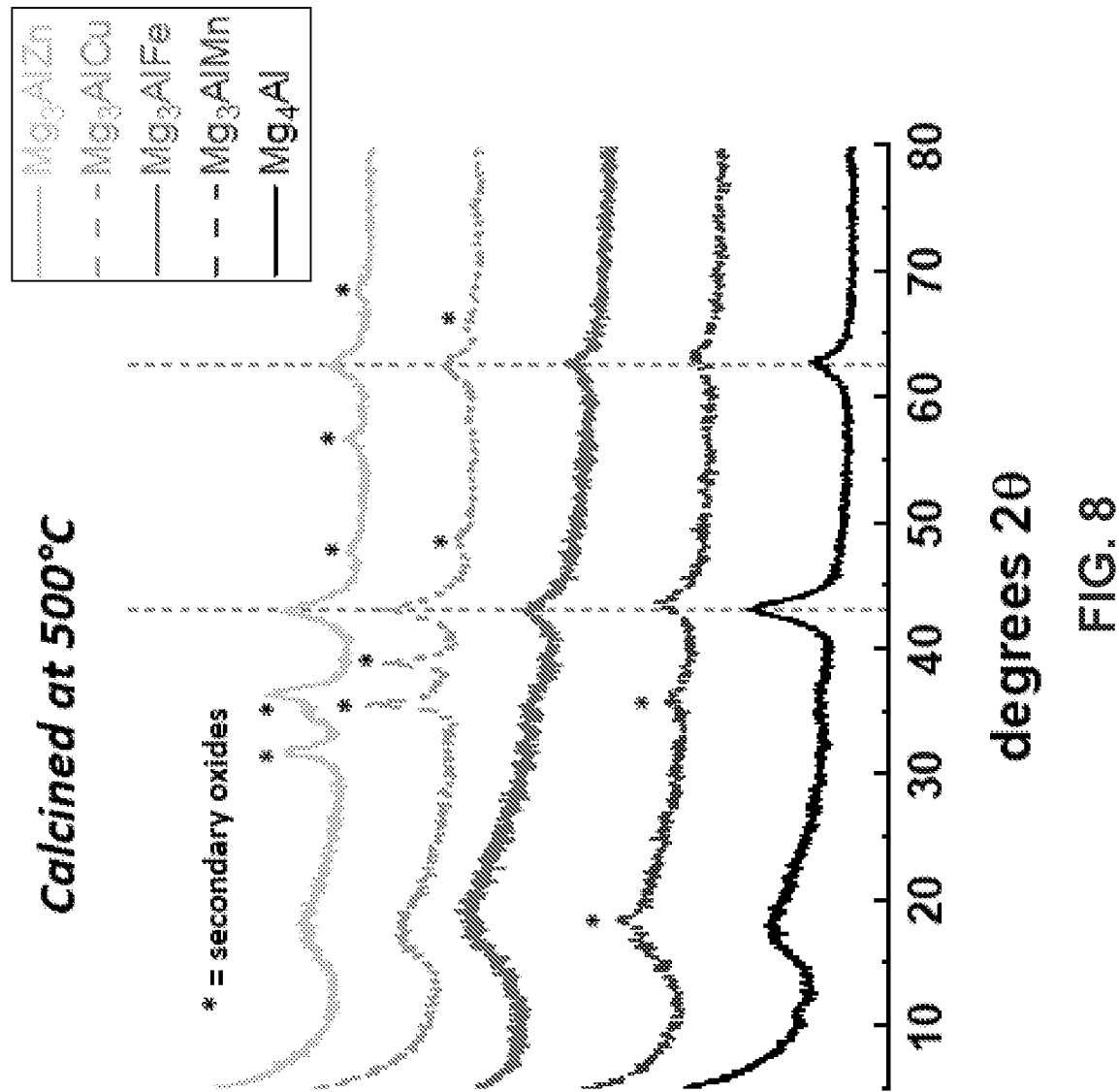
FIG. 8 shows the XRD patterns of exemplary $Mg_3AlX$ LDHs where $X=Zn^{+2}$, $Cu^{+2}$, $Mn^{+2}$, and $Fe^{+2}$, post-calcination (calcining temperature=500° C.). Asterisks (*) indicate secondary oxide phases.
Figure 9B:
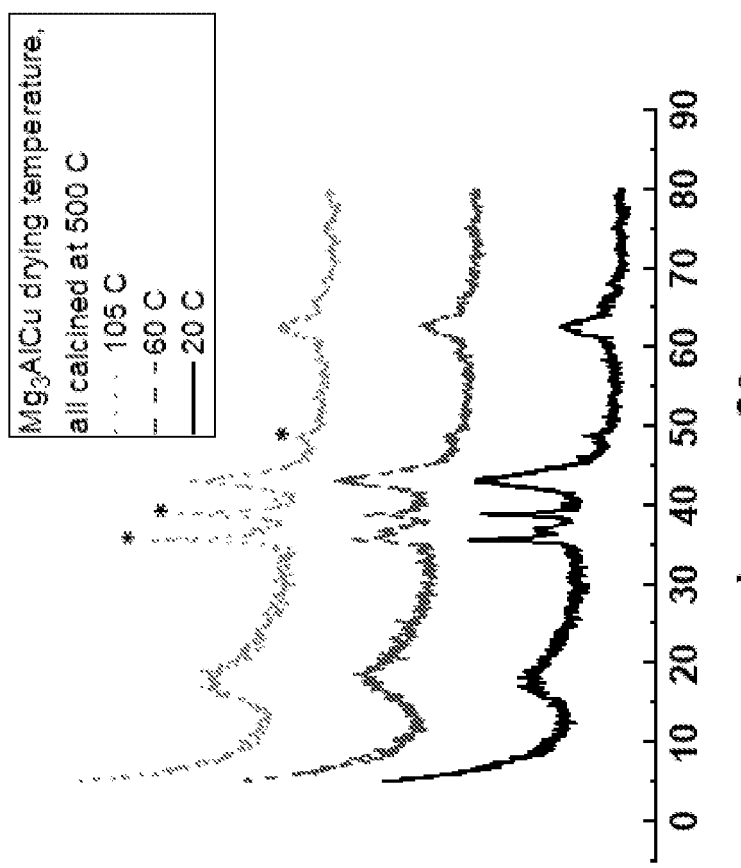
FIG. 9B shows the XRD patterns of $Mg_3AlCu$ LDHs dried at the various drying temperatures (20° C., 60° C., and 105° C.), followed by calcination at 500° C. for 6 hours. Asterisks (*) indicate secondary oxide phases.
Figure 9A:
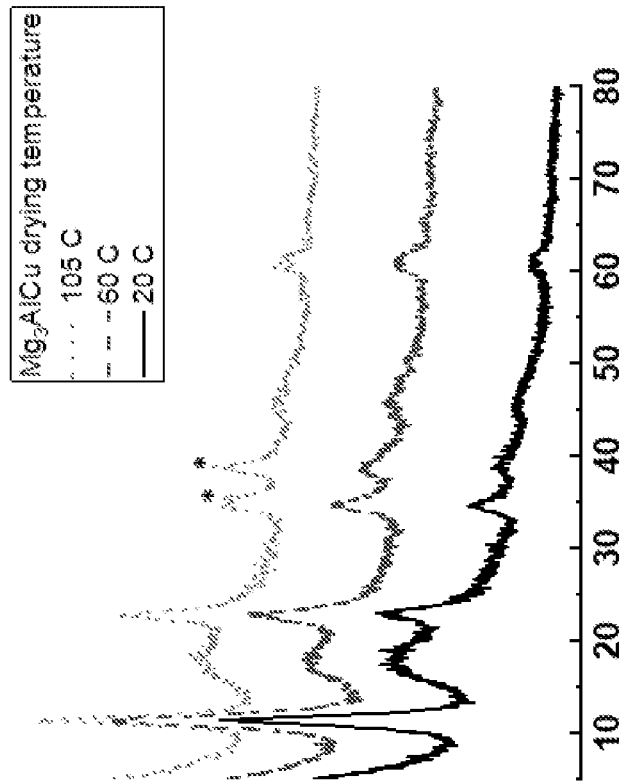
FIG. 9A shows the XRD pattern of $Mg_3AlCu$ LDH samples after drying at various drying temperatures (20° C., 60° C., and 105° C.). Asterisks (*) indicate secondary oxide phases.

FIG. 7 shows the XRD patterns of $Mg_3AlX$ LDHs where $X=Zn^{+2}$, $Cu^{+2}$, $Mn^{+2}$, and $Fe^{+2}$, after drying (drying temperature=105° C.). The shift in the 006 peak (arrow) indicates that the substituted metal, $X^{+2}$, is integrated into the LDH structure. The overlayed XRD patterns for the $Mg_3AlX$ LDHs illustrate that the interlayer spacing shifts when the substituted metal, $X^{+2}$, is changed. The Fe-5 ($Mg_{3.8}AlFe_{0.2}$) LDH and the Mn-25 ($Mg_3AlMn$) LDH have the smallest interlayer spacings.

Figure 11:
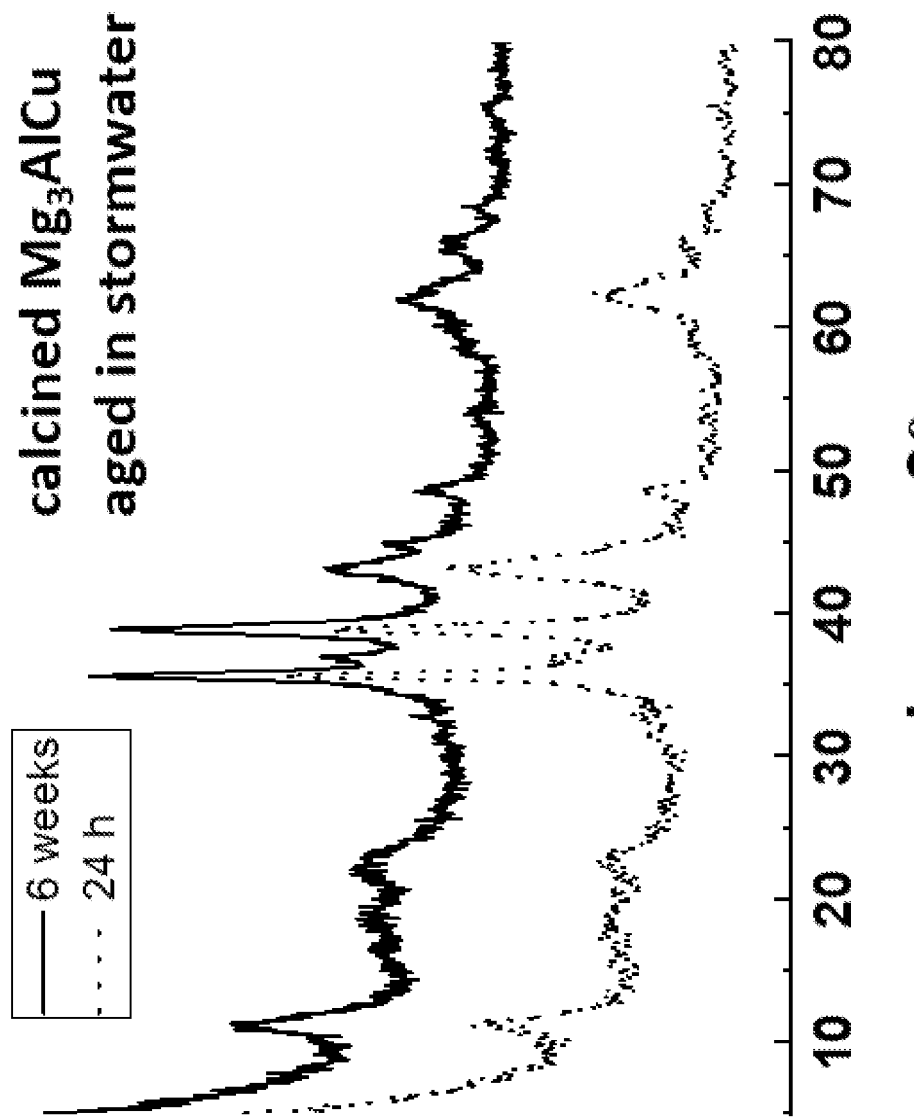
FIG. 11 shows the XRD patterns for calcined exemplary $Mg_3AlCu$ LDH samples aged in stormwater for a time period of 24 hours and 6 weeks.
Figures 12A, 12B:
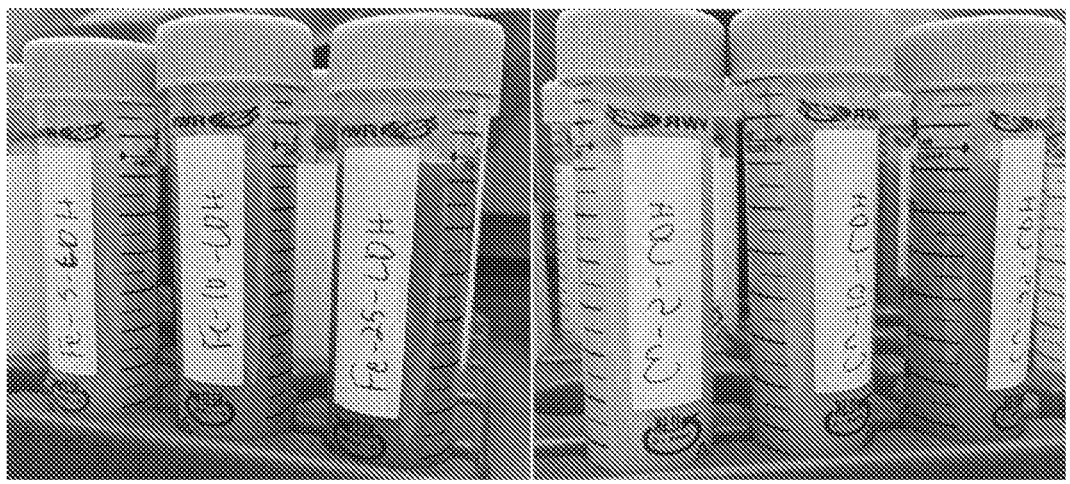
FIG. 12A is a photograph of various freshly precipitated exemplary $Mg_{4-y}AlX_y$ LDHs, where $X=Fe^{*2}$ and y is 0.2, 0.4, and 1 (Fe-5, Fe-10, and Fe-25 respectively).
FIG. 12B is a photograph of various freshly precipitated exemplary $Mg_{4-y}AlX_y$ LDHs, where $X=Cu^{+2}$ and y is 0.2, 0.4, and 1 (Cu-5, Cu-10, and Cu-25 respectively).
Figure 12C:
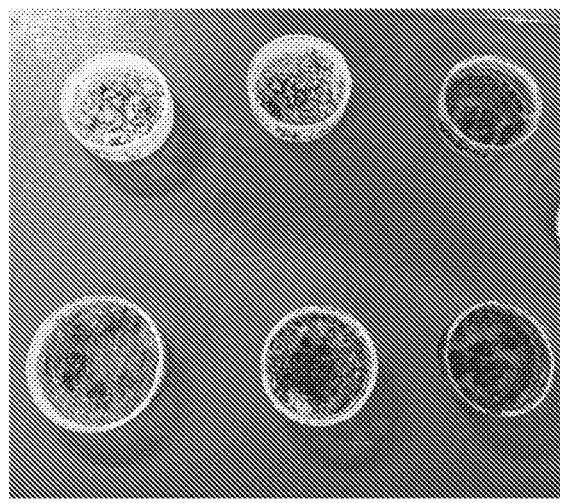
FIG. 12C is a photograph of exemplary $Mg_{4-y}AlX_y$ LDHs post-drying at 105° C., where $X=Fe^{+2}$ (top) and $Cu^{+2}$ (bottom) and y is 0.2, 0.4, and 1 (right to left).
Figures 12D, 12E:
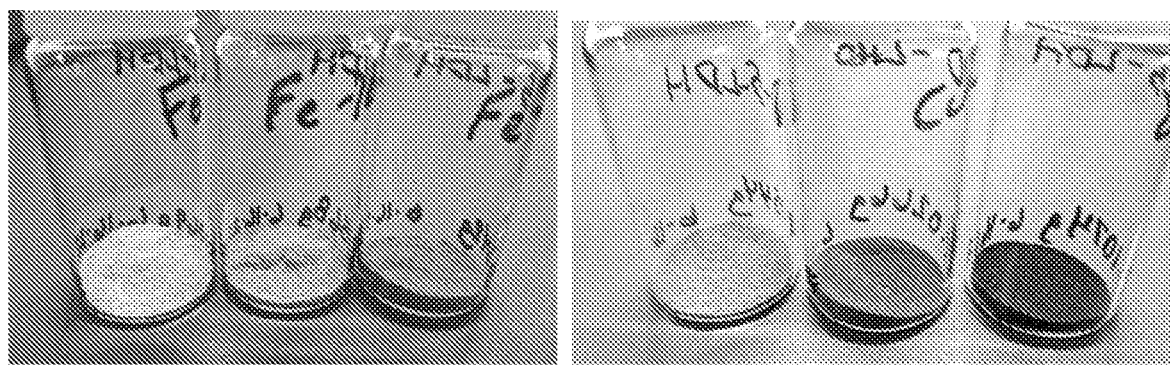
FIG. 12D is a photograph of exemplary $Mg_{4-y}AlX_y$ LDHs post calcining at 500° C., where $X=Fe^{+2}$ and y is 0.2, 0.4, and 1 (left to right).
FIG. 12E is a photograph of exemplary $Mg_{4-y}AlX_y$ LDHs post calcining at 500° C., where $X=Cu^{+2}$ and y is 0.2, 0.4, and 1 (left to right).

FIGS. 10A-10B illustrate the absence of a memory effect for $Mg_3AlCu$ LDHs. For LDH samples which show the memory effect, the calcined structure converts back to the as-synthesized LDH layered structure. This memory effect conversion appears as a simultaneous increase in the size of the peak near 11°2θ and a decrease in the size of the peak near 44°2θ. As shown in FIG. 10A, for the calcined $Mg_3AlCu$ LDH sample, the size of the 44°2θ peak decreases, but the peak near 11°2θ does not change in size, indicating a lack of memory effect. As shown in FIG. 10B, for the calcined $Mg_4Al$ sample, the size of the 44°2θ peak decreases and the peak near 11°2θ increases, indicating a memory effect. Furthermore, as shown in FIG. 11, the absence of any new or increasing peaks near 11°2θ in the 6-weeks aged $Mg_3AlCu$ sample indicates that only a small amount of the calcined $Mg_3AlCu$ LDH material has converted to an amorphous phase.

As shown in FIG. 13A, for the XRD patterns of calcined $Mg_{4-y}AlX_y$ LDHs, where $X=Cu^{+2}$ and y is 0.2 (Cu-5), 0.4 (Cu-10), and 1 (Cu-25), secondary oxides are present in the XRD pattern of Cu-25, but not in Cu-5 or Cu-10. As shown in FIG. 13B, for the XRD patterns of calcined $Mg_{4-y}AlX_y$ LDHs, where $X=Zn^{+2}$ and y is 0.2 (Zn-5), 0.4 (Zn-10), and 1 (Zn-25), secondary oxides are present in Zn-5, Zn-10, and Zn-25, however, as y (the amount of $Zn^{+2}$) decreases, the amount of secondary oxide also decreases.

Example 3: Testing Exemplary LDH Particles

The LDHs of Example 1, and the parent LDH ($Mg_4Al$ LDH), were assessed regarding total nitrogen (total N or TN), total phosphorous (total P or TP), and nitrate ($NO_3^-$) removal in stormwater. Both calcined and non-calcined LDHs were investigated. The results are summarized in Tables 1-16 below. In general, all LDHs showed capability for P removal from real, spiked, and synthetic stormwater.

LDHs and calcined LDHs with the formula $Mg_{4-y}AlX_y$ where $X=Fe^{2+}$ showed strong performance for P removal on short time scales (≤10 min). Generally, calcined LDHs showed strong performance for nitrate ($NO_3^-$) removal. For instance, calcined LDHs with the formula $Mg_{4-y}AlX_y$ where $X=Zn^{2+}$ or $Cu^{2+}$ and where y≤0.4 showed strong performance for $NO_3^-$ removal on short time scales (≤10 min).

Tables 1 and 2 show performance data for testing with real stormwater having a lower initial concentration of total N (2.5 ppm). As used herein, "real stormwater" is stormwater collected from the environment (N and P concentrations not altered). In these experiments, the $Mg_4Fe$ LDH showed strong performance for total P removal.

TABLE 1

Total N removal from 150 mL of real stormwater by calcined LDHs.

| calcined LDH | mass (g) | interlayer anion | total N (ppm) 5 min | 72 h | total N % removal 5 min | 72 h |
|---|---|---|---|---|---|---|
| $Mg_4Al$ | 0.1506 | $OH^-$ | 1.3 | 1.0 | 48% | 60% |
| $Mg_4Al$ | 0.1499 | $CO_3^{2-}$ | 1.8 | 1.4 | 28% | 44% |
| $Mg_4Fe$ | 0.1509 | $CO_3^{2-}$ | 1.4 | 0.9 | 44% | 64% |
| initial concentration | | | 2.5 | | — | |

TABLE 2

Total P removal from 150 mL of real stormwater by calcined LDHs.

| calcined LDH | mass (g) | interlayer anion | total P (ppm) 5 min | 1 h | 72 h | total P % removal 5 min | 1 h | 72 h |
|---|---|---|---|---|---|---|---|---|
| Mg$_4$Al | 0.1506 | OH$^-$ | 0.98 | 0.78 | 0.05 | 10% | 28% | 96% |
| Mg$_4$Al | 0.1499 | CO$_3^{2-}$ | 1.04 | 0.64 | 0.03 | 5% | 41% | 97% |
| Mg$_4$Fe | 0.1509 | CO$_3^{2-}$ | 0.86 | 0.68 | 0.03 | 21% | 37% | 97% |
| initial concentration | | | | 1.09 | | | — | |

Tables 3 and 4 show performance data for testing with real stormwater having a more typical initial concentration of total N (6.9 ppm). In these experiments, again, the Mg$_4$Fe LDH showed strong performance for total P removal.

TABLE 3

Total N removal from 150 mL of real stormwater by calcined LDHs.

| calcined LDH | mass (g) | interlayer anion | total N (ppm) 5 min | 72 h | total N % removal 5 min | 72 h |
|---|---|---|---|---|---|---|
| Mg$_4$Al | 0.1508 | OH$^-$ | 6.9 | 3.7 | 0% | 46% |
| Mg$_4$Al | 0.1516 | CO$_3^{2-}$ | 6.4 | 3.7 | 7% | 46% |
| Mg$_4$Fe | 0.1504 | CO$_3^{2-}$ | 6.0 | 3.0 | 13% | 57% |
| initial concentration | | | | 6.9 | | — |

TABLE 4

Total P removal from 150 mL of real stormwater by calcined LDHs.

| calcined LDH | mass (g) | interlayer anion | total P (ppm) 5 min | 1 h | 72 h | total P % removal 5 min | 1 h | 72 h |
|---|---|---|---|---|---|---|---|---|
| Mg$_4$Al | 0.1508 | OH$^-$ | 1.18 | 0.93 | 0.17 | 7% | 27% | 86% |
| Mg$_4$Al | 0.1516 | CO$_3^{2-}$ | 0.99 | 0.95 | 0.09 | 22% | 25% | 93% |
| Mg$_4$Fe | 0.1504 | CO$_3^{2-}$ | 1.05 | 1.00 | 0.06 | 17% | 21% | 96% |
| initial concentration | | | | 1.28 | | | — | |

Table 5 shows total P removal performance data for substituted Mg$_3$AlX LDHs. The calcined Mg$_3$AlFe LDH showed strong performance for total P removal at all time scales.

TABLE 5

Total P removal from 150 mL of real stormwater by substituted Mg$_3$AlX LDHs.

| calcined LDH | mass (g) | drying T (° C.) | calcined at 500° C. | total P (ppm) 5 min | 10 min | 72 h | total P % removal 5 min | 10 min | 72 h |
|---|---|---|---|---|---|---|---|---|---|
| Mg$_4$Al | 0.1517 | 105 | yes | 0.95 | 0.83 | 0.16 | 7% | 19% | 84% |
| Mg$_3$AlMn | 0.1496 | 105 | yes | 0.87 | 0.83 | 0.12 | 15% | 19% | 88% |
| Mg$_3$AlZn | 0.1503 | 105 | yes | 0.94 | 0.98 | 0.34 | 8% | 4% | 67% |
| Mg$_3$AlFe | 0.1501 | 105 | yes | 0.60 | 0.45 | 0.02 | 41% | 56% | 98% |
| Mg$_3$AlCu | 0.1510 | 105 | yes | 1.00 | 1.10 | 0.66 | 1% | −8% | 36% |
| Mg$_3$AlCu | 0.1496 | 105 | no | 0.96 | 0.98 | 0.50 | 6% | 3% | 51% |
| Mg$_3$AlCu | 0.1500 | 20 | no | 0.90 | 0.76 | 0.02 | 11% | 25% | 98% |
| initial concentration | | | | | 1.02 | | | — | |

Table 6 shows total P removal performance data for calcined, substituted Mg$_3$AlX LDHs. In this experiment, the real stormwater was spiked with Na$_2$HPO$_4$ to increase the total P concentration to ~1 ppm. Again, the calcined Mg$_3$AlFe LDH showed strong performance for total P removal at all time scales.

TABLE 6

Total P removal from 150 mL of spiked stormwater by calcined, substituted Mg$_3$AlX LDHs.

| X metal substitution | mass (g) | total P (ppm) 5 min | 10 min | 24 h | total P % removal 5 min | 10 min | 24 h |
|---|---|---|---|---|---|---|---|
| Mn | 0.1510 | 1.04 | 0.98 | 0.56 | 15% | 20% | 54% |
| Zn | 0.1497 | 1.11 | 1.14 | 0.90 | 10% | 8% | 27% |
| Fe | 0.1501 | 0.63 | 0.47 | 0.08 | 49% | 62% | 93% |
| Cu | 0.1511 | 1.16 | 1.14 | 1.01 | 6% | 8% | 18% |
| initial concentration | | | 1.23 | | | — | |

Table 7 shows total P and nitrate removal performance data for calcined, substituted Mg$_3$AlX LDHs, for a single, short contact time (10 min). In this experiment, synthetic stormwater was used, which contained ~1 ppm P (from Na$_2$HPO$_4$), ~0.5 ppm NO$_3^-$ (from NaNO$_3$), ~4 ppm glycine, and ~120 ppm CaCl$_2$) dissolved in deionized water. Before testing, the synthetic stormwater was adjusted to pH ~7 using 1 M NaOH. Again, the calcined Mg$_3$AlFe LDH showed strong performance for total P removal.

TABLE 7

Total P and nitrate removal from 100 mL of synthetic stormwater by calcined LDHs, 10 min contact time.

| LDH | mass (g) | nutrient concentration (ppm) total P | NO$_3^-$ | nutrient % removal total P | NO$_3^-$ |
|---|---|---|---|---|---|
| Mg$_4$Al | 0.1001 | 0.49 | 0.24 | 53% | 51% |
| Mg$_3$AlZn | 0.1000 | 0.85 | 0.30 | 19% | 39% |
| Mg$_3$AlFe | 0.1000 | 0.07 | 0.40 | 93% | 18% |
| Mg$_3$AlCu | 0.0997 | 0.95 | 0.49 | 9% | 0% |
| initial concentration | | 1.04 | 0.49 | — | |

Table 8 shows total P and nitrate removal performance data for calcined, substituted Mg$_3$AlX LDHs, essentially repeating the experiment from Table 7 with the addition of one additional longer contact time point (48 h). Again, the calcined Mg$_3$AlFe LDH performed well for total P removal at short time scales. All of the calcined LDHs showed >90% total P removal after 48 h.

TABLE 8

Total P and nitrate removal from 100 mL of synthetic stormwater by calcined LDHs.

| | | nutrient concentration (ppm) | | | | nutrient % removal | | | |
|---|---|---|---|---|---|---|---|---|---|
| | | total P | | $NO_3^-$ | | total P | | $NO_3^-$ | |
| LDH | mass (g) | 10 min | 48 h | 10 min | 48 h | 10 min | 48 h | 10 min | 48 h |
| $Mg_4Al$ | 0.0998 | 0.41 | 0.03 | 0.32 | 0.38 | 60% | 97% | 36% | 24% |
| $Mg_3AlZn$ | 0.1011 | 0.85 | 0.08 | 0.34 | 0.23 | 17% | 92% | 32% | 54% |
| $Mg_3AlFe$ | 0.0996 | 0.07 | 0.02 | 0.53 | 0.42 | 94% | 98% | −6% | 16% |
| $Mg_3AlCu$ | 0.1012 | 0.96 | 0.08 | 0.31 | 0.35 | 7% | 93% | 38% | 30% |
| initial concentration | | 1.03 | | 0.50 | | — | | | |

Table 9 shows total P and nitrate removal performance data for calcined, substituted $Mg_3AlX$ LDHs when using a "high-strength" model solution. The synthetic stormwater of the high-strength model solution contains ~1.6 ppm P (from $Na_2HPO_4$) and ~5 ppm $NO_3^-$ (from $NaNO_3$) dissolved in deionized water. Again, the calcined $Mg_3AlFe$ LDH showed strong performance for total P removal on short time scales.

TABLE 9

Total P and nitrate removal from 100 mL of high-strength model nutrient solution by calcined LDHs.

| | | nutrient concentration (ppm) | | | | nutrient % removal | | | |
|---|---|---|---|---|---|---|---|---|---|
| | | total P | | $NO_3^-$ | | total P | | $NO_3^-$ | |
| LDH | mass (g) | 10 min | 48 h | 10 min | 48 h | 10 min | 48 h | 10 min | 48 h |
| $Mg_4Al$ | 0.1014 | 1.07 | 0.06 | 7.0 | 7.2 | 39% | 97% | −3% | −6% |
| $Mg_3AlZn$ | 0.1004 | 1.55 | 0.73 | 6.8 | 7.0 | 12% | 58% | 0% | −3% |
| $Mg_3AlFe$ | 0.1007 | 0.27 | 0.02 | 7.0 | 5.8 | 85% | 99% | −3% | 15% |
| $Mg_3AlCu$ | 0.1013 | 1.60 | 0.38 | 7.8 | 7.8 | 8% | 78% | −15% | −15% |
| initial concentration | | 1.75 | | 6.8 | | — | | | |

Table 10 shows total P, total N, and nitrate removal performance data for calcined, substituted $Mg_{4-y}AlX_y$ LDHs, where y=0.2, 0.4, and 1.0, in contact with synthetic stormwater for 10 minutes. The total P removal performance was similar for all of the tested materials on this short time scale. The formulations where $X=Zn^{2+}$ and y=0.2 and 0.4 showed strong performance for total N and nitrate removal. The initial $NO_3^-$ concentration only represents ~10% of the total N content, thus indicating that the formulation where $X=Zn^{2+}$ or $Fe^{2+}$ also removed organic N component (glycine) in the synthetic stormwater.

TABLE 10

Total P, total N, and nitrate removal from 100 mL of synthetic stormwater by calcined LDHs, 10 min contact time.

| | mass | nutrient concentration (ppm) | | | nutrient % removal | | |
|---|---|---|---|---|---|---|---|
| LDH | (g) | total P | total N | $NO_3^-$ | total P | total N | $NO_3^-$ |
| $Mg_4Al$ | 0.1018 | 0.27 | 5.4 | 0.24 | 74% | 4% | 53% |
| $Mg_{3.8}AlZn_{0.2}$ | 0.1014 | 0.33 | 3.9 | 0.11 | 68% | 30% | 78% |
| $Mg_{3.6}AlZn_{0.4}$ | 0.1002 | 0.26 | 3.4 | 0.20 | 75% | 39% | 60% |
| $Mg_3AlZn$ | 0.1003 | 0.34 | 7.0 | 0.23 | 67% | −25% | 54% |
| $Mg_{3.8}AlFe_{0.2}$ | 0.1012 | 0.25 | 4.5 | 0.43 | 76% | 20% | 14% |
| $Mg_{3.6}AlFe_{0.4}$ | 0.1006 | 0.34 | 3.8 | 0.28 | 67% | 32% | 44% |

TABLE 10-continued

Total P, total N, and nitrate removal from 100 mL of synthetic stormwater by calcined LDHs, 10 min contact time.

| | mass | nutrient concentration (ppm) | | | nutrient % removal | | |
|---|---|---|---|---|---|---|---|
| LDH | (g) | total P | total N | $NO_3^-$ | total P | total N | $NO_3^-$ |
| $Mg_3AlFe$ | 0.1008 | 0.31 | 5.0 | 0.48 | 70% | 11% | 4% |
| $Mg_{3.8}AlCu_{0.2}$ | 0.1000 | 0.33 | 8.2 | 0.27 | 68% | −46% | 47% |
| $Mg_{3.6}AlCu_{0.4}$ | 0.1003 | 0.31 | 4.9 | 0.22 | 70% | 13% | 56% |
| $Mg_3AlCu$ | 0.1001 | 0.38 | 4.1 | 0.26 | 63% | 27% | 48% |
| initial concentration | | 1.03 | 5.6 | 0.50 | — | | |

Table 11 shows total P, total N, and nitrate removal performance data for calcined, substituted $Mg_{4-y}AlX_y$ LDHs, where y=0.2, 0.4, and 1.0, in contact with synthetic stormwater for 94 hours. The total P removal performance was >90% for all formulations on this time scale. The formulations where $X=Zn^{2+}$ or $Cu^{2+}$ and y=0.2 show strong performance for nitrate removal. Some of the formulations (e.g., $Mg_{3.6}AlZn_{0.4}$ and $Mg_{3.6}AlCu_{0.4}$) showed lower % removal for $NO_3^-$ at 94 h than at 10 min.

TABLE 11

Total P, total N, and nitrate removal from 100 mL of synthetic stormwater by calcined LDHs, 94 h contact time.

| | | nutrient concentration (ppm) | | | nutrient % removal | | |
|---|---|---|---|---|---|---|---|
| LDH | mass (g) | total P | total N | $NO_3^-$ | total P | total N | total $NO_3^-$ |
| $Mg_4Al$ | 0.1018 | 0.10 | 4.3 | 0.21 | 97% | 23% | 58% |
| $Mg_{3.8}AlZn_{0.2}$ | 0.1014 | 0.14 | 4.6 | 0.17 | 96% | 18% | 66% |
| $Mg_{3.6}AlZn_{0.4}$ | 0.1002 | 0.21 | 4.4 | 0.38 | 93% | 21% | 24% |
| $Mg_3AlZn$ | 0.1003 | 0.23 | 5.4 | 0.49 | 93% | 4% | 2% |
| $Mg_{3.8}AlFe_{0.2}$ | 0.1012 | 0.15 | 4.8 | 0.30 | 95% | 14% | 40% |
| $Mg_{3.6}AlFe_{0.4}$ | 0.1006 | 0.19 | 5.1 | 0.22 | 94% | 9% | 56% |
| $Mg_3AlFe$ | 0.1008 | 0.10 | 5.8 | 0.21 | 97% | -4% | 58% |
| $Mg_{3.8}AlCu_{0.2}$ | 0.1000 | 0.16 | 4.6 | 0.12 | 95% | 18% | 76% |
| $Mg_{3.6}AlCu_{0.4}$ | 0.1003 | 0.12 | 5.3 | 0.38 | 96% | 5% | 24% |
| $Mg_3AlCu$ | 0.1001 | 0.13 | 4.5 | 0.27 | 96% | 20% | 47% |
| initial concentration | | 1.03 | 5.6 | 0.50 | — | | |

Table 12 shows total P and nitrate removal performance data for calcined, substituted $Mg_{4-y}AlX_y$ LDHs, where y=0.2, 04, and 1.0, in contact with a high-strength model solution for 10 minutes. The total P removal performance was strong for the formulations where $X=Fe^{2+}$. The nitrate removal performance varied, however, it was generally consistent (~10%) for each formulation in the group where $X=Zn^{2+}$.

TABLE 12

Total P and nitrate removal from 100 mL of high-strength, model solution by calcined LDHs, 10 min contact time.

| | | nutrient concentration (ppm) | | nutrient % removal | |
|---|---|---|---|---|---|
| LDH | mass (g) | total P | $NO_3^-$ | total P | $NO_3^-$ |
| $Mg_4Al$ | 0.1009 | 1.28 | 7.2 | 20% | 8% |
| $Mg_{3.8}AlZn_{0.2}$ | 0.1013 | 1.44 | 7.0 | 10% | 10% |
| $Mg_{3.6}AlZn_{0.4}$ | 0.1010 | 1.48 | 6.8 | 7% | 13% |
| $Mg_3AlZn$ | 0.1003 | 1.31 | 7.0 | 18% | 10% |
| $Mg_{3.8}AlFe_{0.2}$ | 0.1002 | 0.68 | 7.4 | 58% | 5% |
| $Mg_{3.6}AlFe_{0.4}$ | 0.1008 | 0.91 | 7.6 | 43% | 3% |
| $Mg_3AlFe$ | 0.1015 | 0.80 | 6.4 | 50% | 18% |
| $Mg_{3.8}AlCu_{0.2}$ | 0.1007 | 1.37 | 6.6 | 14% | 15% |
| $Mg_{3.6}AlCu_{0.4}$ | 0.1016 | 1.36 | 7.4 | 15% | 5% |
| $Mg_3AlCu$ | 0.1002 | 1.29 | 7.0 | 19% | 10% |
| initial concentration | | 1.60 | 7.8 | — | |

Table 13 shows total P and nitrate removal performance data for calcined, substituted $Mg_{4-y}AlX_y$ LDHs, where y=0.2, 0.4, and 1.0, in contact with a high-strength model solution for 48 hours. The total P removal performance was >90% for all formulations where $X=Fe^{2+}$ and $Cu^{2+}$.

TABLE 13

Total P and nitrate removal from 100 mL of high-strength, model solution by calcined LDHs, 48 h contact time.

| | | nutrient concentration (ppm) | | nutrient % removal | |
|---|---|---|---|---|---|
| LDH | mass | total P | $NO_3^-$ | total P | $NO_3^-$ |
| $Mg_4Al$ | 0.1009 | 0.08 | 7.0 | 95% | 10% |
| $Mg_{3.8}AlZn_{0.2}$ | 0.1013 | 0.37 | 6.8 | 77% | 13% |
| $Mg_{3.6}AlZn_{0.4}$ | 0.1010 | 0.20 | 7.2 | 87% | 8% |
| $Mg_3AlZn$ | 0.1003 | 0.06 | 7.0 | 97% | 10% |
| $Mg_{3.8}AlFe_{0.2}$ | 0.1002 | 0.04 | 7.4 | 98% | 5% |
| $Mg_{3.6}AlFe_{0.4}$ | 0.1008 | 0.07 | 6.8 | 96% | 13% |
| $Mg_3AlFe$ | 0.1015 | 0.04 | 7.2 | 98% | 8% |
| $Mg_{3.8}AlCu_{0.2}$ | 0.1007 | 0.11 | 6.6 | 93% | 15% |
| $Mg_{3.6}AlCu_{0.4}$ | 0.1016 | 0.14 | 7.4 | 91% | 5% |
| $Mg_3AlCu$ | 0.1002 | 0.06 | 7.0 | 96% | 10% |
| initial concentration | | 1.60 | 7.8 | — | |

To optimize the simultaneous removal of both P and nitrate, equal amounts of calcined $Mg_{3.8}AlFe_{0.2}$ and $Mg_{3.8}AlZn_{0.2}$ LDHs were combined and tested. Table 14 shows total P, total N, and nitrate removal performance data for a mixture of calcined $Mg_{3.8}AlFe_{0.2}$ and $Mg_{3.8}AlZn_{0.2}$ (0.10 g each) LDHs in contact with synthetic stormwater. The total P and nitrate removal performance exceeded 65% for both target nutrients, even at low contact time. The total N removal performance was also above 10% indicating that some of the organic N fraction (in this case, glycine) was also removed. Similar results were obtained by using a lower loading of each LDH (0.05 g instead of 0.10 g), and those results are shown in Table 15.

TABLE 14

Total P, total N, and nitrate removal from 100 mL of synthetic stormwater by a mixture of $Mg_{3.8}AlFe_{0.2}$ and $Mg_{3.8}AlZn_{0.2}$ (0.10 g each) calcined LDHs.

| | nutrient concentration (ppm) | | | nutrient % removal | | |
|---|---|---|---|---|---|---|
| contact time | total P | total N | $NO_3^-$ | total P | total N | $NO_3^-$ |
| 10 min | 0.14 | 4.8 | 0.16 | 85% | 14% | 68% |
| 48 h | 0.03 | 3.5 | 0.01 | 97% | 38% | 98% |
| initial concentration | 0.93 | 5.6 | 0.5 | — | | |

TABLE 15

Total P, total N, and nitrate removal from 200 mL of synthetic stormwater by a mixture of $Mg_{3.8}AlFe_{0.2}$ and $Mg_{3.8}AlZn_{0.2}$ (0.05 g each) calcined LDHs.

| | nutrient concentration (ppm) | | | nutrient % removal | | |
|---|---|---|---|---|---|---|
| contact time | total P | total N | $NO_3^-$ | total P | total N | $NO_3^-$ |
| 10 min | n.m. | n.m. | 0.26 | — | — | 50% |
| 48 h | 0.26 | 4.0 | 0.21 | 73% | 11% | 60% |
| initial concentration | 0.97 | 4.5 | 0.52 | — | | |

(n.m. = not measured)

Table 16 shows total P and nitrate removal performance data for a mixture of $Mg_{3.8}AlFe_{0.2}$ and $Mg_{3.8}AlZn_{0.2}$ (0.10 g each) calcined LDHs in contact with a high-strength model solution. The total P and nitrate removal performance at 48 h contact time were both above 75% for each nutrient. This experiment shows that the mixture of the two LDHs gives improved performance for nitrate removal, even in the presence of a higher concentration of competing phosphate anions.

TABLE 16

Total P, total N, and nitrate removal from 200 mL of high-strength model solution by a mixture of $Mg_{3.8}AlFe_{0.2}$ and $Mg_{3.8}AlZn_{0.2}$ (0.10 g each) calcined LDHs (n.m. = not measured).

| contact time | nutrient concentration (ppm) | | nutrient % removal | |
|---|---|---|---|---|
| | total P | $NO_3^-$ | total P | $NO_3^-$ |
| 10 min | n.m. | 6.2 | — | 21% |
| 48 h | 0.33 | 0.2 | 79% | 97% |
| initial concentration | 1.62 | 7.8 | — | |

Example 4: Preparation of Exemplary Hydrogels/Control Polymers

A. Polyacrylamide (PAAm) Hydrogels

Acrylamide (AAm), N,N-methylenebisacrylamide (MBA), and N,N,N',N'-tetramethylethylenediamine (TEMED) were combined in water. Shown below are six exemplary solutions (volume of ~10 mL) that were prepared, which encompass various mole ratios of monomer to crosslinker (AAm:MBA).
1. 3 g AAm, 75 µL TEMED, 0.130 g MBA, 7 mL water (50:1 AAm:MBA)
2. 3 g AAm, 75 µL TEMED, 0.065 g MBA, 7 mL water (100:1 AAm:MBA)
3. 3 g AAm, 75 µL TEMED, 0.032 g MBA, 7 mL water (200:1 AAm:MBA)
4. 3 g AAm, 75 µL TEMED, 0.013 g MBA, 7 mL water (500:1 AAm:MBA)
5. 3 g AAm, 75 µL TEMED, 0.009 g MBA, 7 mL water (750:1 AAm:MBA)
6. 3 g AAm, 75 uL TEMED, 0.0065 g MBA, 7 mL water (1000:1 AAm:MBA)

Next, 100 µL of a 23% ammonium persulfate (APS) (230 mg APS in 0.88 mL water) was added to each ~10 mL solution. After 1 hour of polymerization, the PAAm hydrogels were each placed in deionized (DI) water to wash for 7 days.

B. Polyethylene (Glycol) Diacrylate (PEGDA) Hydrogels

Polyethylene (glycol) diacrylate (PEGDA) having an average molecular weight (MW) of 575 g/mol, N,N'-methylenebisacrylamide (MBA), and N,N,N',N'-tetramethylethylenediamine (TEMED) were combined in water. Shown below are four exemplary solutions (volume of ~10 mL) that were prepared, which encompass various mole ratios of monomer to crosslinker (PEGDA:MBA).
1. 3 g PEGDA, 75 µL TEMED, 0.016 g MBA, 7 mL water (50:1 PEGDA:MBA)
2. 3 g PEGDA, 75 µL TEMED, 0.008 g MBA, 7 mL water (100:1 PEGDA:MBA)
3. 3 g PEGDA, 75 µL TEMED, 0.0032 g MBA, 7 mL water (200:1 PEGDA:MBA)
4. 3 g PEGDA, 75 µL TEMED, 0.0008 g MBA, 7 mL water (500:1 PEGDA:MBA)

Next, 100 µL of a 23% ammonium persulfate (APS) stock solution (230 mg APS in 0.88 mL water) was added to each ~10 mL solution. After 1 hour of polymerization, the PEGDA hydrogels were each placed in deionized (DI) water to wash for 7 days.

Example 5: Preparation of Exemplary LDH-Gels

Monomer (AAm or PEGDA having an average MW of 575 g/mol), N,N'-methylenebisacrylamide (MBA, the crosslinker), and N,N,N',N'-tetramethylethylenediamine (TEMED, the catalyst) were combined in water (volume of ~10 mL). LDH particles were then added at a predetermined LDH particle loading to form a suspension. Shown below are general LDH particle loading guidelines as well as eight exemplary reaction mixtures that were prepared, which encompass various LDH particle loadings (1.0, 10, 50, and 100 mg/mL).

LDH Particle Loading Guidelines:
1.0 mg/mL→~10 mg LDH particles in ~10 mL solution
10 mg/mL→~100 mg LDH particles in ~10 mL solution
50 mg/mL→~0.5 g LDH particles in ~10 mL solution
100 mg/mL→~1.0 g LDH particles in ~10 mL solution 1 mg/mL LDH Particle Suspensions in Water:
1. 3 g AAm, 75 µL TEMED, 0.009 g MBA, 7 mL suspension (750:1 AAm:MBA)+~10 mg LDH particles
2. 3 g PEGDA, 75 µL TEMED, 0.0008 g MBA, 7 mL suspension (500:1 PEGDA:MBA)+~10 mg LDH particles 10 mg/mL LDH Particle Suspensions in Water:
3. 3 g AAm, 75 µL TEMED, 0.009 g MBA, 7 mL suspension (750:1 AAm:MBA)+~100 mg LDH particles
4. 3 g PEGDA, 75 µL TEMED, 0.0008 g MBA, 7 mL suspension (500:1 PEGDA:MBA)+~100 mg LDH particles 50 mg/mL LDH Particle Suspensions in Water:
5. 3 g AAm, 75 µL TEMED, 0.009 g MBA, 7 mL suspension (750:1 AAm:MBA)+~0.5 g LDH particles
6. 3 g PEGDA, 75 µL TEMED, 0.0008 g MBA, 7 mL suspension (500:1 PEGDA:MBA)+~0.5 g LDH particles 100 mg/mL LDH Particle Suspensions in Water:
7. 3 g AAm, 75 µL TEMED, 0.009 g MBA, 7 mL suspension (750:1 AAm:MBA)+~1.0 g LDH particles
8. 3 g PEGDA, 75 µL TEMED, 0.0008 g MBA, 7 mL suspension (500:1 PEGDA:MBA)+~1.0 g LDH particles Each of the above-described reaction mixtures was divided into 600 µL sample reaction mixtures. 6 µL of a 23% ammonium persulfate (APS) stock solution (230 mg APS in 0.88 mL water) was added to each 1×600 µL sample. After 1 hour of polymerization, the LDH-gels were each placed in deionized (DI) water to wash for 7 days.

Example 6: Testing Exemplary LDH-Gels

Exemplary LDH-gels were prepared according to Example 4 with equal amounts of Fe-5 ($Mg_{3.8}AlFe_2$) and Zn-5 ($Mg_{3.8}AlZn_{0.2}$) LDH particles in each LDH-gel at various loadings (e.g., 1 mg/mL, 10 mg/mL, 50 mg/mL, and 100 mg/mL). After synthesis and before testing, the LDH-gels were broken into chunks (~0.5-1 cm in diameter) and washed repeatedly until the total nitrogen (N) content of the wash water was measured below 0.5 ppm. All experiments were carried out by packing LDH-gels into 60-mL syringes with gauze filters covering the outlet. The quantity of media (LDH-gel) loaded into each column was based on the LDH particle mass. The 10 mg/mL, 50 mg/mL, and 100 mg/mL loadings corresponded to 100 mg, 0.5 g, and 1.0 g of total LDH particles per column, respectively, to control for the density/water absorption differences between PEGDA and PAAm.

Figure 14:
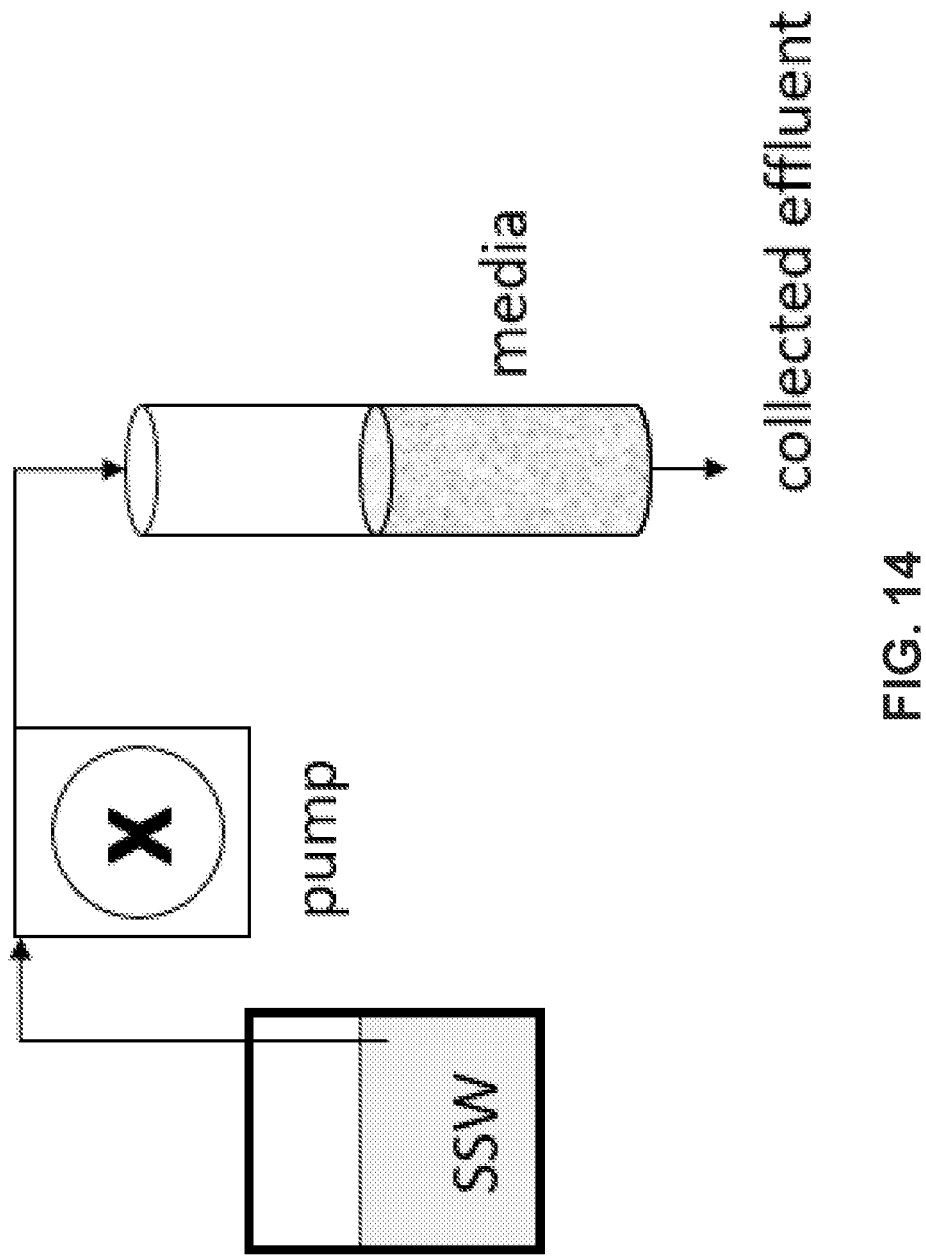
FIG. 14 shows the apparatus used for assessing LDH-gels regarding total phosphorus (TP), total nitrogen (TN) and nitrate ($NO_3^-$) removal from 100 mL of synthetic stormwater ("SSW").
Figure 16B:
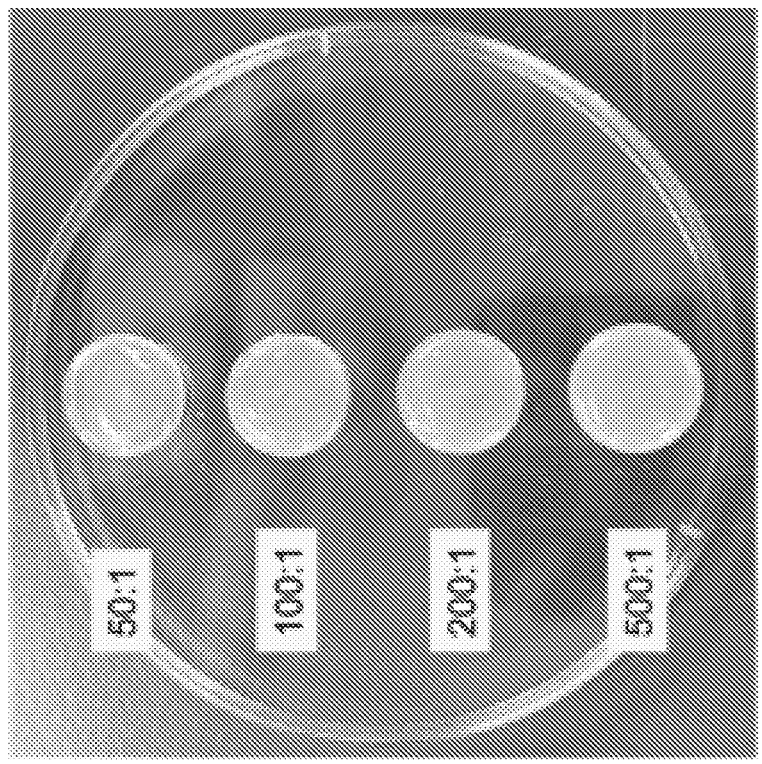
FIG. 16B a photograph of exemplary polyethylene (glycol) diacrylate (PEGDA) hydrogels prepared with various mole ratios of monomer (PEGDA having an average molecular weight of 575 g/mol) to crosslinker (monomer:crosslinker=50:1, 100:1, 200:1, and 500:1).
Figure 16A:
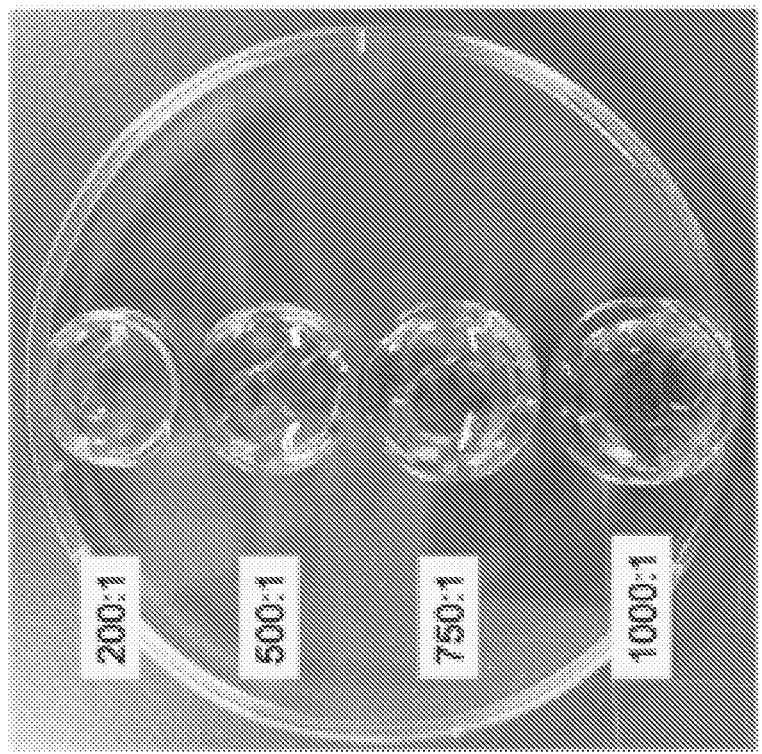
FIG. 16A is a photograph of exemplary polyacrylamide (PAAm) hydrogels prepared with various mole ratios of monomer (AAm) to crosslinker (monomer:crosslinker=200:1. 500:1, 750:1, and 1000:1).
Figure 17A:
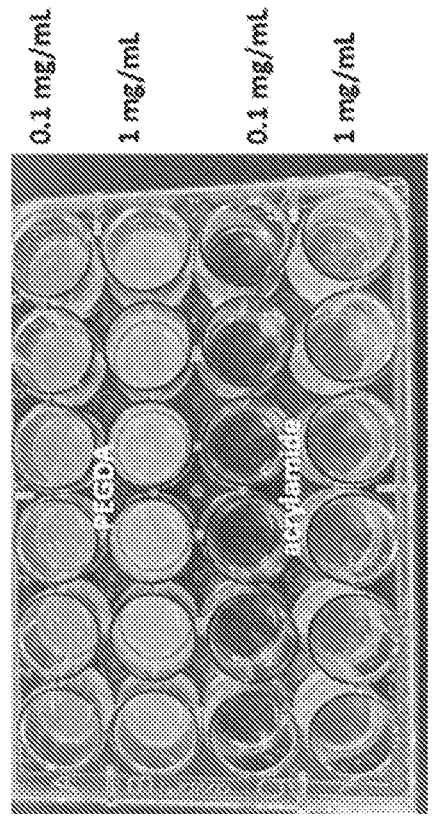
FIG. 17A is a photograph of a side view of exemplary LDH-gel monomer solutions with different LDH particle loadings (0.1, 1.0, and 10 mg/mL).
Figure 17B:
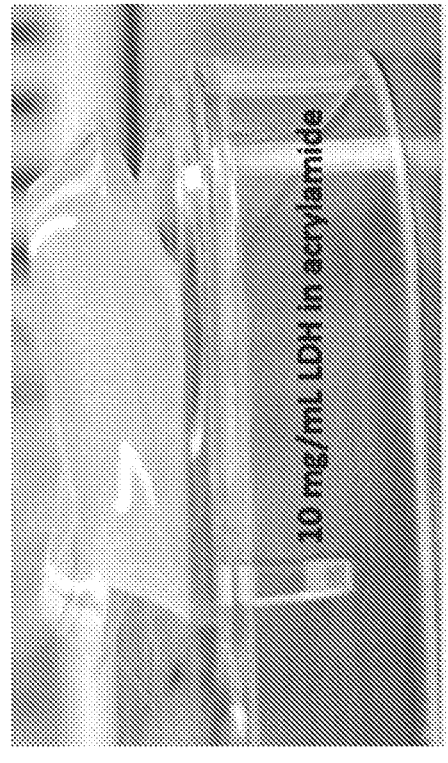
FIG. 17B is a photograph of a top view of exemplary LDH-gel monomer solutions with different LDH particle loadings (0.1 and 1.0 mg/mL) and different monomers (PEGDA having an average molecular weight of 575 g/mol (top) and AAm (bottom)).
Figure 17C:
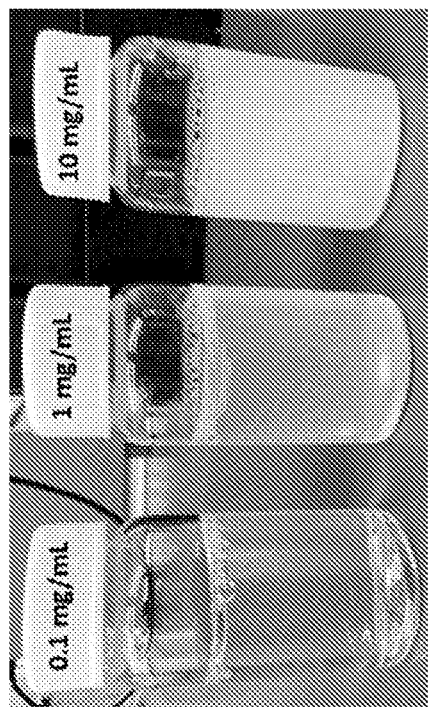
FIG. 17C is a photograph of exemplary LDH-gels prepared using various monomer:crosslinker ratios and with an LDH loading of 10 mg/mL.
Figure 17D:
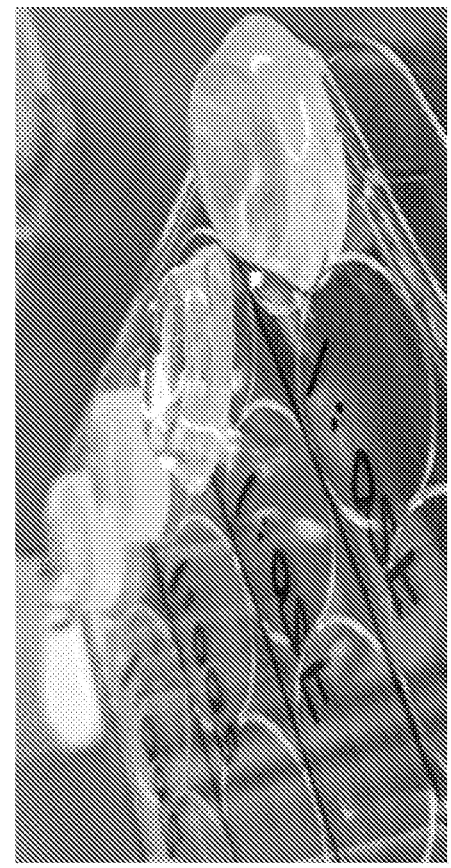
FIG. 17D is a photograph of an exemplary LDH-gel prepared with acrylamide (AAm) monomer and an LDH loading of 10 mg/mL.
Figure 18A:
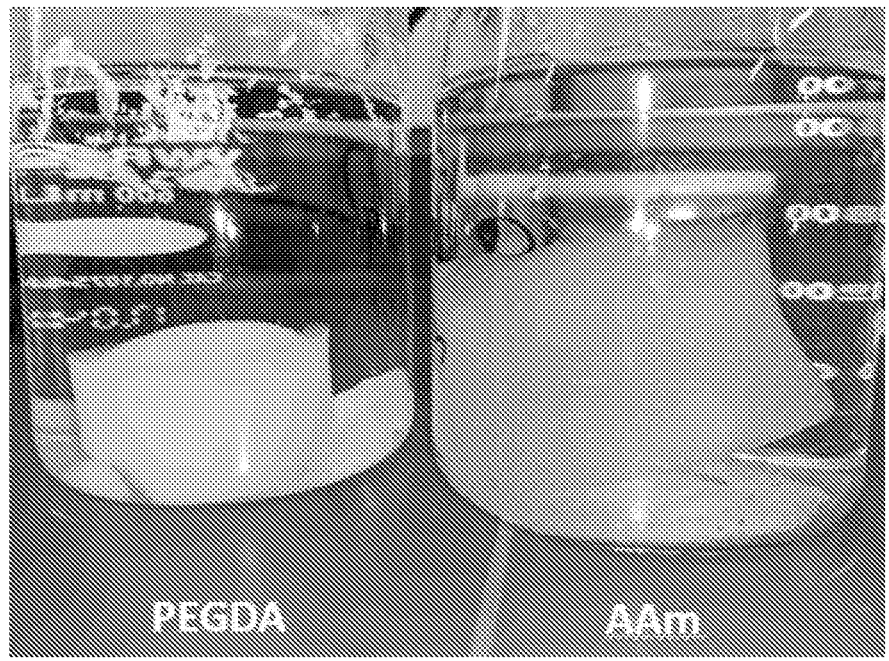
FIG. 18A is a photograph of two different LDH-gels prepared from two different monomers (one from AAm monomer and the other from PEGDA monomer), each containing calcined $Mg_4Al$ LDH particles (LDH loading=10 mg/mL).
Figure 18B:
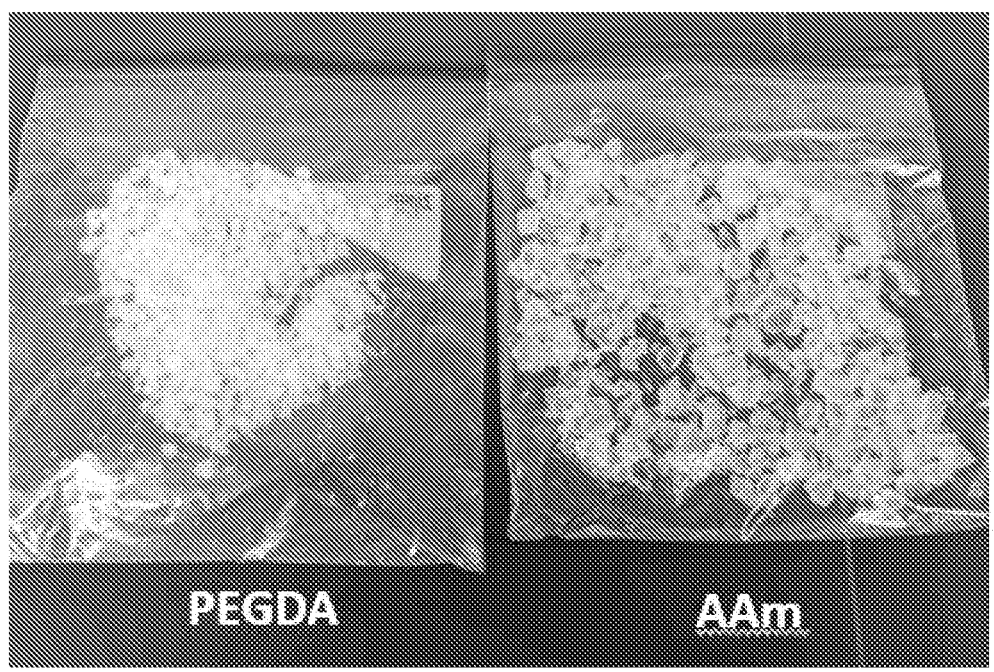
FIG. 18B is a photograph of the LDH-gels of FIG. 18A after being broken into pieces.
Figure 19A:
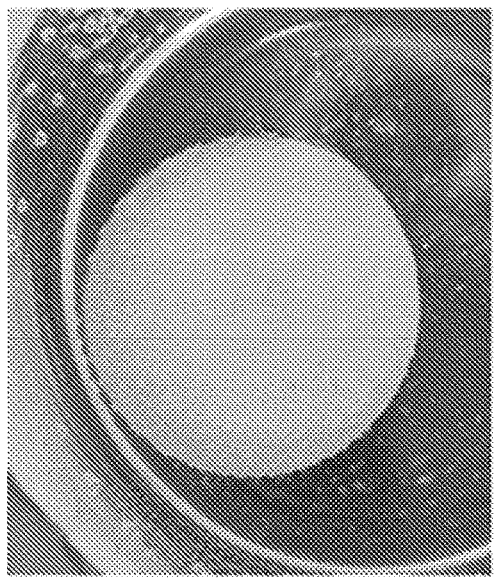
FIG. 19A is a photograph of an exemplary LDH-gel prepared with AAm monomer and calcined $Mg_{3.8}AlZn_{0.2}$ LDH particles (LDH loading=10 mg/mL).
Figure 19B:
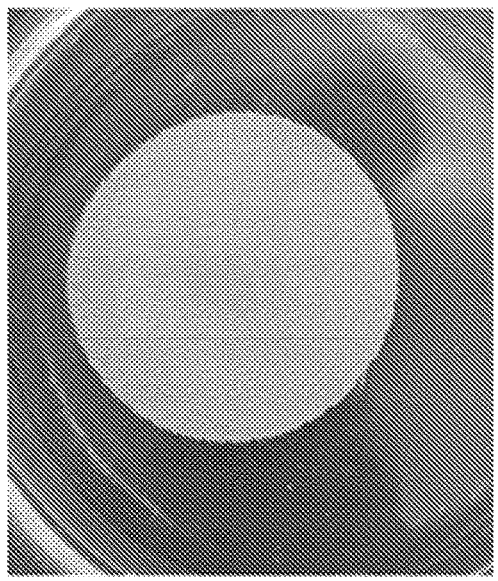
FIG. 19B is a photograph of an exemplary LDH-gel prepared with AAm monomer and calcined $Mg_{3.8}AlFe_{0.2}$ LDH particles (LDH loading=10 mg/mL).
Figure 19C:
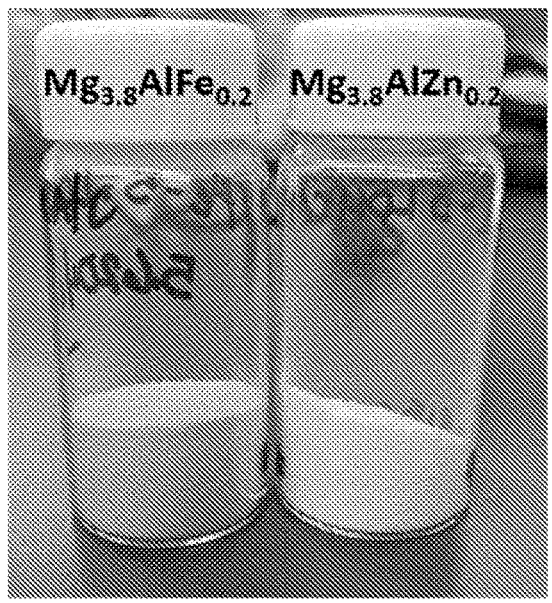
FIG. 19C is a photograph of a vial containing exemplary $Mg_8AlZn_{0.2}$ LDH particles post-calcination and a vial containing $Mg_{3.8}AlFe_{0.2}$ LDH particles post-calcination.
Figure 19D:
FIG. 19D is a photograph of an exemplary LDH-gel that was prepared with PEGDA monomer and equal amounts of calcined $Mg_{3.8}AlZn_{0.2}$ and $Mg_{3.8}AlFe_{0.2}$ LDH particles.
Figure 20:
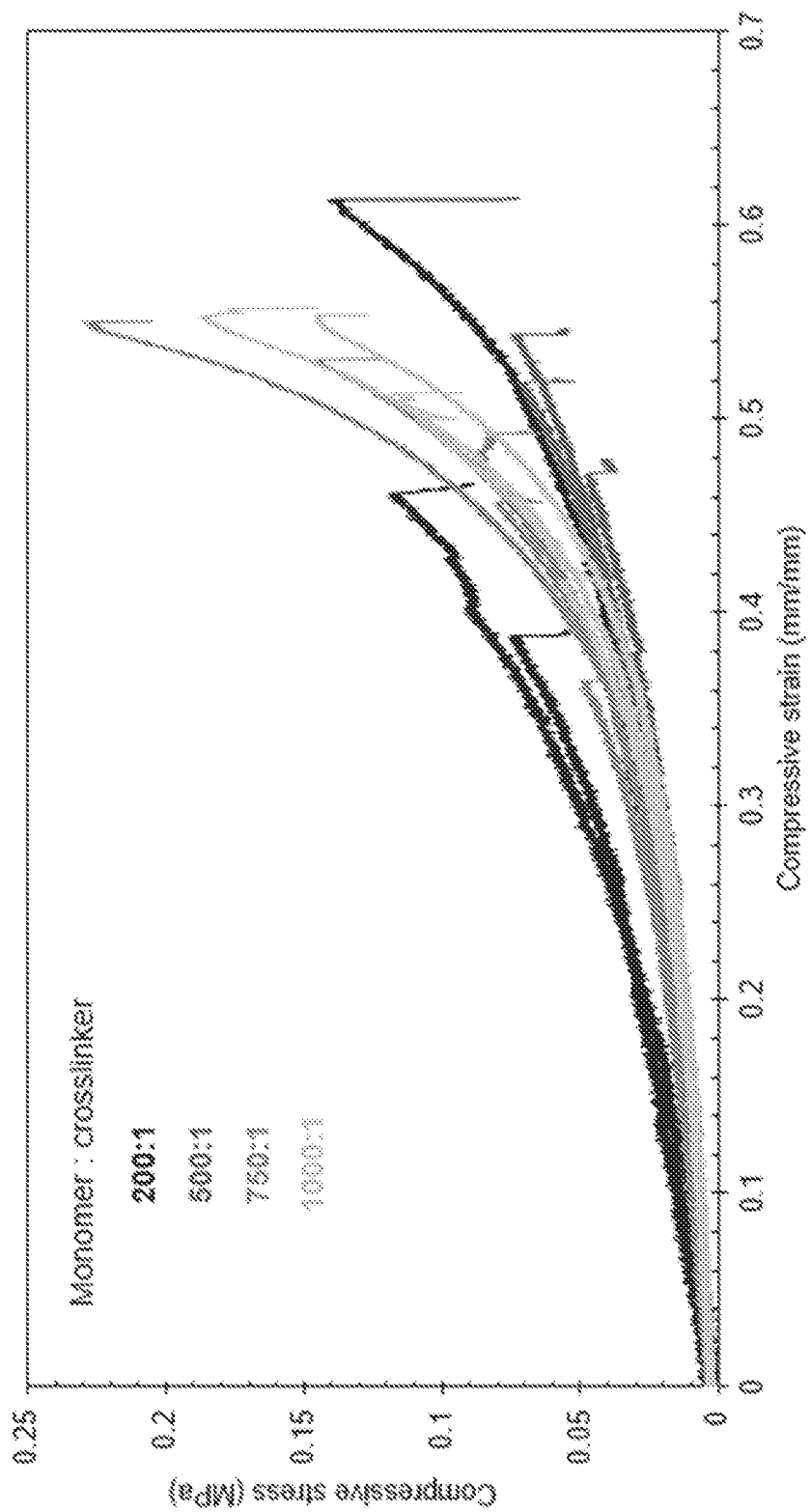
FIG. 20 is a graph of compressive stress vs. compressive strain for exemplary polyacrylamide (PAAm) hydrogels prepared with various mole ratios of monomer (AAm) to crosslinker (monomer:crosslinker=200:1, 500:1, 750:1, and 1000:1).
Figure 21A:
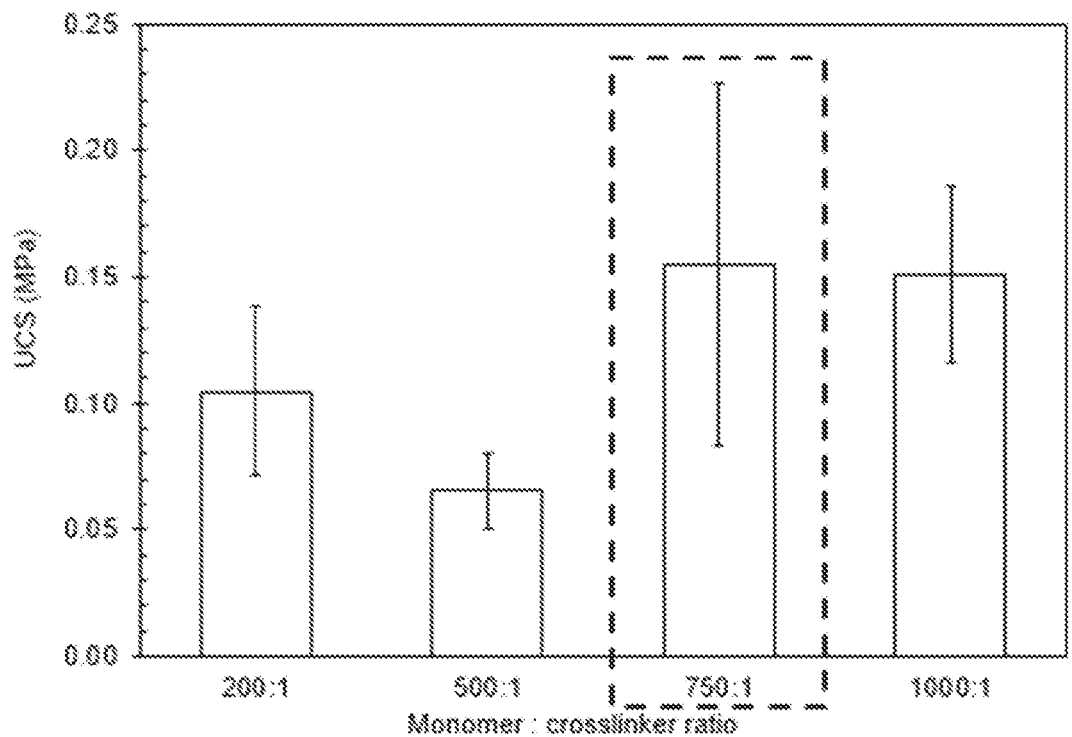
FIG. 21A is a bar graph showing the ultimate compressive strength (UCS) values for exemplary polyacrylamide (PAAm) hydrogels prepared with various mole ratios of monomer (AAm) to crosslinker (monomer:crosslinker=200:1, 500:1, 750:1, and 1000:1). Values are the average of three measurements and the error bars represent the first standard deviation.
Figure 21B:
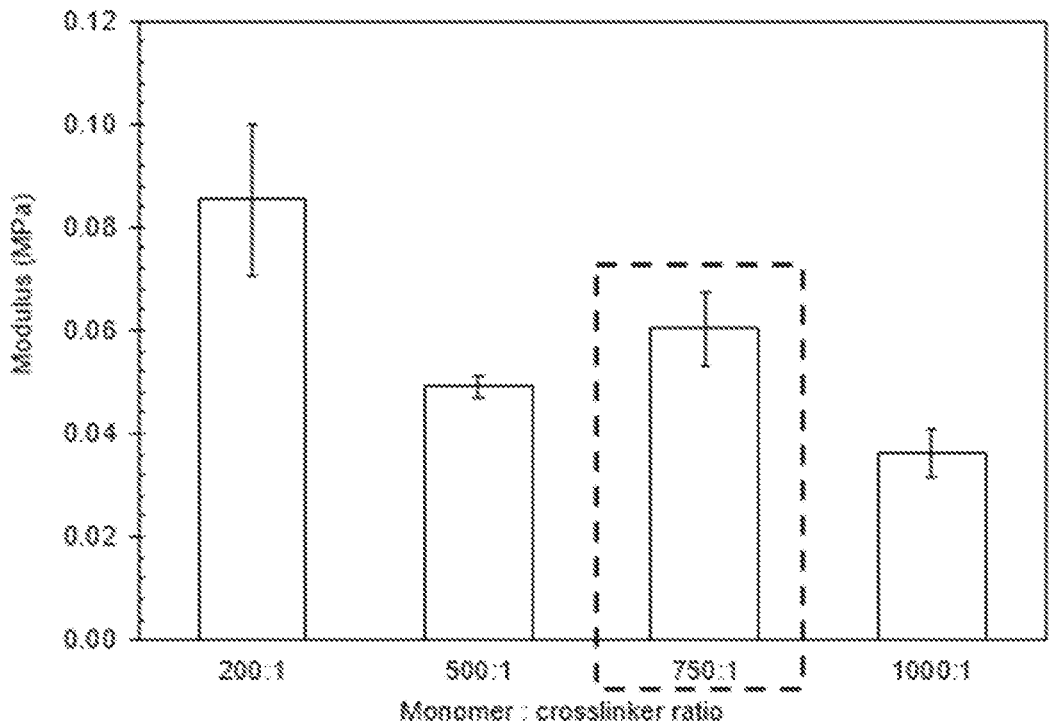
FIG. 21B is a bar graph showing the compressive modulus (modulus) values for exemplary polyacrylamide (PAAm) hydrogels prepared with various mole ratios of monomer (AAm) to crosslinker (monomer:crosslinker=200:1, 500:1, 750:1, and 1000:1). Values are the average of three measurements and the error bars represent the first standard deviation.
Figure 22:
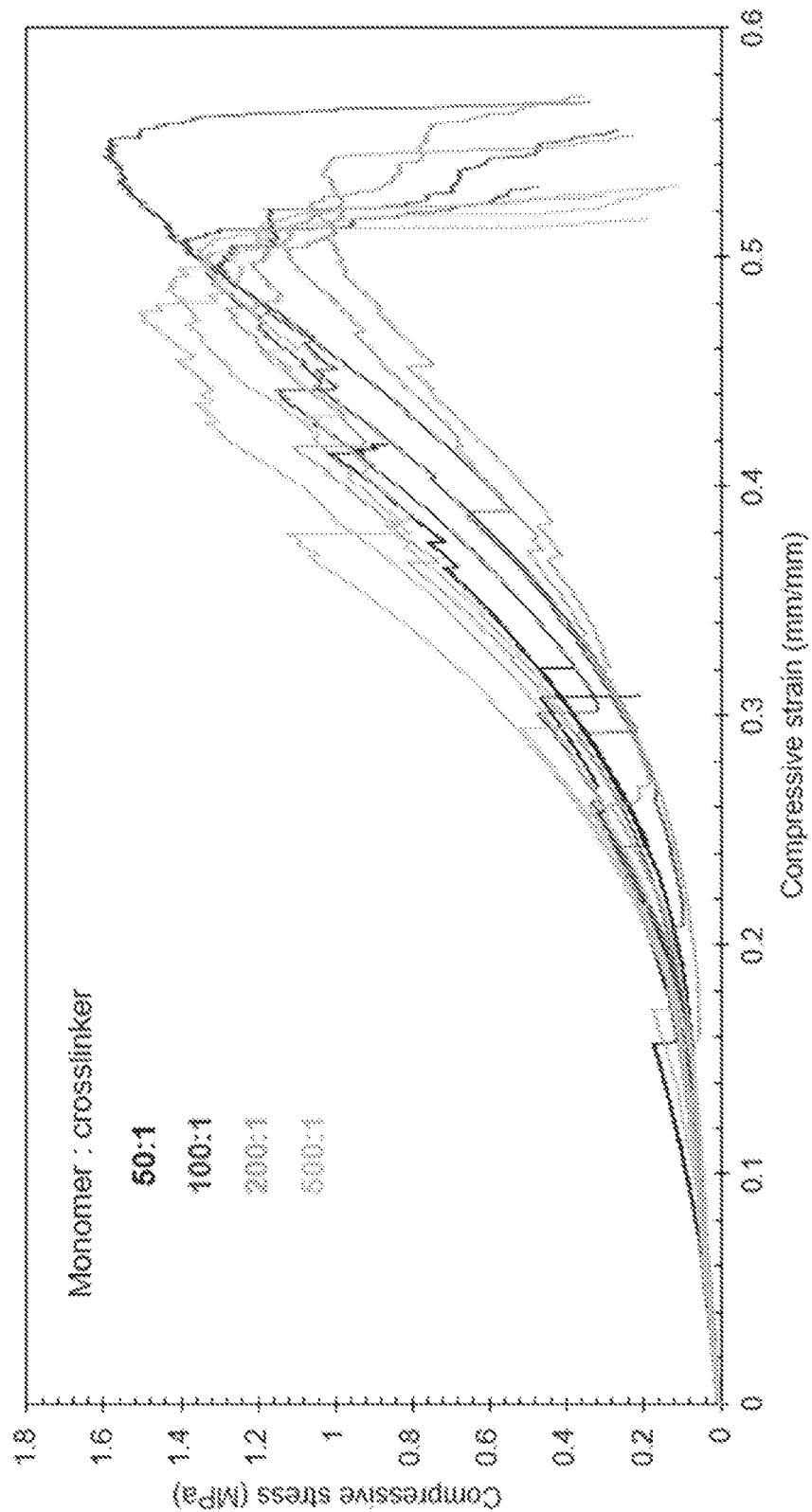
FIG. 22 is a graph of compressive stress vs. compressive strain for exemplary PEGDA hydrogels prepared with various mole ratios of monomer (PEGDA having an average molecular weight of 575 g/mol) to crosslinker (50:1, 100:1, 200:1, and 500:1).
Figure 23A:
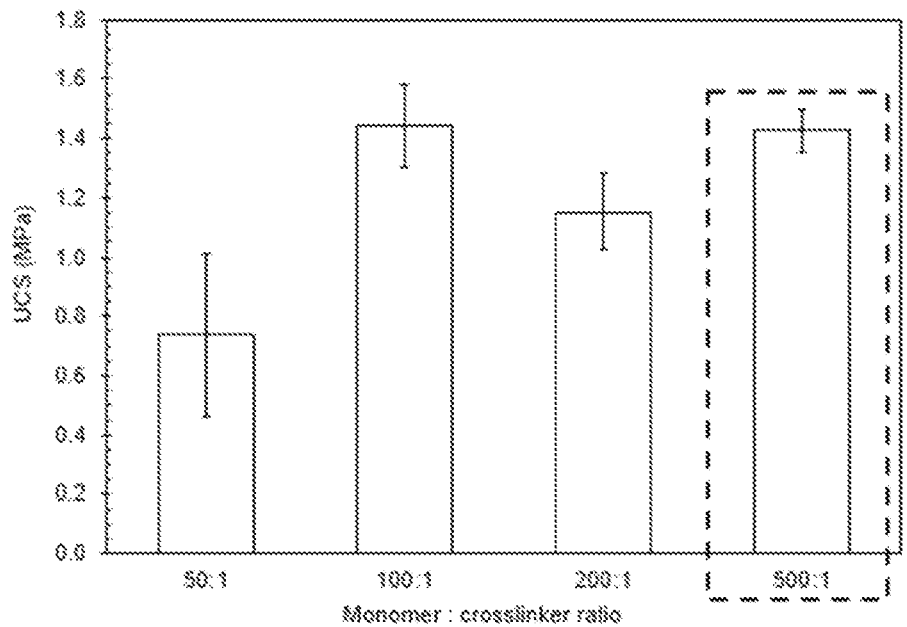
FIG. 23A is a bar graph showing the ultimate compressive strength (UCS) values for exemplary PEGDA hydrogels prepared with various mole ratios of monomer (PEGDA having an average molecular weight of 575 g/mol) to crosslinker (monomer:crosslinker=50:1, 100:1, 200:1, and 500:1). Values are the average of three measurements and the error bars represent the first standard deviation.
Figure 23B:
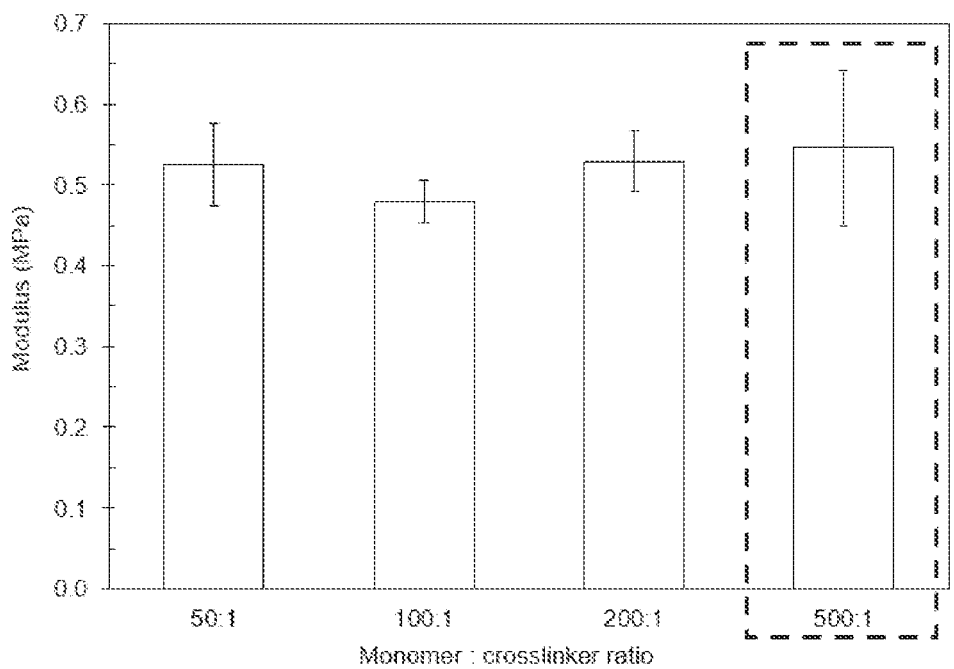
FIG. 23B is a bar graph showing the compressive modulus (modulus) values for exemplary PEGDA hydrogels prepared with various mole ratios of monomer (PEGDA having an average molecular weight of 575 g/mol) to crosslinker (monomer:crosslinker=50:1, 100:1, 200:1, and 500:1). Values are the average of three measurements and the error bars represent the first standard deviation.
Figure 24:
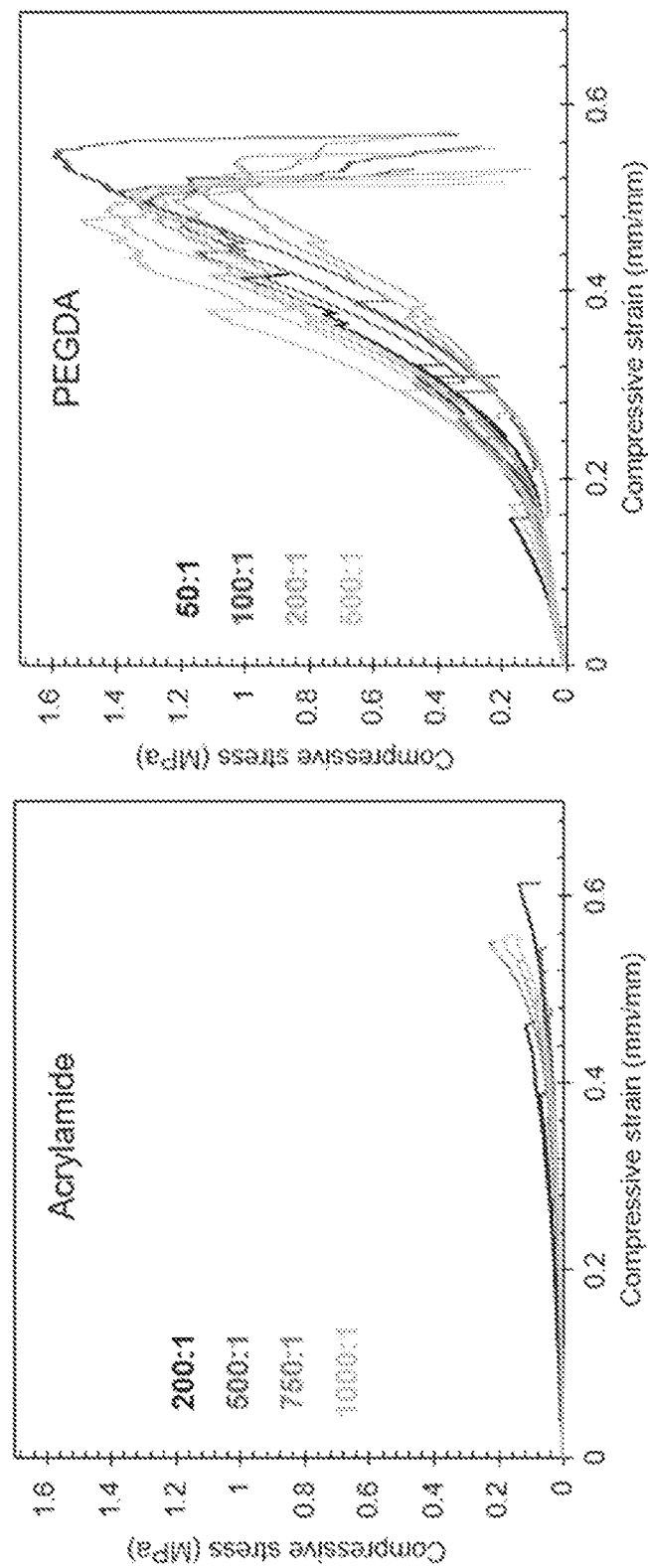
FIG. 24 is a side-by-side comparison of the compressive stress vs. compressive strain graphs for exemplary PAAm and PEGDA hydrogels. As evidenced by the comparison, PAAm hydrogels are softer and may swell more than PEGDA hydrogels.
Figure 25:
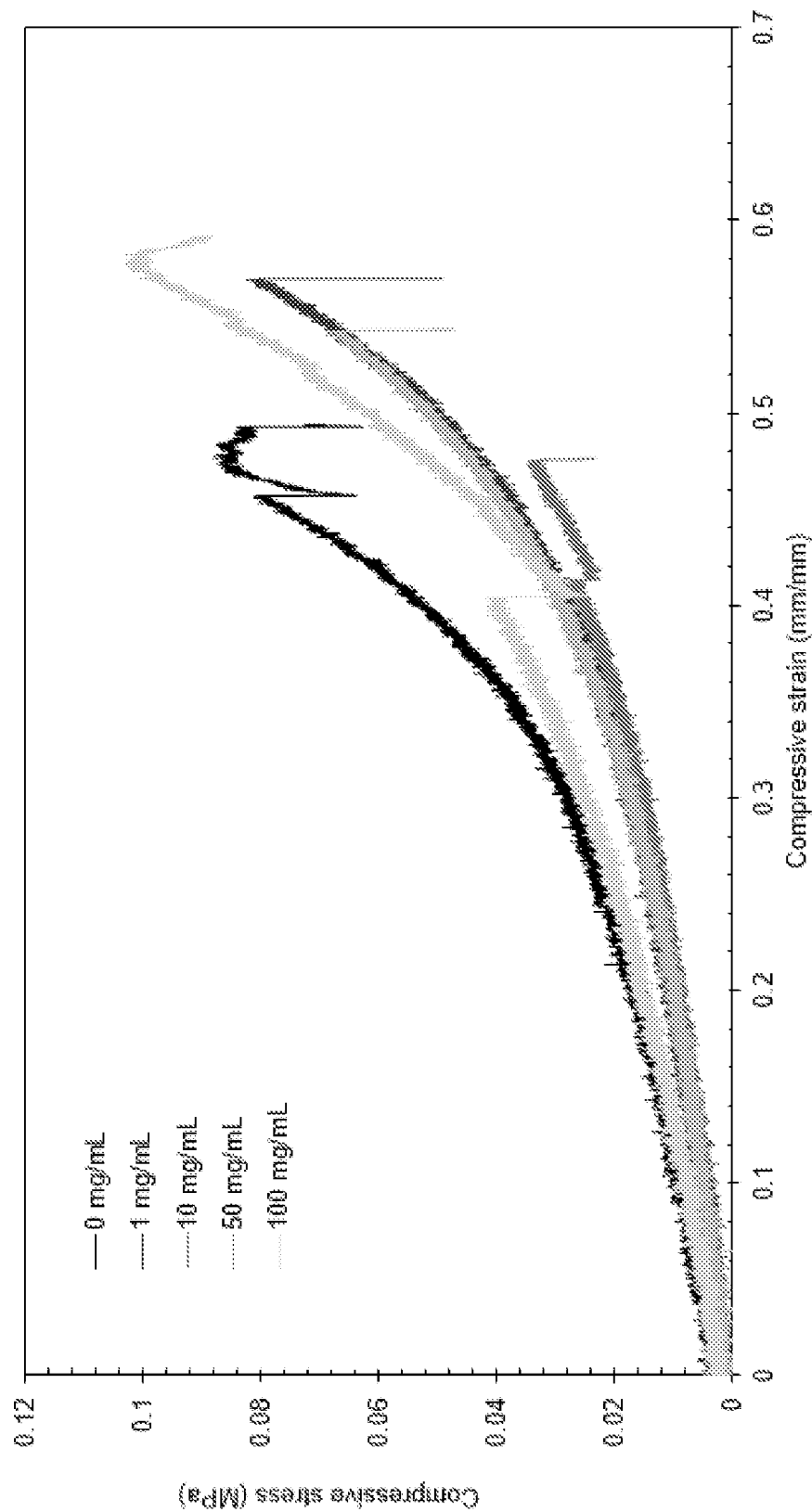
FIG. 25 is a graph of compressive stress vs. compressive strain for exemplary LDH-hydrogels prepared using acrylamide (AAm) monomer (monomer:crosslinker=750:1) at various LDH particle loadings (0, 1, 10, 50, and 100 mg/mL).
Figure 26A:
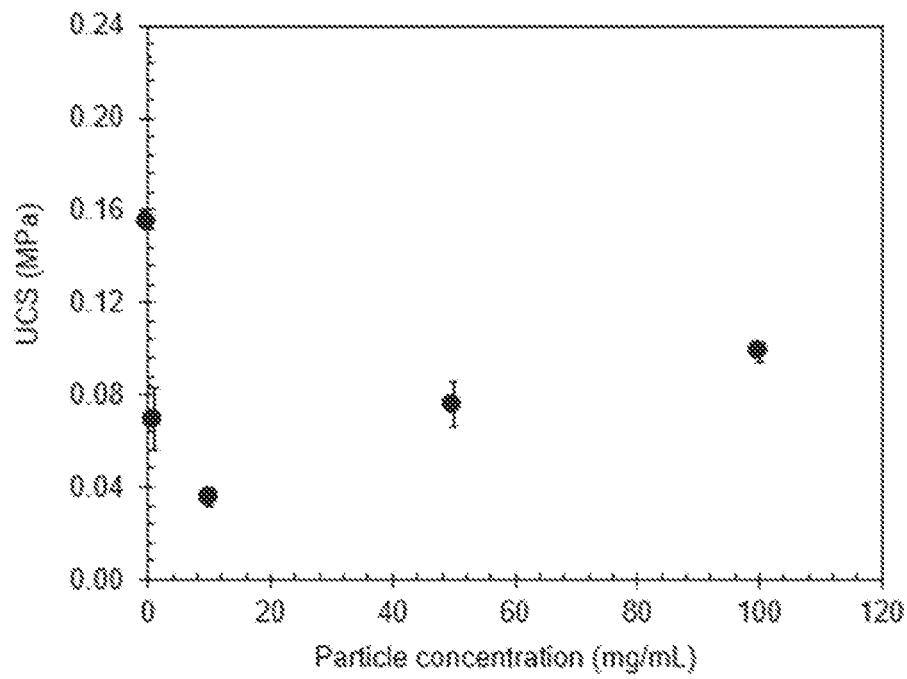
FIG. 26A is a scatterplot graph showing the relationship between the ultimate compressive strength (UCS) of the exemplary LDH-hydrogel prepared using acrylamide (AAm) monomer (monomer:crosslinker=750:1), and the LDH particle loading (0, 1, 10, 50, and 100 mg/mL). Data points are the average of three measurements and the error bars represent the first standard deviation. (Some error bars are smaller than data symbols.)
Figure 26B:
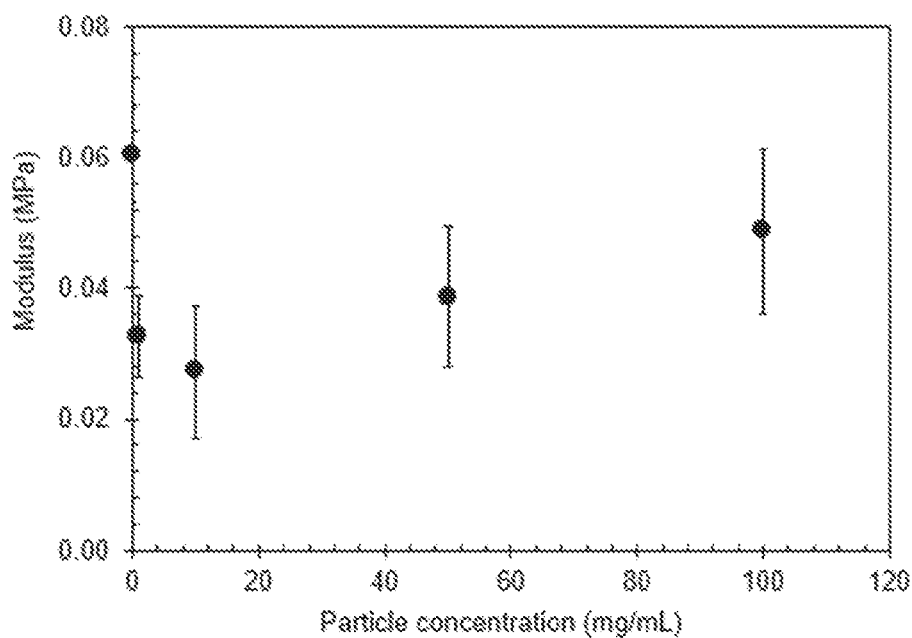
FIG. 26B is a scatterplot graph showing the relationship between the compressive modulus (modulus) of an exemplary LDH-hydrogel prepared using acrylamide (AAm) monomer (monomer:crosslinker=750:1), and the LDH particle loading (0, 1, 10, 50, and 100 mg/mL). Data points are the average of three measurements and the error bars represent the first standard deviation. (Some error bars are smaller than data symbols.)
Figure 27:
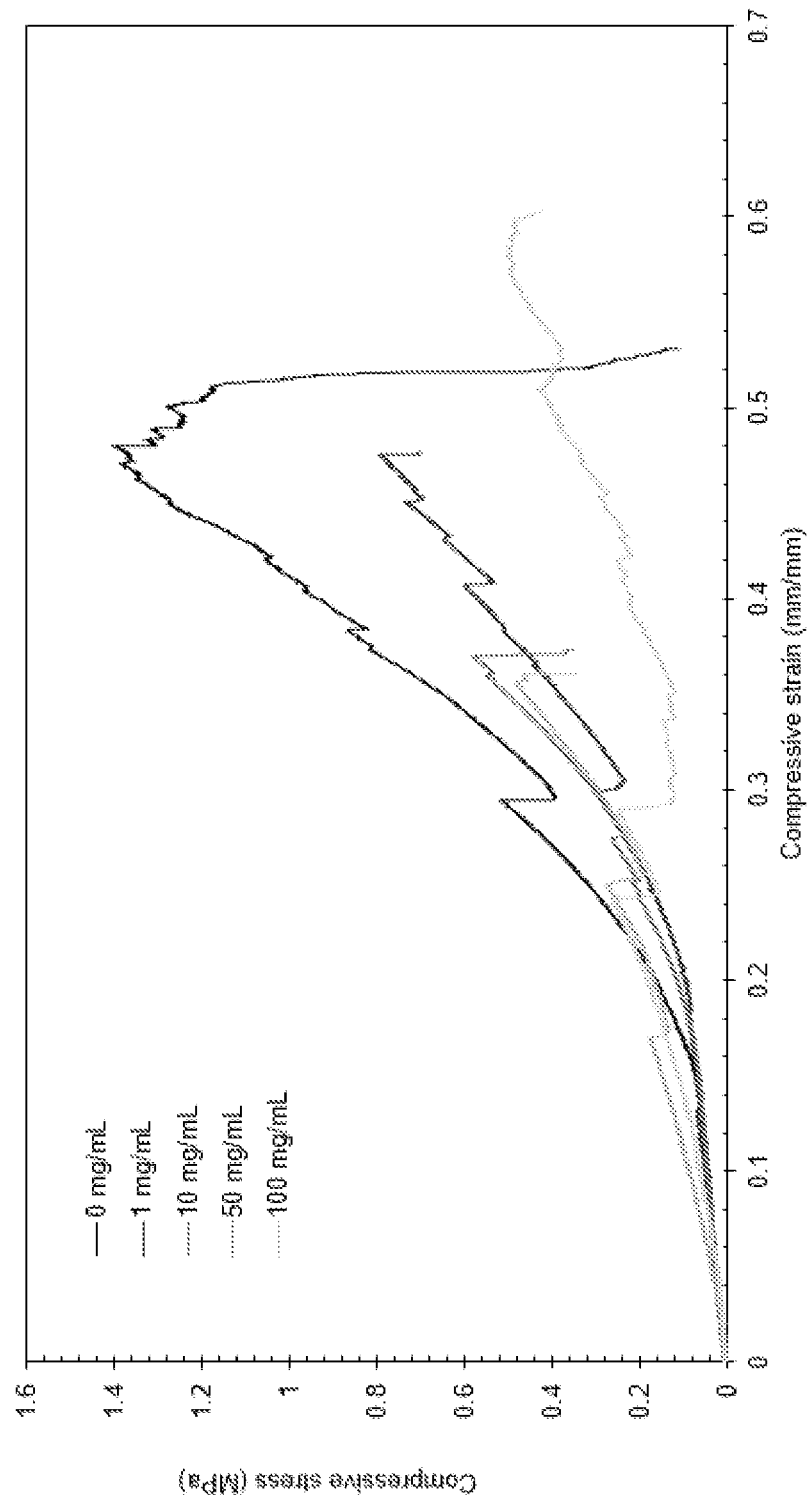
FIG. 27 is a graph of compressive stress vs. compressive strain for an exemplary LDH-hydrogel prepared using PEGDA monomer (PEGDA having an average MW of 575 g/mol, monomer:crosslinker=500:1) at various LDH particle loadings (0, 1, 10, 50, and 100 mg/mL).
Figure 28A:
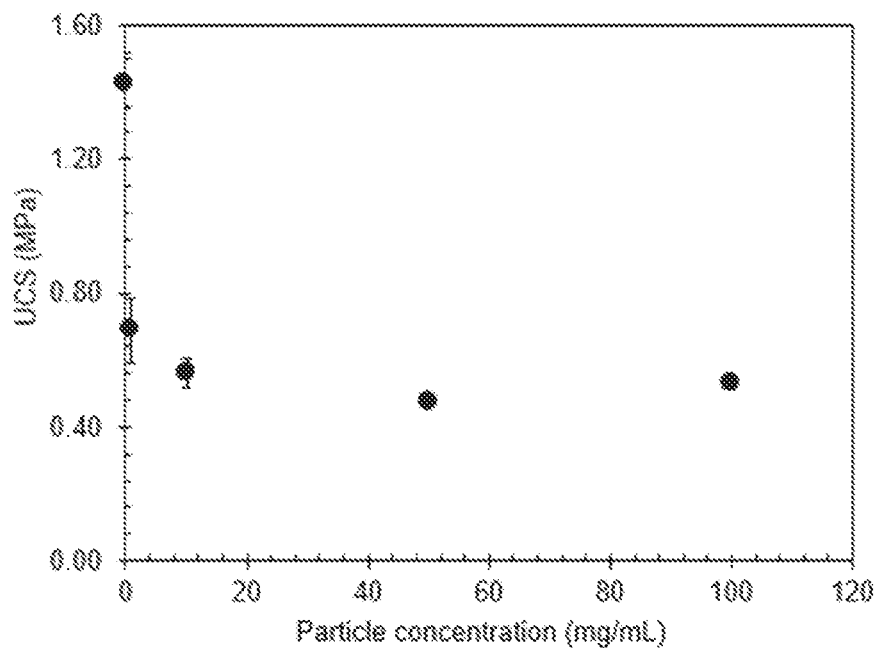
FIG. 28A is a scatterplot graph showing the relationship between the ultimate compressive strength (UCS) of an exemplary LDH-hydrogel prepared using PEGDA monomer (PEGDA having an average MW of 575 g/mol, monomer:crosslinker=500:1), and the LDH particle loading (0, 1, 10, 50, and 100 mg/mL). Data points are the average of three measurements and the error bars represent the first standard deviation. (Some error bars are smaller than data symbols.)
Figure 28B:
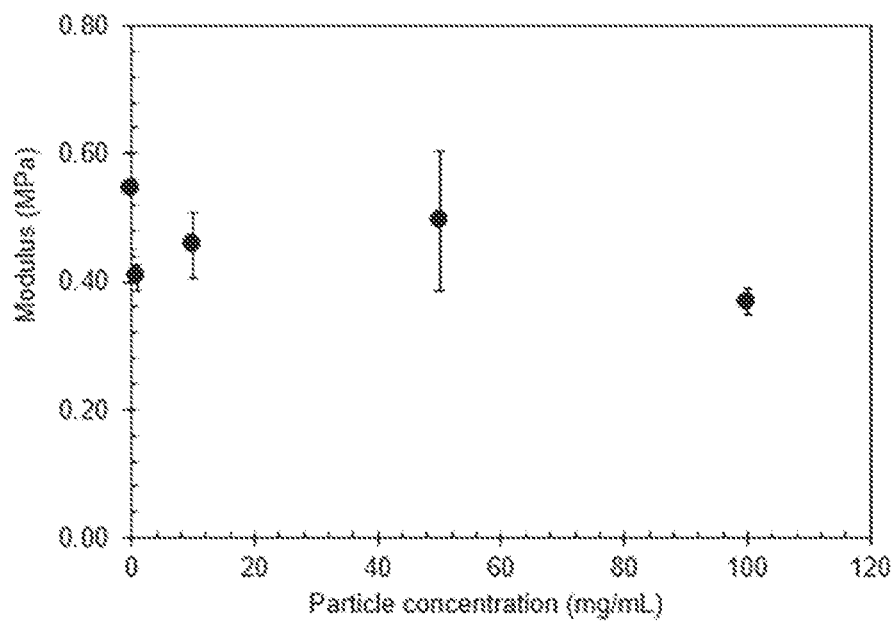
FIG. 28B is a scatterplot graph showing the relationship between the compressive modulus (modulus) of an exemplary LDH-hydrogel prepared using PEGDA monomer (PEGDA having an average MW of 575 g/mol, monomer:crosslinker=500:1), and the LDH particle loading (0, 1, 10, 50, and 100 mg/mL). Data points are the average of three measurements and the error bars represent the first standard deviation. (Some error bars are smaller than data symbols.)
Figure 29A:
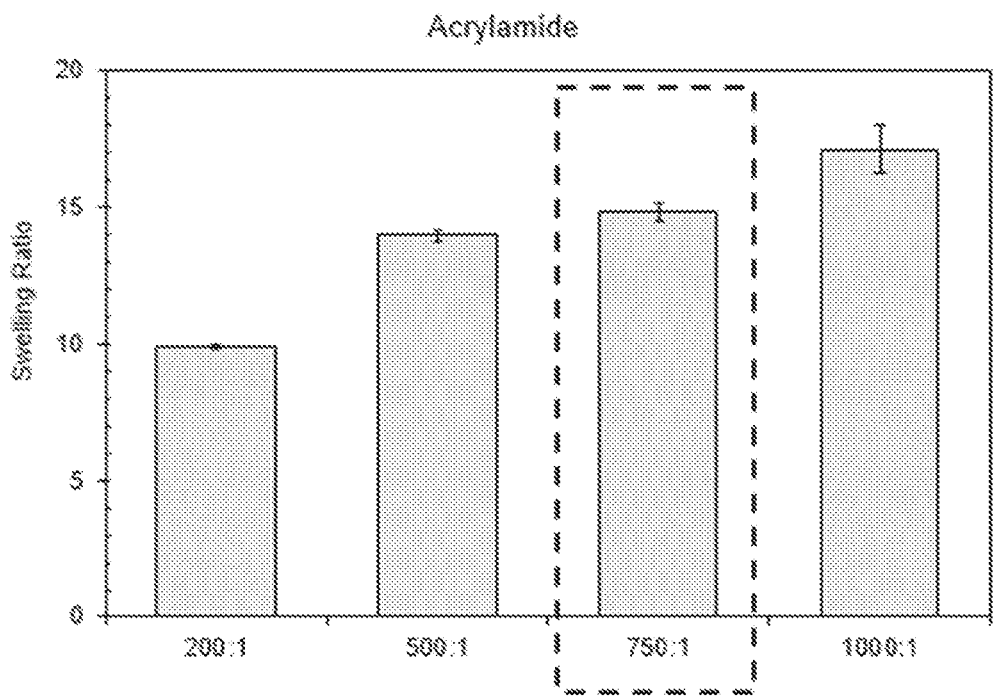
FIG. 29A is a bar graph showing the swelling ratios of exemplary PAAm hydrogels prepared with various mole ratios of monomer (AAm) to crosslinker (monomer:crosslinker=200:1, 500:1, 750:1, and 1000:1). Values are the average of three measurements and the error bars represent the first standard deviation.
Figure 29B:
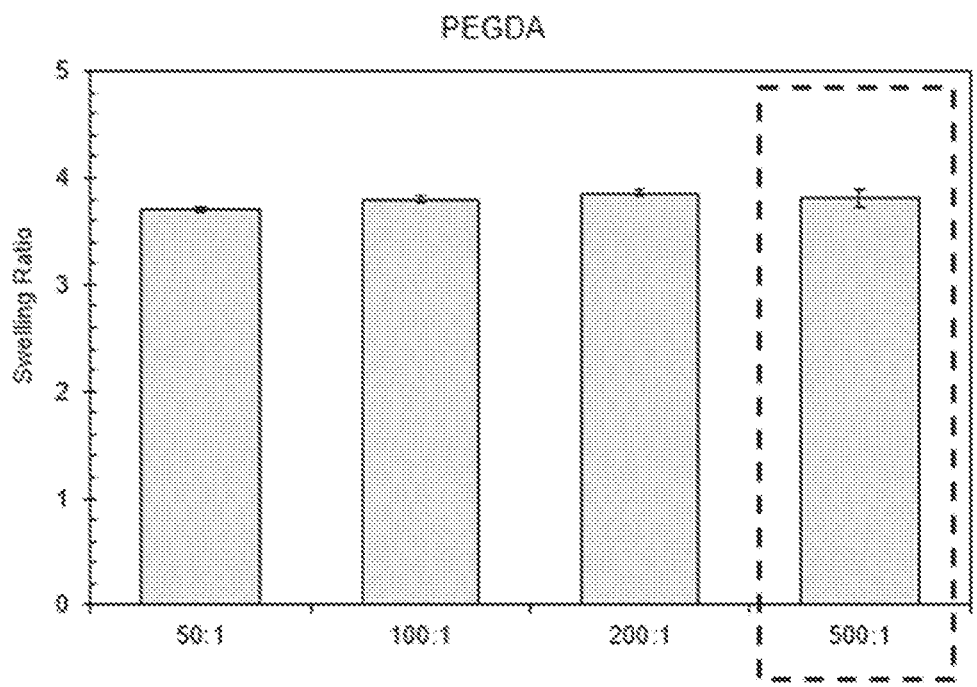
FIG. 29B is a bar graph showing the swelling ratios of exemplary PEGDA hydrogels prepared with various mole ratios of monomer to crosslinker (monomer:crosslinker=50:1, 100:1, 200:1, and 500:1). Values are the average of three measurements and the error bars represent the first standard deviation.
Figure 30A:
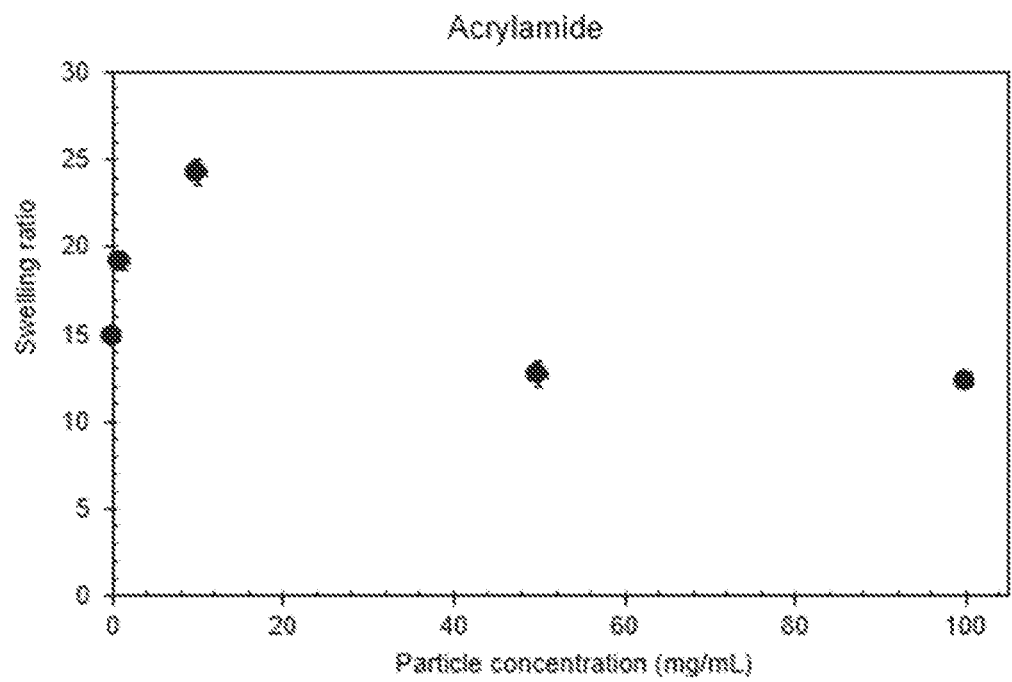
FIG. 30A is a scatterplot graph illustrating the relationship between the swelling ratio of an exemplary LDH-hydrogel prepared using acrylamide (AAm) monomer (monomer:crosslinker=750:1), and the LDH particle loading (0, 1, 10, 50, and 100 mg/mL). Data points are the average of three measurements and the error bars represent the first standard deviation. (Some error bars are smaller than data symbols.)
Figure 30B:
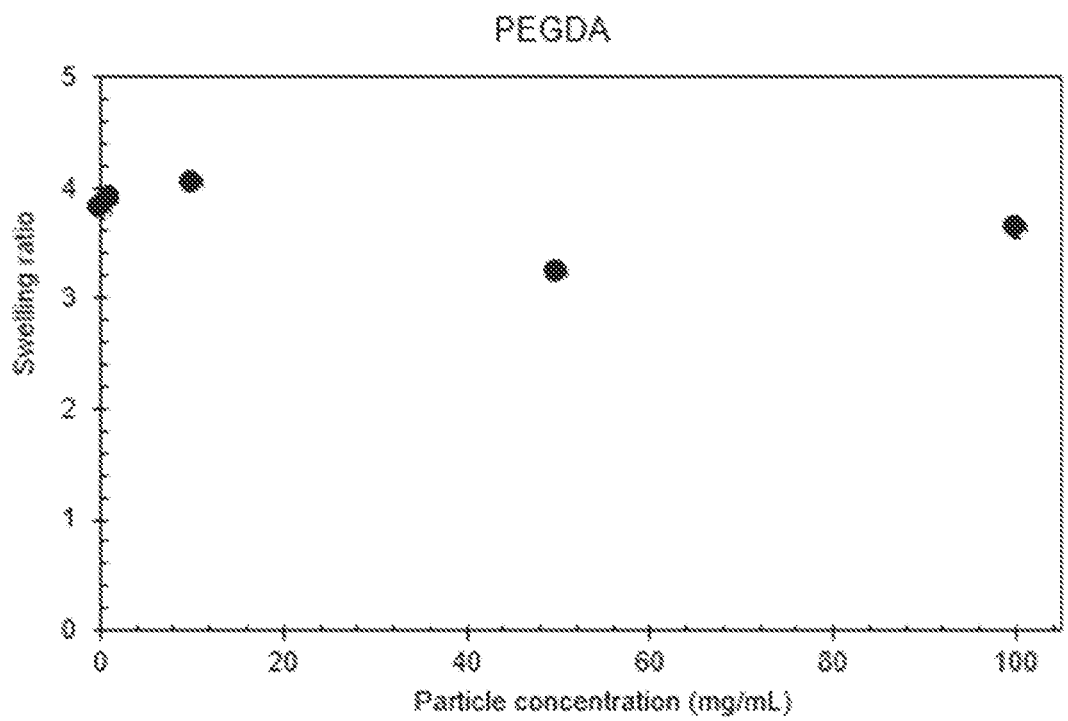
FIG. 30B is a scatterplot graph showing the relationship between the swelling ratio of an exemplary LDH-hydrogel prepared using PEGDA monomer (PEGDA having an average MW of 575 g/mol, monomer:crosslinker=500:1), and the LDH particle loading (0, 1, 10, 50, and 100 mg/mL). Data points are the average of three measurements and the error bars represent the first standard deviation. (Some error bars are smaller than data symbols.)
Figure 31A:
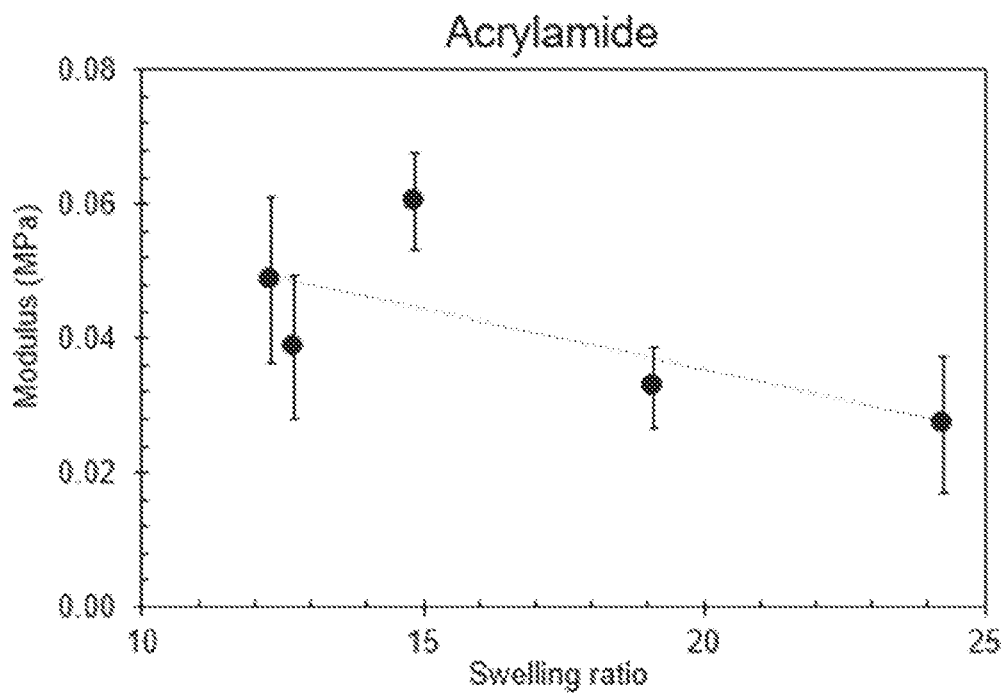
FIG. 31A is a scatterplot graph showing the relationship between the compressive modulus (modulus) and the swelling ratio for exemplary LDH-hydrogels prepared using acrylamide (AAm) monomer with monomer:crosslinker=750:1. Each data point represents a different LDH particle loading (0, 1, 10, 50, and 100 mg/mL). Data points are the average of three measurements and the error bars represent the first standard deviation.
Figure 31B:
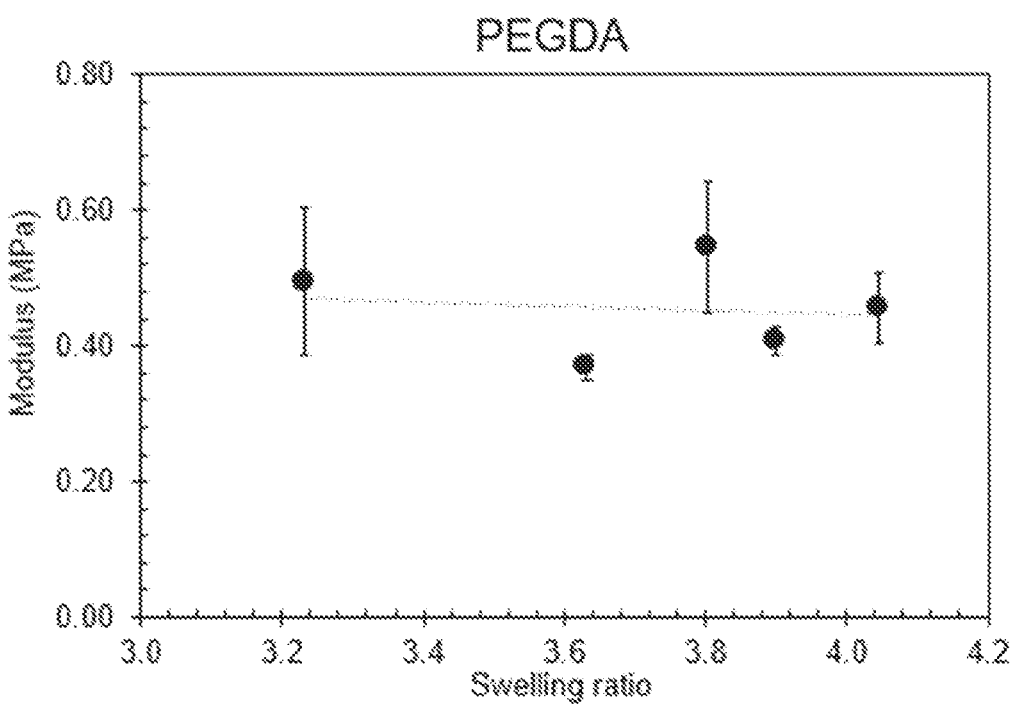
FIG. 31B is a scatterplot graph showing the relationship between the compressive modulus (modulus) and the swelling ratio for exemplary LDH-hydrogels prepared using PEGDA monomer with monomer:crosslinker=500:1. Each data point represents a different LDH particle loading (0, 1, 10, 50, and 100 mg/mL). Data points are the average of three measurements and the error bars represent the first standard deviation.

Control polymers (PEGDA and PAAm hydrogels) containing no LDH particles were loaded at comparable total volumes (approximately 20 mL for PEGDA and 60 mL for PAAm). As shown in the FIG. 14, the column is packed with the LDH-gel being tested ("media"). Synthetic stormwater (SSW) is then introduced to the top of the column via peristaltic pump ("pump") at 10 mL/min and allowed to run through. Each run was performed for 10 minutes, and the entire effluent of each run was collected to form a sample ("collected effluent"), which was analyzed for total phosphorus (TP), total nitrogen (TN), and nitrate ($NO_3^-$). The retention time (estimated from the interval between start of influent flow and start of effluent flow) in the columns was 8-12 seconds. The results are summarized in Tables 17-21 below and further in FIGS. 15A, 15B, and 15C.

In general, these results show that, even at short contact times (≤10 min), the nitrate removal capabilities are retained by the LDHs once they are encapsulated in the hydrogel matrices. In particular, the LDH-gels containing both Fe-5 ($Mg_{3.8}AlFe_{0.2}$) and Zn-5 ($Mg_{3.8}AlZn_{0.2}$) LDH particles show improved $NO_3^-$ removal performance compared to LDH-gels containing only Zn-5 ($Mg_{3.8}AlZn_{0.2}$) LDH particles.

TABLE 17

Total P and nitrate removal from 100 mL of synthetic stormwater by LDH-gels, 10 min contact time. LDH loading = 10 mg/mL.

| LDH-gel name | calcined LDH and approximate mass (g) | nutrient concentration (ppm) | | nutrient % removal | |
|---|---|---|---|---|---|
| | | total P | $NO_3^-$ | total P | $NO_3^-$ |
| Zn-AAm | $Mg_{3.8}AlZn_{0.2}$ (0.10) | 0.98 | 0.21 | 0% | 60% |
| Zn-PEGDA | $Mg_{3.8}AlZn_{0.2}$ (0.10) | 0.88 | 0.47 | 10% | 10% |
| Zn + Fe-AAm | $Mg_{3.8}AlZn_{0.2}$ (0.05) $Mg_{3.8}AlFe_{0.2}$ (0.05) | 0.95 | 0.42 | 3% | 19% |
| Zn + Fe-PEGDA | $Mg_{3.8}AlZn_{0.2}$ (0.05) $Mg_{3.8}AlFe_{0.2}$ (0.05) | 0.88 | 0.26 | 11% | 50% |
| initial concentration | | 0.98 | 0.52 | — | |

TABLE 18

Total P and nitrate removal from 100 mL of synthetic stormwater by LDH-gels, 48 h contact time (n.m. = not measured). LDH loading = 10 mg/mL.

| LDH-gel name | calcined LDH and approximate mass (g) | nutrient concentration (ppm) | | nutrient % removal | |
|---|---|---|---|---|---|
| | | total P | $NO_3^-$ | total P | $NO_3^-$ |
| Zn-AAm | $Mg_{3.8}AlZn_{0.2}$ (0.10) | n.m. | 0.46 | — | 12% |
| Zn-PEGDA | $Mg_{3.8}AlZn_{0.2}$ (0.10) | 0.33 | 0.41 | 66% | 21% |
| Zn + Fe-AAm | $Mg_{3.8}AlZn_{0.2}$ (0.05) $Mg_{3.8}AlFe_{0.2}$ (0.05) | n.m. | 0.40 | — | 23% |
| Zn + Fe-PEGDA | $Mg_{3.8}AlZn_{0.2}$ (0.05) $Mg_{3.8}AlFe_{0.2}$ (0.05) | 0.29 | 0.20 | 70% | 62% |
| initial concentration | | 0.98 | 0.52 | — | |

TABLE 19

Total P and nitrate removal from 100 mL of high-strength model solution by LDH-gels, 10 min contact time. LDH loading = 10 mg/mL.

| LDH-gel name | calcined LDH and approximate mass (g) | nutrient concentration (ppm) | | nutrient % removal | |
|---|---|---|---|---|---|
| | | total P | $NO_3^-$ | total P | $NO_3^-$ |
| Zn-AAm | $Mg_{3.8}AlZn_{0.2}$ (0.10) | 1.70 | 5.8 | 1% | 26% |
| Zn-PEGDA | $Mg_{3.8}AlZn_{0.2}$ (0.10) | 1.60 | 6.4 | 6% | 18% |
| Zn + Fe-AAm | $Mg_{3.8}AlZn_{0.2}$ (0.05) $Mg_{3.8}AlFe_{0.2}$ (0.05) | 1.98 | 6.2 | −16% | 21% |

TABLE 19-continued

Total P and nitrate removal from 100 mL of high-strength model solution by LDH-gels, 10 min contact time. LDH loading = 10 mg/mL.

| LDH-gel name | calcined LDH and approximate mass (g) | nutrient concentration (ppm) | | nutrient % removal | |
|---|---|---|---|---|---|
| | | total P | $NO_3^-$ | total P | $NO_3^-$ |
| Zn + Fe-PEGDA | $Mg_{3.8}AlZn_{0.2}$ (0.05) $Mg_{3.8}AlFe_{0.2}$ (0.05) | 1.58 | 7.2 | 8% | 8% |
| initial concentration | | 1.71 | 7.8 | — | |

TABLE 20

Total P and nitrate removal from 100 mL of high-strength model solution by LDH-gels, 48 h contact time (n.m. = not measured). LDH loading = 10 mg/mL.

| LDH-gel name | calcined LDH and approximate mass (g) | nutrient concentration (ppm) | | nutrient % removal | |
|---|---|---|---|---|---|
| | | total P | $NO_3^-$ | total P | $NO_3^-$ |
| Zn-AAm | $Mg_{3.8}AlZn_{0.2}$ (0.10) | n.m. | 3.6 | — | 54% |
| Zn-PEGDA | $Mg_{3.8}AlZn_{0.2}$ (0.10) | 0.21 | 5.1 | 88% | 35% |
| Zn + Fe-AAm | $Mg_{3.8}AlZn_{0.2}$ (0.05) $Mg_{3.8}AlFe_{0.2}$ (0.05) | n.m. | 3.9 | — | 50% |
| Zn + Fe-PEGDA | $Mg_{3.8}AlZn_{0.2}$ (0.05) $Mg_{3.8}AlFe_{0.2}$ (0.05) | 0.12 | 4.9 | 93% | 37% |
| initial concentration | | 1.71 | 7.8 | — | |

TABLE 21

Total P and nitrate removal from 100 mL of synthetic stormwater by LDH-gels, single-pass column experiment. LDH loading = 10 mg/mL.

| LDH-gel name | calcined LDH and approximate mass (g) | nutrient concentration (ppm) | | nutrient % removal | |
|---|---|---|---|---|---|
| | | total P | $NO_3^-$ | total P | $NO_3^-$ |
| Zn-AAm | $Mg_{3.8}AlZn_{0.2}$ (0.10) | 1.04 | 0.41 | −5% | 22 |
| Zn-PEGDA | $Mg_{3.8}AlZn_{0.2}$ (0.10) | 1.01 | 0.37 | −3% | 29 |
| Zn + Fe-AAm | $Mg_{3.8}AlZn_{0.2}$ (0.05) $Mg_{3.8}AlFe_{0.2}$ (0.05) | 0.88 | 0.29 | 10 | 44 |
| Zn + Fe-PEGDA | $Mg_{3.8}AlZn_{0.2}$ (0.05) $Mg_{3.8}AlFe_{0.2}$ (0.05) | 1.08 | 0.35 | −10% | 33 |
| initial concentration | | 0.98 | 0.52 | — | |

For reasons of completeness, various aspects of the technology are set out in the following numbered embodiments:

Embodiment 1. A layered double hydroxide (LDH), the LDH comprising:

a compound of formula $Mg_{4-y}AlX_y(OH)_2$, wherein:

X is $Mn^{+2}$, $Cu^{+2}$, $Zn^{+2}$, or $Fe^{+2}$, $0.01 \leq y \leq 1$.

Embodiment 2. The layered double hydroxide of embodiment 1, wherein X is $Zn^{+2}$.

Embodiment 3. The layered double hydroxide of embodiment 1, wherein X is $Fe^{+2}$.

Embodiment 4. The layered double hydroxide of any one of embodiments 1-3, wherein $0.2 \leq y \leq 1$.

Embodiment 5. The layered double hydroxide of any one of embodiments 1-4, wherein y is 0.2.

Embodiment 6. The layered double hydroxide of any one of embodiments 1-4, wherein y is 0.4.

Embodiment 7. The layered double hydroxide of any one of embodiments 1-4, wherein y is 1.

Embodiment 8. A layered double hydroxide hydrogel (LDH-gel), the LDH-gel comprising a hydrogel and at least one layered double hydroxide (LDH), the at least one LDH comprising:
a compound of formula $Mg_{4-y}AlX_y(OH)_2$, wherein:

$X$ is $Mn^{+2}$, $Cu^{+2}$, $Zn^{+2}$, or $Fe^{+2}$, $0.01 \le y \le 1$.

Embodiment 9. The LDH-gel of embodiment 8, wherein the hydrogel comprises polyethylene (glycol) diacrylate (PEGDA), polyacrylamide (PAAm), or combinations thereof.

Embodiment 10. The LDH-gel of embodiment 8 or 9, wherein the hydrogel comprises polyethylene (glycol) diacrylate (PEGDA).

Embodiment 11. The LDH-gel of embodiment 8 or 9, wherein the hydrogel comprises polyacrylamide (PAAm).

Embodiment 12. The LDH-gel of any one of embodiments 8-11, wherein X is $Zn^{+2}$.

Embodiment 13. The LDH-gel of any one of embodiments 8-11, wherein X is $Fe^{+2}$.

Embodiment 14. The LDH-gel of any one of embodiments 8-13, wherein the LDH-gel comprises more than one LDH comprising a compound of formula $Mg_{4-y}AlX_y(OH)_2$.

Embodiment 15. The LDH-gel of any one of embodiments 8-14, wherein the LDH-gel comprises a first LDH comprising a compound of formula $Mg_{4-y}AlX_y(OH)_2$ where X is $Zn^{+2}$ and a second LDH comprising a compound of formula $Mg_{4-y}AlX_y(OH)_2$ where X is $Fe^{+2}$.

Embodiment 16. The LDH-gel of any one of embodiments 8-15, wherein $0.2 \le y \le 1$.

Embodiment 17. The LDH-gel of any one of embodiments 8-16, wherein y is 0.2.

Embodiment 18. The LDH-gel of any one of embodiments 8-16, wherein y is 1.

Embodiment 19. The LDH-gel of any one of embodiments 8-18, wherein the LDH-gel is in the form of a bead.

Embodiment 20. A method of preparing layered double hydroxide (LDH) particles, the method comprising:
preparing a metal ion solution comprising magnesium chloride ($MgCl_2$), aluminum chloride ($AlCl_3$), and a transition metal chloride ($XCl_2$);
adding a 2 M sodium hydroxide (NaOH) solution to the metal ion solution to form a first suspension comprising the LDH particles;
centrifuging the first suspension and decanting a first supernatant or filtering the LDH particles;
exposing the LDH particles to a 2 M sodium carbonate ($Na_2CO_3$) solution to form a second suspension comprising the LDH particles;
centrifuging the second suspension and decanting a second supernatant or filtering the LDH particles;
washing the LDH particles;
drying the LDH particles; and
calcining the LDH particles.

Embodiment 21. The method of embodiment 20, wherein washing comprises a first washing step, a second washing step, and a third washing step, wherein:
the first washing step comprises washing the LDH particles with a solution comprising sodium carbonate ($Na_2CO_3$), and
the second and third washing steps comprise washing the LDH particles with pure water.

Embodiment 22. The method of embodiment 20 or 21, wherein the transition metal chloride is $MnCl_2$, $CuCl_2$, $ZnCl_2$, or $FeCl_2$.

Embodiment 23. The method of any one of embodiments 20-22, wherein calcining the LDH particles occurs at a temperature of 350° C. to 550° C.

Embodiment 24. The method of any one of embodiments 20-23, wherein the LDH particles comprise:
a compound of formula $Mg_{4-y}AlX_y(OH)_2$, wherein:

$X$ is $Mn^{+2}$, $Cu^{+2}$, $Zn^{+2}$, or $Fe^{+2}$, $0.01 \le y \le 1$.

Embodiment 25. The method of any one of embodiments 20-24, wherein X is $Zn^{+2}$.

Embodiment 26. The method of any one of embodiments 20-25, wherein X is $Fe^{+2}$.

Embodiment 27. A method of making a layered double hydroxide gel (LDH-gel), the method comprising:
forming a mixture, the mixture comprising:
a monomer,
a crosslinker,
a catalyst, and
LDH particles prepared according to embodiment 20;
adding an initiator to the mixture while stirring the mixture;
allowing the mixture to form a solid; and
washing the solid.

Embodiment 28. The method of embodiment 27, wherein after allowing the mixture to form a solid, and before washing the solid, the solid is broken into pieces.

Embodiment 29. The method of embodiment 27 or 28, wherein the method comprises:
forming the mixture in water; and
adding the mixture in water to an oil to form a water-in-oil emulsion.

Embodiment 30. The method of any one of embodiments 27-29, wherein the oil is paraffin oil.

Embodiment 31. The method of any one of embodiments 27-30, wherein the monomer is acrylamide (AAm) or polyethylene (glycol) diacrylate (PEGDA).

Embodiment 32. The method of any one of embodiments 27-31, wherein the PEGDA monomer has an average molecular weight of 575 g/mol.

Embodiment 33. The method of any one of embodiments 27-32, wherein ammonium persulfate (APS) is the initiator.

Embodiment 34. The method of any one of embodiments 27-33, wherein N,N,N',N'-tetramethylethylenediamine (TEMED) is the catalyst.

Embodiment 35. The method of any one of embodiments 27-34, wherein N,N'-methylenebisacrylamide (MBA) is the crosslinker.

Embodiment 36. A filter, comprising an LDH-gel made according to any one of embodiments 27-35.

What is claimed:

1. A layered double hydroxide (LDH), the LDH comprising:
a compound of formula $Mg_{4-y}AlX_y(OH)_2$, wherein:

$X$ is $Mn^{+2}$, $Cu^{+2}$, $Zn^{+2}$, or $Fe^{+2}$, $0.01 \le y \le 1$.

2. The layered double hydroxide of claim 1, wherein X is $Zn^{+2}$.

3. The layered double hydroxide of claim 1, wherein X is $Fe^{+2}$.

4. The layered double hydroxide of claim 1, wherein $0.2 \leq y \leq 1$.

5. The layered double hydroxide of claim 4, wherein y is 0.2.

6. The layered double hydroxide of claim 4, wherein y is 0.4.

7. The layered double hydroxide of claim 4, wherein y is 1.

8. A layered double hydroxide hydrogel (LDH-gel), the LDH-gel comprising a hydrogel and at least one layered double hydroxide (LDH), the at least one LDH comprising: a compound of formula $Mg_{4-y}AlX_y(OH)_2$, wherein:

$$X \text{ is } Mn^{+2}, Cu^{+2}, Zn^{+2}, \text{ or } Fe^{+2}, 0.01 \leq y \leq 1.$$

9. The LDH-gel of claim 8, wherein the hydrogel comprises polyethylene (glycol) diacrylate (PEGDA), polyacrylamide (PAAm), or combinations thereof.

10. The LDH-gel of claim 9, wherein the hydrogel comprises polyethylene (glycol) diacrylate (PEGDA).

11. The LDH-gel of claim 9, wherein the hydrogel comprises polyacrylamide (PAAm).

12. The LDH-gel of claim 8, wherein X is $Zn^{+2}$.

13. The LDH-gel of claim 8, wherein X is $Fe^{+2}$.

14. The LDH-gel of claim 8, wherein the LDH-gel comprises more than one LDH comprising a compound of formula $Mg_{4-y}AlX_y(OH)_2$.

15. The LDH-gel of claim 14, wherein the LDH-gel comprises a first LDH comprising a compound of formula $Mg_{4-y}AlX_y(OH)_2$ where X is $Zn^{+2}$ and a second LDH comprising a compound of formula $Mg_{4-y}AlX_y(OH)_2$ where X is $Fe^{+2}$.

16. The LDH-gel of claim 8, wherein $0.2 \leq y \leq 1$.

17. The LDH-gel of claim 16, wherein y is 0.2.

18. The LDH-gel of claim 16, wherein y is 1.

19. The LDH-gel of claim 8, wherein the LDH-gel is in the form of a bead.

* * * * *